(12) United States Patent
Gaylo et al.

(10) Patent No.: US 12,391,597 B2
(45) Date of Patent: Aug. 19, 2025

(54) SYSTEMS AND METHODS FOR MEASURING THE TEMPERATURE OF GLASS DURING TUBE CONVERSION

(71) Applicant: CORNING INCORPORATED, Corning, NY (US)

(72) Inventors: Keith Raymond Gaylo, Painted Post, NY (US); Lewis Kirk Klingensmith, Corning, NY (US); Joseph Michael Matusick, Corning, NY (US); Connor Thomas O'Malley, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 18/139,497

(22) Filed: Apr. 26, 2023

(65) Prior Publication Data

US 2023/0257292 A1    Aug. 17, 2023

Related U.S. Application Data

(60) Continuation of application No. 17/385,684, filed on Jul. 26, 2021, which is a continuation of application
(Continued)

(51) Int. Cl.
*C03B 23/09* (2006.01)
*C03B 23/11* (2006.01)
(Continued)

(52) U.S. Cl.
CPC .......... *C03B 23/099* (2013.01); *C03B 23/112* (2013.01); *C03B 35/26* (2013.01); *G01N 25/00* (2013.01); *G05B 6/02* (2013.01)

(58) Field of Classification Search
CPC ..................... C03B 23/092; C03B 23/095
See application file for complete search history.

(56) References Cited

U.S. PATENT DOCUMENTS

| | | | | |
|---|---|---|---|---|
| 713,280 | A | * 11/1902 | Blair | C03B 23/095 |
| | | | | 65/282 |
| 3,424,570 | A | 1/1969 | Couquelet | |

(Continued)

FOREIGN PATENT DOCUMENTS

| | | |
|---|---|---|
| CN | 1685229 A | 10/2005 |
| CN | 1872754 A | 12/2006 |

(Continued)

OTHER PUBLICATIONS

JP-2004051405-A (Kondo) Feb. 19, 2004 (English language translation). [online] [retrieved Oct. 8, 2024]. Retrieved from: Clarivate Analytics. (Year: 2004).*

(Continued)

*Primary Examiner* — Erin Snelting
(74) *Attorney, Agent, or Firm* — DINSMORE & SHOHL LLP

(57) ABSTRACT

A system for producing articles from glass tube includes a converter having a base with a plurality of processing stations and a turret moveable relative to the base. The turret indexes a plurality of holders for holding the glass tubes successively through the processing stations. The system further includes a thermal imaging system that includes a thermal imager coupled to the turret for movement with the turret. The thermal imaging system may also include a mirror coupled to the thermal imager and positioned to reflect infrared light from one of the plurality of holders to the thermal imager. The thermal imaging system may measure one or more characteristics of the glass tube during the conversion process. Processes for controlling the converter (Continued)

using the thermal imaging system to measure one or more process variables are also disclosed.

24 Claims, 23 Drawing Sheets

Related U.S. Application Data

No. 16/994,465, filed on Aug. 14, 2020, now Pat. No. 11,104,599, which is a division of application No. 15/928,837, filed on Mar. 22, 2018, now Pat. No. 10,773,989.

(60) Provisional application No. 62/476,408, filed on Mar. 24, 2017.

(51) Int. Cl.
 C03B 35/26 (2006.01)
 G01N 25/00 (2006.01)
 G05B 6/02 (2006.01)

(56) References Cited

U.S. PATENT DOCUMENTS

| | | | |
|---|---|---|---|
| 3,482,448 | A | 12/1969 | Gaffard |
| 3,736,118 | A | 5/1973 | Heflich et al. |
| 4,092,142 | A | 5/1978 | Dichter |
| 4,142,883 | A | 3/1979 | Dichter |
| 4,303,435 | A | 12/1981 | Sleighter |
| 4,441,908 | A * | 4/1984 | Zauner .............. C03B 23/112 65/243 |
| 4,548,633 | A | 10/1985 | Nebelung |
| 4,615,719 | A | 10/1986 | Pauluk et al. |
| 4,688,474 | A | 8/1987 | Anderl |
| 5,196,997 | A | 3/1993 | Kurtzberg et al. |
| 5,583,337 | A | 12/1996 | Chan |
| 5,611,834 | A | 3/1997 | Walter et al. |
| 6,188,079 | B1 | 2/2001 | Juvinall et al. |
| 6,232,583 | B1 | 5/2001 | Uhm |
| 7,660,642 | B1 | 2/2010 | Tuszynski |
| 8,958,058 | B2 | 2/2015 | Bonin et al. |
| 10,773,989 | B2 | 9/2020 | Gaylo et al. |
| 10,968,133 | B2 | 4/2021 | Gaylo et al. |
| 11,186,513 | B2 | 11/2021 | Gaylo et al. |
| 11,339,079 | B2 | 5/2022 | Klingensmith et al. |
| 11,420,893 | B2 | 8/2022 | McEnroe |
| 2003/0216887 | A1 | 11/2003 | Shieh |
| 2004/0143357 | A1 | 7/2004 | Schwarm et al. |
| 2006/0031024 | A1 | 2/2006 | Mountassir |
| 2006/0096319 | A1 | 5/2006 | Dalstra |
| 2007/0038657 | A1 | 2/2007 | Denton et al. |
| 2009/0037013 | A1 | 2/2009 | Hendler et al. |
| 2010/0060902 | A1 | 3/2010 | Wornson et al. |
| 2010/0082120 | A1 | 4/2010 | Stephenson et al. |
| 2010/0208242 | A1 | 8/2010 | Martinez et al. |
| 2011/0141264 | A1 | 6/2011 | Holtkamp et al. |
| 2011/0141265 | A1 | 6/2011 | Holtkamp et al. |
| 2012/0047955 | A1 | 3/2012 | Belgum et al. |
| 2014/0174127 | A1 | 6/2014 | Dalstra |
| 2014/0373574 | A1 | 12/2014 | Moseler et al. |
| 2015/0074982 | A1 | 3/2015 | Adams et al. |
| 2015/0076353 | A1 | 3/2015 | Bathelet |
| 2015/0142163 | A1 | 5/2015 | Simon |
| 2015/0203077 | A1 | 7/2015 | Gokan |
| 2016/0016841 | A1 | 1/2016 | Frost et al. |
| 2016/0214224 | A1 | 7/2016 | Jing et al. |
| 2018/0134603 | A1 | 5/2018 | Inoue |
| 2019/0195724 | A1 | 6/2019 | Jo et al. |
| 2020/0377402 | A1 | 12/2020 | Gaylo et al. |

FOREIGN PATENT DOCUMENTS

| | | |
|---|---|---|
| CN | 104591525 A | 5/2015 |
| CN | 104843981 A | 8/2015 |
| CN | 105271658 A | 1/2016 |
| DE | 19902316 A1 | 8/2000 |
| EP | 1725501 B1 | 5/2008 |
| EP | 2873572 A1 | 5/2015 |
| EP | 3287419 A1 | 2/2018 |
| GB | 2241400 A | 8/1991 |
| IT | 201900005600 A1 | 10/2020 |
| JP | 52-121486 A | 10/1977 |
| JP | 60-098340 A | 6/1985 |
| JP | S60-98340 A | 6/1985 |
| JP | 05-072138 A | 3/1993 |
| JP | H05-72138 A | 3/1993 |
| JP | H10-249930 A | 9/1998 |
| JP | H11116249 A | 4/1999 |
| JP | 2002049930 A | 2/2002 |
| JP | 2004051405 A * | 2/2004 ........... C03B 23/092 |
| JP | 2007002138 A | 1/2007 |
| JP | 2009008340 A | 1/2009 |
| JP | 2013079180 A | 5/2013 |
| JP | 2014-114028 A | 6/2014 |
| JP | 2014-129224 A | 7/2014 |
| JP | 2014-184845 A | 10/2014 |
| JP | 2014-208565 A | 11/2014 |
| JP | 2015107636 A | 6/2015 |
| RU | 2064458 C1 | 7/1996 |
| WO | 2014/010578 A1 | 1/2014 |
| WO | 2016042984 A1 | 3/2016 |
| WO | 2016/171214 A1 | 10/2016 |

OTHER PUBLICATIONS

Translation of Chinese Office Action dated Sep. 6, 2024, pertaining to CN Patent Application No. 202211081352.5, 4 pgs.
US Final Office Action dated Sep. 12, 2024, pertaining to U.S. Appl. No. 17/385,684, 50 pgs.
International Search Report & Written Opinion dated Aug. 30, 2022, for PCT/US2022/030493. pp. 1-15; European Patent Office.
Ambeg Glasbearbeitungsmaschinen—RP16, Glass Forming Machines, Vial forming machine RP 16 with automatic tube feeder [online] retrieved from the internet on Mar. 12, 2018. URL: <http://www.ambeg.de.en/products/rp16.html>. pp. 1-2.
Brazil Office Action dated Jul. 6, 2022, pertaining to BR Patent Application No. BR112019019945-4, 8 pgs.
Chinese Office Action mailed Oct. 21, 2021 in related Chinese Patent Application No. 201880020806.3, 13 pages.
Dean Butler, et al., Intelligent software sensors and process prediction for glass container forming processes based on multivariate statistical process control techniques, UKACC International Conference on Control, 2012, pp. 281-285.
International Search Report & Written Opinion dated Jun. 6, 2018, for PCT/US2018/023873 filed Mar. 22, 2018, pp. 1-13.
Japanese Office Action dated Nov. 17, 2021, pertaining to Application No. JP2019-552485 filed Nov. 12, 2021, 5 pgs.
Japanese Patent Application No. 2019-552485, Office Action dated Jun. 17, 2022, 9 pages (4 pages of English Translation and 5 pages of Original Document), Japanese Patent Office.
Keyence, The Original Green LED Incorporated Digital Micrometer. [online] retrieved from the internet on Mar. 12, 2018. URL: <www.keyence.com>. pp. 1-8.
Non-Final Office Action dated Mar. 10, 2020, for U.S. Appl. No. 15/928,837, filed Mar. 22, 2018. pp. 1-9.
RU 1st Office Action & Search Report dated Jul. 5, 2021, for RU Patent Application No. 2019131142.
Taiwanese Patent Application No. 107110012, Office Action dated Jul. 21, 2021, 3 page (English Translation Only); Taiwanese Patent Office.
TW 1st Office Action & Search Report dated Jul. 21, 2021, for TW Patent Application No. 107110012.
Japanese Office Action dated Nov. 27, 2024, pertaining to JP Patent Application No. 2023-142114, 12 pgs.
1 Japanese Second Office Action dated May 28, 2025, relating to JP Patent Application No. 2023-142114.

* cited by examiner

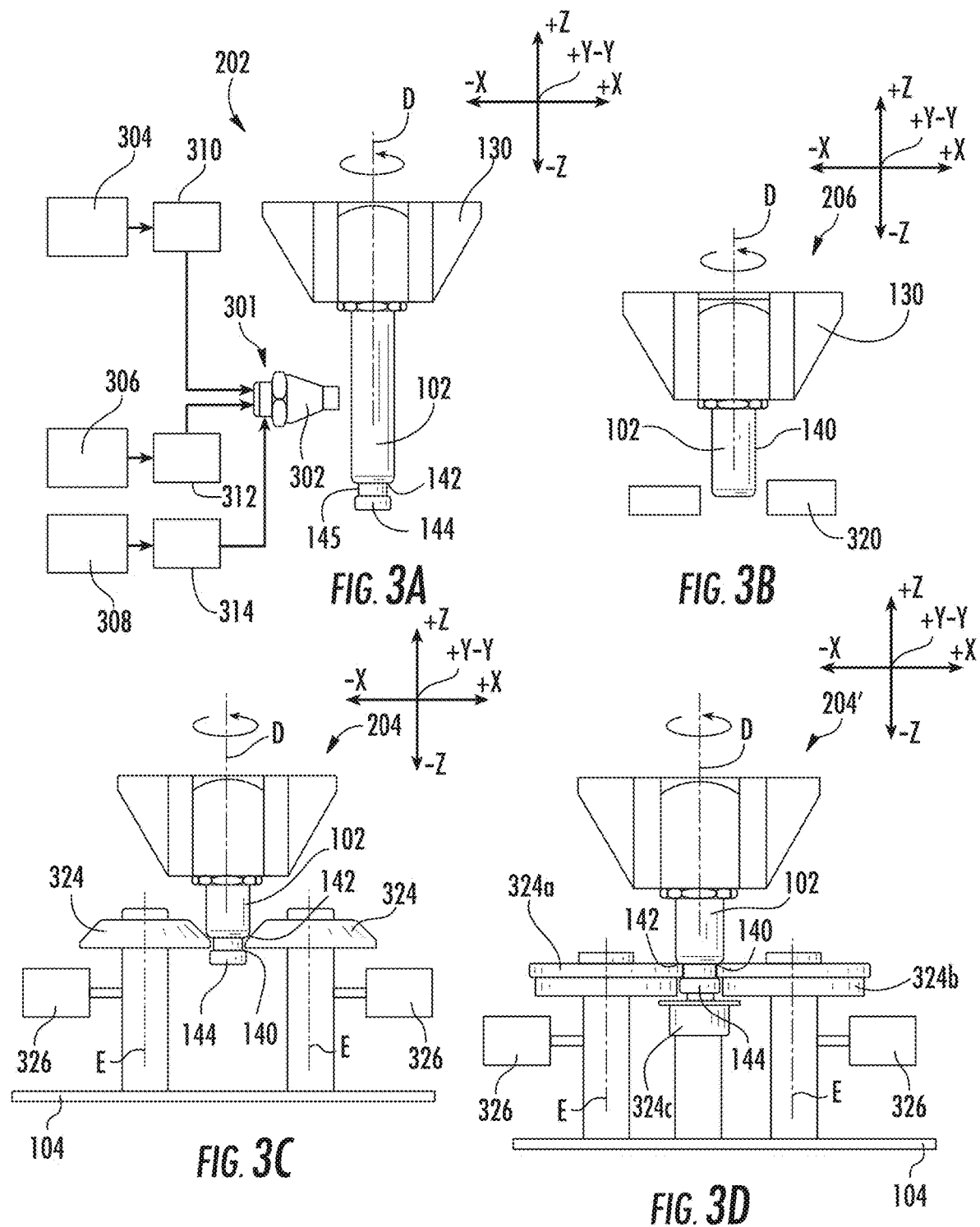

SYSTEMS AND METHODS FOR MEASURING THE TEMPERATURE OF GLASS DURING TUBE CONVERSION

CROSS-REFERENCE TO RELATED APPLICATIONS

The present application is a continuation of U.S. patent application Ser. No. 17/385,684 filed Jul. 26, 2021, entitled "Systems and Methods for Measuring the Temperature of Glass During Tube Conversion", which is a continuation of U.S. patent application Ser. No. 16/994,465 filed Aug. 14, 2020, entitled "Systems and Methods for Measuring the Temperature of Glass During Tube Conversion", which is a divisional of U.S. patent application Ser. No. 15/928,837 filed Mar. 22, 2018, entitled, "Systems and Methods for Measuring the Temperature of Glass During Tube Conversion", which claims the benefit of priority to U.S. Provisional Application No. 62/476,408, filed Mar. 24, 2017, entitled "Systems and Methods for Measuring the Temperature of Glass During Tube Conversion," the entire contents of all of which are hereby incorporated by reference herein.

BACKGROUND

Field

The present specification generally relates to systems and methods for measuring the temperature of glass during conversion of glass tube to glass articles.

Technical Background

Glass tubing may be converted into other glass articles. For example, glass tubing may be converted into various glass containers for use in pharmaceutical applications including, without limitation, vials, syringes, ampoules, cartridges and other glass articles. The glass tubing may be converted, for example, in "converting machines." Converting machines have been used for over 75 years, and are currently made by various commercial and internal equipment suppliers. These converting machines typically reform long glass tube lengths into a plurality of glass articles using steps which include flame working, rotating and stationary tool forming, thermal separation, or score and shock cutoff steps.

In the current glass converting industry, the converting machines are run by operators and technicians with extensive experience. These operators and technicians learn the machine operations through experience and artisan-like training, and operational adjustments to burners and machine setup, for example, are typically performed solely by visual assessment of temperature and shape of the partially formed or totally formed glass articles. Operational practices and machine modifications are closely held by part makers, a practice which presents a substantial barrier to entry into the market for producing high end pharmaceutical articles for new producers.

Accordingly, a need exists for alternative systems and methods for forming glass articles with tube conversion machines.

SUMMARY

Accordingly, a need exists for systems and methods for measuring the temperatures of glass tubes during glass tube conversion to produce glass articles.

In one or more aspects of the present disclosure, a system for producing glass articles from glass tube may comprise a converter comprising a base having a plurality of processing stations spaced apart in a circuit and a turret moveable relative to the base, the turret having a plurality of holders extending from the turret towards the plurality of processing stations, the plurality of holders spaced apart from one another, wherein the turret is operable to index each of the plurality of holders into proximity with each of the plurality of processing stations in succession. The system may further include a thermal imaging system comprising a thermal imager coupled to the turret for movement with the turret, wherein the thermal imager is positioned to capture infrared light emitted from the glass tube disposed in one of the plurality of holders.

In embodiments, the thermal imager may be positioned to directly receive infrared light emitted by an outer surface of the glass tube. The thermal imaging system may further comprise at least one mirror oriented to reflect infrared light emitted from an inner surface of the glass tube to the thermal imager. The at least one mirror may be a stationary mirror coupled to the base and oriented to reflect infrared light emitted from an inner surface of the glass tube to the thermal imager.

In some embodiments, the system may further comprise a mirror coupled to the thermal imager and oriented to reflect infrared light from the glass tube to the thermal imager. The mirror may be oriented to reflect infrared light emitted from an outer surface of the glass tube to the thermal imager. A reflective surface of the mirror may have a reflectance equal to or greater than 96% for light having wavelengths from 800 nanometers to 20 microns. In other embodiments, the mirror may be oriented to reflect infrared light emitted from an inner surface of the glass tube to the thermal imager.

In embodiments, the system may include at least one supplemental mirror coupled to the thermal imager, wherein the mirror is oriented to reflect infrared light emitted from an outer surface of the glass tube to the thermal imager and the supplemental mirror is oriented to reflect infrared light emitted from an inner surface of the glass tube to the thermal imager. In other embodiments, the system may include at least one stationary mirror positioned vertically below one of the plurality of processing stations, the stationary mirror positioned to reflect infrared light emitted from an inner surface of the glass tube to the thermal imager when the thermal imager is indexed into position at the one of the plurality of processing stations by the turret.

In some embodiments, the thermal imager may be an infrared camera configured to receive infrared light having wavelengths from 4 microns to 14 microns, or from 5 microns to 14 microns. In embodiments, the system may comprise a main turret and a secondary turret. The thermal imager may be coupled to the main turret for rotation with the main turret. The system may comprise a loading turret positioned above the main turret and rotatable relative to the main turret. In some embodiments, the thermal imaging system may include a plurality of thermal imagers.

In some embodiments, the system may include a slip ring positioned above the turret and having a slip ring axis aligned with a central axis of the turret, the slip ring electrically coupling the thermal imager to a power source. The slip ring may operatively couple the thermal imager to a processor. An inner ring of the slip ring may include a central bore.

In other embodiments, the system may further comprise a power source coupled to the turret for rotation with the turret, the power source electrically coupled to the thermal imager to provide power to the thermal imager. The system may also include a wireless communication device coupled to the turret, wherein the wireless communication device communicatively couples the thermal imager to a processor.

In embodiments, the system may comprise a cooling system that includes a cooling fluid supply, a rotating union fluidly coupled to the cooling fluid supply and having a union axis aligned with the central axis of the turret, and a supply conduit extending from the rotating union to the thermal imaging system. The system may also include a cleaning system comprising at least one nozzle positioned to deliver a fluid to the lens of the thermal imager. The thermal imaging system may include a mirror coupled to the thermal imager and oriented to reflect infrared light from glass tube positioned in one of the plurality of holders to the thermal imager, and the cooling system may include at least one nozzle positioned to deliver a fluid to a reflective surface of the mirror.

In some embodiments, the system may include at least one processor communicatively coupled to the thermal imager, at least one memory module communicatively coupled to the processor, and machine readable instructions stored in the at least one memory module that cause the thermal imaging system to perform at least the following when executed by the at least one processor: receive thermal image information from the thermal imager, process the thermal image information, and determine a characteristic of a glass tube from the thermal image information. The characteristic may be at least one of a temperature of the glass tube, a temperature gradient through a thickness of the glass tube, a viscosity of the glass tube, a viscosity gradient through the thickness of the glass tube, a dimension of the glass tube, a temperature profile of the glass tube, a temperature profile of the glass tube as a function of time, a centerline of the glass tube, or combinations thereof.

In embodiments, the system may further comprise machine readable instructions stored in the at least one memory module that, when executed by the at least one processor, cause the thermal imaging system to determine a temperature of the glass tube from the thermal image information, determine a viscosity of the glass tube from the thermal image information, or determine a dimension of the glass tube from the thermal image information.

In some embodiments, the system may further include machine readable instructions stored in the at least one memory module that cause the thermal imaging system to perform at least the following when executed by the at least one processor: determine a first characteristic of the glass tube at a first processing station, determine a second characteristic of the glass tube at a second processing station positioned downstream of the first processing station, calculate a difference between the first characteristic and the second characteristic, and transmit an output representative of the difference between the first characteristic and the second characteristic.

In some embodiments, the processor may be communicatively coupled to a control device, and the system may further comprise machine readable instructions stored in the at least one memory module that cause the thermal imaging system to perform at least the following when executed by the at least one processor: compare the characteristic of the glass tube to a set point characteristic, determine a controlled variable from comparison of the characteristic of the glass tube to the set point characteristic, and transmit a control signal representative of the controlled variable to the control device.

In embodiments, at least one of the plurality of processing stations may comprise a heating station having at least one heating element and the control device is operatively coupled to the heating element to manipulate the heating of the glass tube by the heating element. The heating element may include a burner and the control device may be one or more of a fuel control valve, an oxygen control valve, or an air control valve. The controlled variable may be a mass flow rate of one or more of fuel gas, oxygen, or air. Alternatively, the controlled variable may be a position of one or more of the fuel control valve, the oxygen control valve, or the air control valve.

In embodiments, at least one of the processing stations may be a cooling station having at least one cooling fluid control valve, wherein the control device is the cooling fluid control valve. In embodiments, at least one of the processing stations may be a forming station having one or more actuators that translate at least one forming tool into removable engagement with the glass tube, wherein the control device comprises the one or more actuators. The controlled variable may be a contact time of the at least one forming tool with the glass tube in the forming station.

In some embodiments, the system may further include a dimensioning system. The dimensioning system may include at least one of a visual imaging system, a laser reflectometer, a laser gauge, or an optical micrometer. The dimensioning system may be positioned to capture measurement data of the glass tube upstream of the converter. Alternatively, in some embodiments, the dimensioning system may be positioned to capture measurement data of the glass tube at one of the plurality of processing stations. The system may further include machine readable instructions stored in the at least one memory module that cause the dimensioning system to perform at least the following when executed by the at least one processor: capture measurement data of the glass tube in the one of the plurality of processing stations, process the measurement data of the glass tube, and determine a physical attribute of the glass tube from the measurement data of the glass tube. The physical attribute is one or more of a diameter, thickness, or glass mass per unit length of the glass tube.

In some embodiments, the system may include machine readable instructions stored in the at least one memory module that cause the system to perform at least the following when executed by the at least one processor: receive the physical attribute of the glass tube from the dimensioning system, and determine a characteristic gradient across a thickness of the glass tube from the physical attribute and the characteristic. The characteristic gradient may be a temperature gradient or a viscosity gradient.

In embodiments, the system may include machine readable instructions stored in the at least one memory module that cause the system to perform at least the following when executed by the at least one processor: compare the physical attribute of the glass tube to a set point physical attribute, and determine an adjustment to the controlled variable from comparison of the physical attribute of the glass tube to the set point physical attribute.

In another aspect, a process for controlling a glass tube converter may comprise indexing a glass tube, which is removably coupled to a turret of the glass tube converter, through a plurality of processing stations of the glass tube converter, at least one of the plurality of processing stations comprising a control device. The process may further include capturing a thermal image of the glass tube using a thermal imaging system coupled to the turret of the glass tube converter, the thermal imaging system comprising at least a thermal imager oriented to capture infrared light from the glass tube. The process may further comprise processing the thermal image, determining a characteristic of the glass tube from the thermal image, comparing the characteristic of the glass tube to a set point, determining a controlled variable from comparison of the characteristic of the glass tube to the set point, and transmitting a control signal representative of the controlled variable to a control device.

In some embodiments of the process, the at least one of the plurality of processing stations may comprise a heating station having at least one heating element and the control device may be operatively coupled to the heating element. The heating element may be a burner and the control device may be one or more of a fuel control valve, an oxygen control valve, or an air control valve, wherein the controlled variable may be a mass flow rate of one or more of fuel gas, oxygen, or air. The control device may be one or more of a fuel control valve, an oxygen control valve, or an air control valve, and the controlled variable may be a position of one or more of the fuel control valve, the oxygen control valve, or the air control valve.

In embodiments of the process, the at least one of the processing stations may comprise a cooling station having at least one cooling fluid control valve, wherein the control device may be the cooling fluid control valve. In some embodiments of the process, the at least one of the processing stations comprises a forming station having one or more actuators that translate at least one forming tool into removable engagement with the glass tube, wherein the control device may be the one or more actuators. The controlled variable may be a contact time of the at least one forming tool with the glass tube in the forming station.

In some embodiments, the converter may comprise a dimensioning system having at least one of a visual imaging system, laser reflectometer, laser gauge, or optical micrometer positioned to capture measurement data of the glass tube at one of the plurality of processing stations. The process may further comprise capturing the measurement data of the glass tube in the one of the plurality of processing stations, processing the measurement data of the glass tube, and determining a physical attribute of the glass tube from the measurement data of the glass tube. The physical attribute may be one or more of a diameter, thickness, or glass mass per unit length of the glass tube.

In embodiments, the process may further comprise comparing the physical attribute of the glass tube to a set point physical attribute, and determining an adjustment to the controlled variable from comparison of the physical attribute of the glass tube to the set point physical attribute. In other embodiments, the process may further comprise measuring a physical attribute of the glass tube, wherein the physical attribute may be one of a diameter, a thickness, or a mass per unit length of the glass tube, comparing the physical attribute of the glass tube to a set point physical attribute, and determining an adjustment to the controlled variable from comparison of the physical attribute of the glass tube to the set point physical attribute.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 3A schematically depicts a heating station of the converter of FIG. 1, according to one or more embodiments shown and described herein;

FIG. 3B schematically depicts a separating station of the converter of FIG. 1, according to one or more embodiments shown and described herein;

FIG. 3C schematically depicts a forming station of the converter of FIG. 1, according to one or more embodiments shown and described herein;

FIG. 3D schematically depicts another embodiment of a forming station of the converter of FIG. 1, according to one or more embodiments shown and described herein;

DETAILED DESCRIPTION

Figure 1:
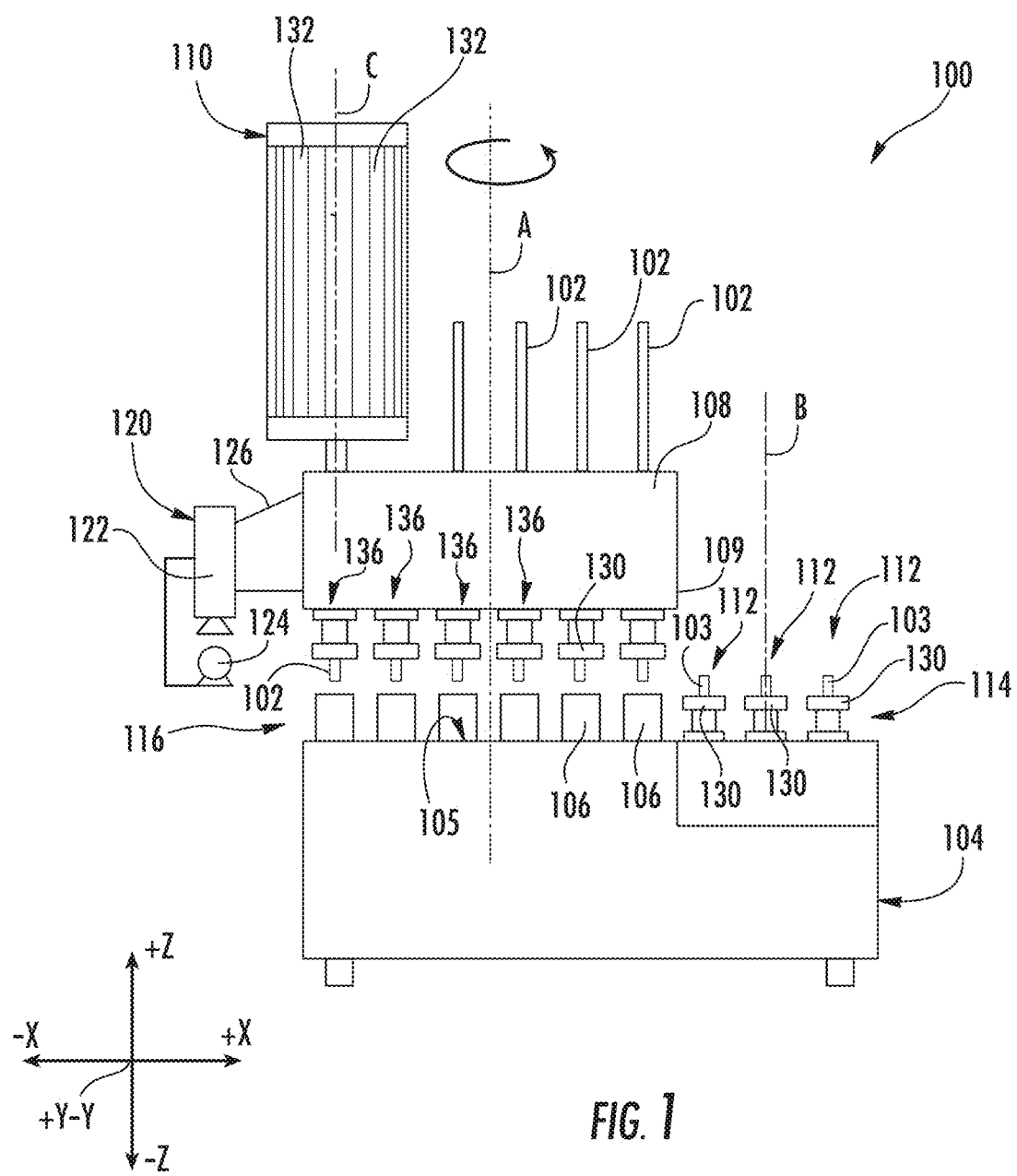
FIG. 1 schematically depicts an embodiment of a converter for producing glass articles from glass tube, according to one or more embodiments shown and described herein.

Reference will now be made in detail to embodiments of systems and methods for controlling a tube converting processes, examples of which are illustrated in the accompanying drawings. Whenever possible, the same reference numerals will be used throughout the drawings to refer to the same or like parts. One embodiment of a system for producing articles from glass tube is depicted in FIG. 1. In this embodiment, the system for producing glass articles from glass tube 102 includes a converter 100 and a thermal imaging system 120. The converter 100 includes a base 104 having a plurality of processing stations 106 spaced apart in a circuit and a main turret 108 spaced apart from the base 104 and moveable relative to the base 104. The main turret 108 includes a plurality of holders 130 extending from the main turret 108 towards the plurality of processing stations 106. The plurality of holders 130 are spaced apart from one another, and each of the plurality of holders 130 is aligned with one of the plurality of processing stations 106. The main turret 108 is operable to index each of the plurality of holders 130 into proximity with each of the plurality of processing stations 106 in succession. The thermal imaging system 120 may include a thermal imager 122, which may be coupled to a portion of the main turret 108 for translation with the portion of the main turret 108. The thermal imaging system 120 may also include a mirror 124 coupled to the thermal imager 122 and positioned to reflect infrared light from one of the plurality of holders 130 to the thermal imager 122. Various embodiments of systems and methods for controlling tube converting processes will be described herein with specific reference to the appended drawings.

Directional terms as used herein—for example up, down, right, left, front, back, top, bottom—are made only with reference to the figures as drawn and are not intended to imply ab solute orientation.

Unless otherwise expressly stated, it is in no way intended that any method set forth herein be construed as requiring that its steps be performed in a specific order, nor that specific orientations be required with any apparatus. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Referring now to FIG. 1, a converter 100 for producing glass articles from a glass tube 102 is schematically depicted. The converter 100 may be used to convert glass tubes 102 into a plurality of glass articles, such as, but not limited to, vials, syringes, cartridges, ampoules, or other glass articles. The converter 100 includes a base 104 having a plurality of processing stations 106, a main turret 108 positioned above the base 104 and rotatable relative to the base 104 about the central axis A, and a glass tube loading turret 110 positioned above the main turret 108 for feeding glass tube 102 to the main turret 108. The converter 100 may also include a plurality of secondary processing stations 112 on the base 104 and a secondary turret 114, which is rotatable relative to the base 104. A thermal imaging system 120 is coupled to the main turret 108 for rotation with the main turret 108. In embodiments, the thermal imaging system 120 includes a thermal imager 122 and a mirror 124.

A mounting apparatus 126 may be used to couple the thermal imaging system 120 to the main turret 108. The thermal imaging system 120 may be utilized to capture thermal images of the glass tube 102 as the glass tube 102 is indexed with the main turret between processing stations 106. From these thermal images, one or more temperatures or temperature profiles of the glass tube 102 may be extracted and used to study the converting process and/or incorporated into one or more process control methods for controlling the converter 100.

As schematically depicted in FIG. 1, the base 104 of the converter 100 is stationary and the processing stations 106 may be coupled to an upper portion 105 of the base 104. The plurality of processing stations 106 are spaced apart from one another and arranged in a main circuit 116. In one or more embodiments, the main circuit 116 may be circular so that the main turret 108 may index a glass tube 102 through the plurality of processing stations 106 by rotation of the main turret 108 about the central axis A. The type and/or shape of the article to be made from the glass tube 102 may influence the number of processing stations 106 coupled to the base 104. The number of processing stations 106 of the main turret 108 may be from 14 processing stations 106 to 32 processing stations 106. Although the converter 100 and converting process are described herein in the context of a converter 100 having sixteen processing stations 106 in the main circuit 116, it is understood that the converter 100 may have more or less than sixteen processing stations 106 in the main circuit 116. The processing stations 106 may include, by way of example and without limitation, one or more heating, forming, polishing, cooling, separating, piercing, measuring, feeding, or discharge stations or other processing stations for producing the glass articles from the glass tubes 102. The type and/or shape of the article to be made from the glass tube 102 may also influence the type of processing stations 106 and/or order of processing stations 106 of the converter 100.

The main turret 108 may be positioned above the base 104 and may be rotatably coupled to the base 104 so that the main turret 108 is rotatable about the central axis A relative to the base 104. A drive motor (not shown) may be utilized to rotate the main turret 108 relative to the base 104. The main turret 108 includes a plurality of holders 130, which are configured to removably secure each glass tube 102 to the main turret 108. The holders 130 may be clamps, chucks, or other holding devices, or combinations of holding devices. The holders 130 may orient each glass tube 102 so that the glass tube 102 is generally parallel to the central axis A of the main turret 108 and generally perpendicular to the upper portion 105 of the base 104. Although the converter 100 is described in this specification in the context of a vertically oriented converter 100, it should be understood that the converter 100 may be oriented horizontally or at an angle. Each of the holders 130 extend from a bottom portion 109 of the main turret 108 in a direction towards the base 104 (i.e., in the −Z direction relative to the coordinate axis in FIG. 1), and each holder 130 is oriented to position the glass tube 102 in or proximate to each of the successive processing stations 106 of the main circuit 116 of the base 104 as the main turret 108 is indexed about the central axis A. Vertical orientation of the glass tubes 102 allows a downward protruding portion of each glass tube 102 to be cycled progressively through the processing stations 106 of the main circuit 116. Each holder 130 may be individually rotatable relative to the main turret 108 about holder axis D, which may be generally parallel to the central axis A of the main turret 108. Each of the holders 130 may be operatively coupled to a motor (not shown), continuous drive belt, or other drive mechanism for rotation of each of the holders 130 relative to the main turret 108. Rotation of the holders 130 allows for rotation of the glass tube 102 relative to stationary burners, forming tools, cooling nozzles, or other features of the processing stations 106.

Figure 2:
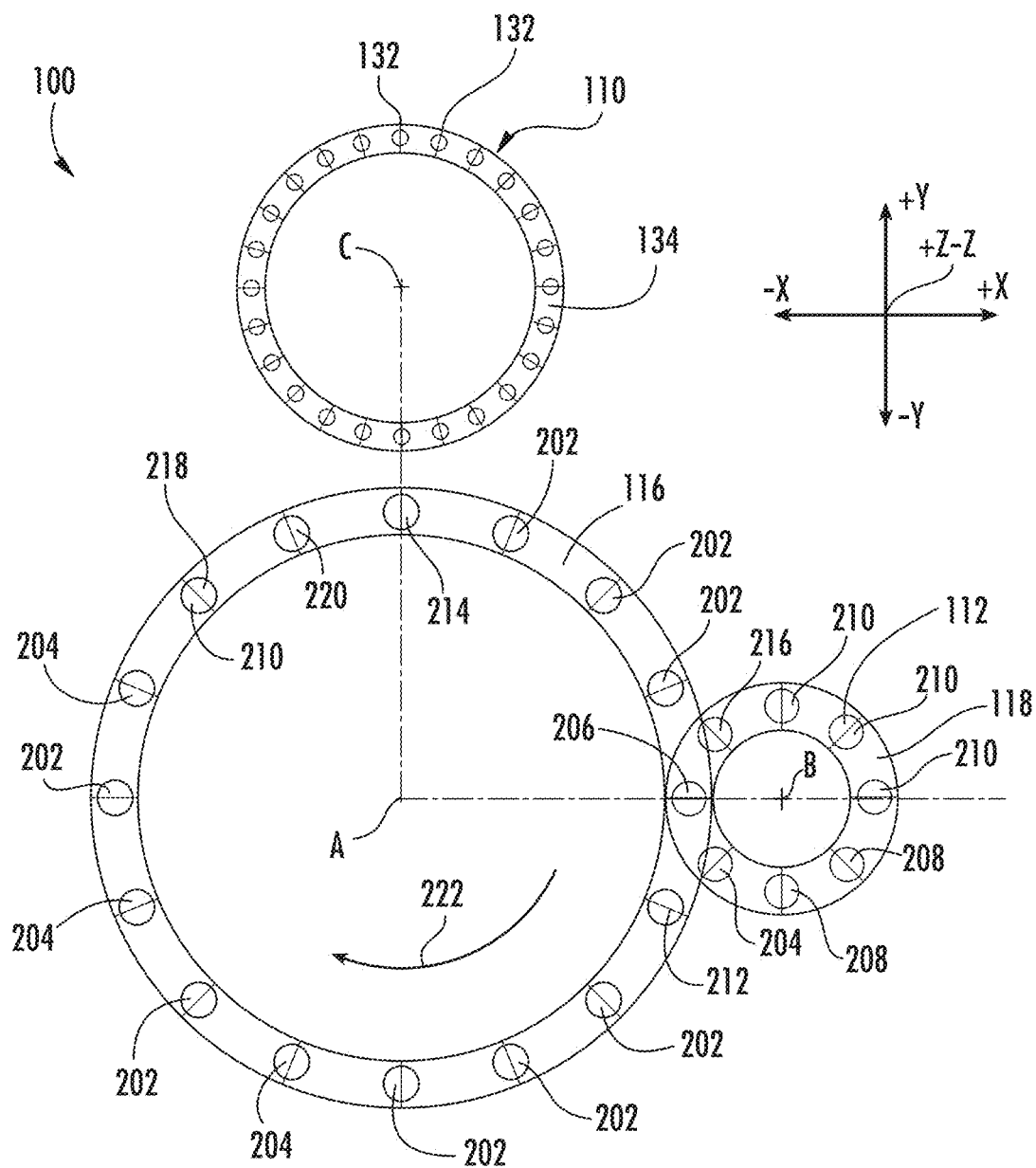
FIG. 2 schematically depicts a main turret, secondary turret, and feed turret of the glass tube converting machine of FIG. 1, according to one or more embodiments shown and described herein.

Referring to FIGS. 1 and 2, the converter 100 may have a plurality of secondary processing stations 112, which are also spaced apart and arranged in a secondary circuit 118 (FIG. 2), and a secondary turret 114 (FIG. 1) for indexing an article 103 (FIG. 1), which has been separated from the glass tube 102, through the plurality of secondary processing stations 112. The secondary turret 114 may be rotatable about a second axis B relative to the base 104. The second axis B may be generally parallel to central axis A of the main turret 108. The secondary turret 114 also includes a plurality of holders 130 to hold the glass articles 103 and position the glass articles 103 to engage with each of the secondary processing stations 112 in succession. The secondary turret 114 may receive the articles 103 from a separating station 206 (FIG. 2) of the main turret 108, index the articles 103 through the plurality of secondary processing stations 112 through rotation of the secondary turret 114, and discharge the finished articles from the converter 100.

The glass tube loading turret 110 is positioned above the main turret 108. In embodiments, the glass tube loading turret 110 may be offset from the central axis A of the main turret 108. The glass tube loading turret 110 may be rotatable about an axis C, which may be generally parallel to the central axis A of the main turret 108. The glass tube loading turret 110 may be independently supported in a stationary position relative to the main turret 108, and rotation of the glass tube loading turret 110 may be independent of the rotation of the main turret 108. Referring to FIGS. 1 and 2, in some embodiments, the glass tube loading turret 110 may include a plurality of loading channels 132 arranged in a circular circuit 134 and configured to hold glass tubes 102. The glass tube loading turret 110 may be positioned to orient one of the loading channels 132 into vertical alignment (i.e., aligned in a direction parallel to the central axis A of the main turret 108 and/or parallel to the Z axis of FIG. 1) with a processing station 106 of the main circuit 116 of the converter 100 and the corresponding holders 130 on the main turret 108 that are indexed through the processing station 106 of the main circuit 116. In one or more embodiments, the processing station 106 aligned with the glass tube loading turret 110 may be a tube loading station 214 (FIG. 2). When the converter 100 has converted all or a portion of the glass tube 102 at a specific holder position 136 into one or more articles, the glass tube loading turret 110 may deliver a new length of glass tube 102 through the top of the main turret 108 to the holder 130 at the holder position 136, when the holder position 136 indexes into alignment with the tube loading station 214 of the main circuit 116. In alternative embodiments, the converter 100 may include an arm (not shown) electromechanically movable between the main turret 108 and the glass tube loading turret 110. When the converter 100 has converted all or a portion of the glass tube 102 at a specific holder position 136, the arm may grab a new length of glass tube 102 from the glass tube loading turret 110 or other glass tube staging device and deliver the new length of glass tube 102 to the main turret 108 at the specific holder position 136. Other methods of delivery new lengths of glass tube 102 to the main turret 108 are contemplated.

Referring to FIG. 2, as previously described, the plurality of processing stations 106 of the converter 100 may include one or more heating stations 202, forming stations 204, separating stations 206, polishing stations 208, cooling stations 210, piercing stations 212, tube loading stations 214, discharge stations 216, measuring stations 218, tube length drop stations 220, or other stations and/or combinations of these stations. FIG. 2 schematically depicts the arrangement of the processing stations 106 for a converter 100 having a main circuit 116 of sixteen processing stations 106 and a secondary circuit 118 of eight secondary processing stations 112. As described, the processing stations 106 of the main circuit 116 are evenly spaced apart and evenly distributed about a circular circuit and the secondary processing stations 112 of the secondary circuit 118 are also evenly spaced apart and evenly distributed about a circular circuit. FIG. 2 also schematically depicts the glass tube loading turret 110 having a plurality of loading channels 132. In FIG. 2, the glass tube loading turret 110 is shown in a position spaced apart from the main circuit 116 for purposes of illustration. Although the glass tube loading turret 110 is depicted as having twenty-four loading channels 132, it is understood that the glass tube loading turret may have more or less than twenty-four loading channels 132.

The main circuit 116 of the converter schematically depicted in FIG. 2 may include one or more heating stations 202, a separating station 206, a flame pierce station 212, one or more forming stations 204, one or more cooling stations 210, a measuring station 218, a tube length drop station 220, and a tube loading station 214. With respect to the direction of indexing 222 of the main turret 108, the heating stations 202 may be positioned before the separating stations 206 and each of the forming stations 204 to preheat target regions of the glass tube 102 to a target temperature at which the target region of the glass tube 102 becomes plastically deformable and may effectively be shaped or cut without cracking or shattering the glass. At the separating station 206, the formed glass article 103 (FIG. 1) may be separated from the glass tube 102 (FIG. 1). The separating station 206 may also be the processing station 106 at which the partially formed glass article 103, once separated, is transferred to the secondary turret 114 (FIG. 1) to be indexed through the secondary circuit 118 of secondary processing stations 112. The piercing station 212 may be positioned on the main circuit 116 downstream of the separating station 206 in the direction of indexing 222 of the main turret 108. At the piercing station 212, an end of the glass tube 102 previously closed by the separating station 206 is pierced, thereby forming an opening in the glass tube 102.

The forming stations 204 of the main turret 108 may be positioned downstream of the piercing station 212 in the direction of indexing 222. At the forming stations 204, the glass tube 102 is iteratively shaped into the desired shape of the finished glass article. As noted above, one or more heating stations 202 may be positioned before each of the forming stations 204 to preheat target regions of the glass tube 102 to a temperature at which the glass tube may be formed. The forming stations 204 of the main turret 108 shape one end of the glass articles 103, and the forming stations 204 of the secondary turret 114 shape the other end of the glass articles 103. In one or more embodiments, the converter 100 may be used to produce vials from the glass tubes 102, and the forming stations 204 of the converter 100 may include one or more shoulder forming stations, one or more flange forming stations, and one or more flange finishing stations, with one or more heating stations 202 positioned before and between each of the forming stations 204. The main circuit 116 may further include a measuring station 218, at which a dimensioning system 1310 (FIG. 13) may be used to measure one or more dimensions of the glass tube 102, such as the diameter and thickness for example, and one or more dimensions of the features formed by the forming stations 204. Feature dimensions may include flange thickness, flange length, neck length, neck thickness, overall article length, other feature dimension, or combinations thereof. The measuring station 218 may be positioned directly after the last forming station 204 so that the dimensions are measured while the glass tube 102 is still at elevated temperature. Alternatively, the measuring station 218 may be positioned after one or more cooling stations 210 to measure the dimensions of the glass tube 102 and/or glass article at a lower temperature.

Still referring to FIG. 2, one or more cooling stations 210 may be positioned after the forming stations 204 in the direction of indexing 222 of the main turret 108. A tube length drop station 220 may be positioned after the forming stations 204, between the forming stations 204 and the separating station 206, to drop the partially formed glass tube 102 down, thereby positioning the glass tube 102 for cutting to a target length at the separating station 206. The main circuit 116 may also include a tube loading station 214 for loading a new length of glass tube 102 feedstock from the glass tube loading turret 110 to the main turret 108 (FIG. 1). In one or more embodiments, the tube loading station 214 may be incorporated into a cooling station 210. The tube loading station 214 may be positioned between the last forming station 204 and the separating station 206.

The forming stations 204 of the main turret 108 form features at a first end of the glass article 103. For example, the forming stations 204 may form the shoulder 142 and flange 144 at the top (first end) of a glass article 103 that is a vial or cartridge. Once the glass article 103 is separated from the glass tube 102 at the separating station 206, the glass article 103 is transferred to the secondary processing stations 112 of the secondary turret 114. The secondary processing stations 112 may include one or more forming stations 204 for forming a second end of the glass article 103, which is opposite the first end of the glass article 103. For example, the forming stations 204 of the secondary processing stations 112 may form one or more features at a bottom (second end) of the glass article 103 that is a vial.

The secondary processing stations of the secondary circuit may include one or more heating stations 202, forming stations 204, polishing stations 208, cooling stations 210, discharge stations 216, or other stations or combinations of secondary processing stations 112. In one or more embodiments, the secondary processing stations 112 of the secondary circuit 118 may be used to form one or more features of the glass article 103, such as a vial, ampoule, cartridge, or syringe, for example, at an end of the glass article 103 opposite the end formed by the main turret 108. For example, in some embodiments, the glass article 103 is a vial and the forming stations 204 of the secondary circuit 118 may form the bottom of the vial. Other features are also contemplated such as those features characteristic of ampoules, cartridges, syringes, and the like. The secondary circuit 118 may include one or more polishing stations 208 to finish the surface of the glass article. The secondary circuit 118 may further include a plurality of cooling stations 210 and the discharge station 216, at which station the finished glass article may be discharged from the converter 100.

The previous description of the processing stations 106 of the main circuit 116 and the secondary processing stations 112 of the secondary circuit 118 may represent a typical converter 100 for producing vials from the glass tube 102. However, it is understood that more or fewer processing stations 106 and secondary processing stations 112 may be utilized to make vials having different shapes or other glass articles, such as cartridges, syringes, ampoules, or other glass articles. Additionally, it is understood that the processing stations 106 and secondary processing stations 112 may be arranged in any of a number of different orders and/or configurations in order to produce differently shaped glass articles.

Referring now to FIG. 3A, a heating station 202 of the converter 100 is schematically depicted. Each of the heating stations 202 may include one or more heating elements 301. Examples of heating elements 301 may include, but are not limited to fuel burners, lasers such as $CO_2$ lasers for example, induction heaters, other heating devices, or combinations of these. In some embodiments, a laser may be used to heat the glass tube 102. As illustrated in FIG. 3A, in embodiments, the heating element 301 may include one or more burners 302, which are used to heat targeted regions of the glass tube 102 prior to a forming operation performed at the forming station 204 (FIG. 2) or separating operation performed at the separating station 206 (FIG. 2). Although FIG. 3A depicts a single burner 302, it is understood that more than one burner 302 may be employed in a single heating station 202. Each burner 302 may be fluidly coupled to a fuel supply 304, an oxygen supply 306, and, optionally, an air supply 308. Examples of fuels for the burner may include, but are not limited to hydrogen, hydrocarbon fuel gases such as methane, propane, and butane for example, other fuels, or combinations of these. Each burner 302 may include a fuel control valve 310 to control the mass flow rate of fuel gas to the burner 302. Each burner 302 may also include an oxygen control valve 312 to control the mass flow rate of oxygen to the burner 302. Each burner 302 may further include an air control valve 314 for optionally controlling a mass flow rate of air to the burner 302. The burner 302 combusts the fuel gas in the presence of oxygen and/or air to produce a flame that heats at least the target region of the glass tube 102.

The heat of the flame generated by the burner 302 may be increased or decreased by changing the mass flow rates of fuel gas, oxygen, and air to the burner 302 and by changing the ratio of fuel gas to oxygen and/or the ratio of fuel gas to air fed to the burner 302. One or more of the fuel control valve 310, oxygen control valve 312, or air control valve 314 may be adjusted to adjust the ratio of fuel to oxygen and/or air. The burners 302 may be continuously burning and the glass tubes 102 may be indexed into and out of contact with the flame produced by the burners 302 by rotation of the main turret 108 and/or the secondary turret 114 to index the glass tube 102 into and out of the heating station 202. While positioned at the heating station 202, each glass tube 102 may be rotated by the holder 130 about the holder axis D relative to the burner 302 so that the glass tube 102 may be evenly heated around the circumference of the glass tube 102 in the specific regions to be formed in downstream forming stations 204 (FIG. 2).

Referring now to FIG. 3B, a separation station 206 of the converter 100 is schematically depicted. The separating station 206 is positioned after one or more heating stations 202 in the direction of indexing 222 of the main turret 108. The heating stations 202 positioned before the separating station 206 heat the glass tube 102 to make the glass plastically deformable. The separating station 206 may include a separating tool 320. While the glass tube 102, which has been made plastically deformable by the previous heating stations 202, is rotated by the holder 130 about the holder axis D, the separating tool 320 may be engaged with the outer surface 140 of the glass tube 102 to cut the glass tube 102 to a target length, thereby separating an article 103 (FIG. 1) from the glass tube 102. Alternatively, in some embodiments, the separating station 206 may include a burner, such as a hydrogen/oxygen burner for example, and/or a laser, such as a $CO_2$ laser for example, for cutting the glass tube 102 to the target length and separating the article 103 from the glass tube 102. In other embodiments, the separating station 206 may include separating tools 320 and at least one of a hydrogen/oxygen burner or a laser. Once separated from the glass tube 102, the article 103 may be transferred to the secondary turret 114 (FIG. 1) or discharged from the converter 100.

Referring now to FIGS. 3C and 3D, examples of forming stations 204 of the converter 100 are schematically depicted. Each forming station 204 may include one or more forming tools 324 rotationally coupled to the forming station 204. The forming tools 324 may be rotatable relative to the base 104 (FIG. 1) about tooling axis E, which are generally parallel to the central axis A (FIG. 1) of the main turret 108 (FIG. 1). When indexed into the forming station 204, the glass tube 102, which has been heated in a prior heating station 202, is rotated by the holder 130. The rotatable forming tools 324 are engaged with the outer surface 140 of the glass tube 102. The forming tools 324 may be actuated into engagement with the outer surface 140 of the glass tube 102 by one or more actuators 326. The forming tools 324 are maintained in contact with the glass tube 102 at a tool pressure maintained by the actuators 326 for a contact time. Contact of the forming tools 324 with the outer surface 140 of the heated glass tube 102 forms the glass tube 102 into the desired shape. Upon expiration of the contact time, the actuators 326 withdraw the forming tools 324 from engagement with the glass tube 102. In one or more embodiments, the contact time may be different than a dwell time of the converter 100.

FIG. 3C schematically illustrates an embodiment of a forming station 204 for forming the shoulder 142 of a glass vial formed from the glass tube 102. FIG. 3D schematically depicts an exemplary embodiment of a forming station 204' for forming the flange 144 of a glass vial formed from the glass tube 102. The forming station 204' for forming the flange 144 comprises three forming tools 324a, 324b, and 324c. Two of the forming tools 324a and 324b contact the outer surface 140 of the glass tube 102 to form the outer contour of the flange 144. The third forming tool 324c contacts inner surface of the glass tube 102 radially inward of the flange 144 to form the inner diameter of the glass tube 102 at the flange 144. The third forming tool 324c also contacts the axial end of the glass tube 102 to form the axial surface of the flange 144. In embodiments, the third forming tool 324c may be stationary and the glass tube 102 rotated about the third forming tool 324c by the holder 130. In embodiments, a thin layer of lubricant, such as oil for example, may be disposed between the glass tube 102 and the third forming tool 324c to separate the glass tube 102 from making contact with the third forming tool 324c. Although described relative to forming the structures of a vial, the forming stations 204 may be configured to form other structures, such as the shoulder, neck, or tapered tip of an ampoule for example, or any other structure associated with articles other than glass vials.

Figure 3E:
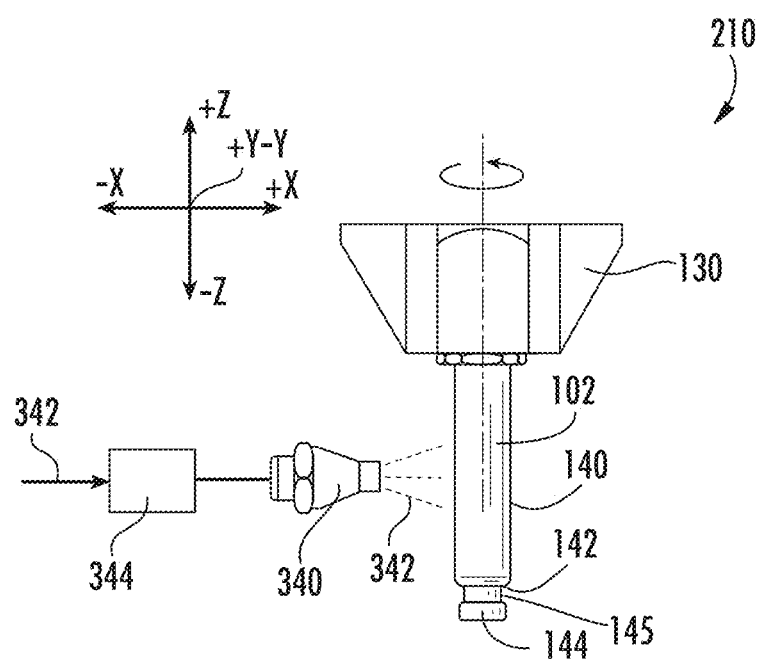
FIG. 3E schematically depicts a cooling station of the converter of FIG. 1, according to one or more embodiments shown and described herein.

FIG. 3E schematically depicts a cooling station 210 having one or more cooling nozzles 340 positioned to direct a cooling fluid 342, such as chilled air or an inert gas for example, towards the glass tube 102. One or more of the cooling nozzles 340 may be positioned to direct the cooling fluid 342 to specific regions of the glass tube 102. One or more cooling fluid control valves 344 may be fluidly coupled to the cooling nozzles 340 to control the mass flow rate of cooling fluid 342 to the cooling nozzles 340, which enable control of the rate of cooling of the glass tube 102 as well as the temperature of the glass tube 102 and temperature gradients in the glass tube 102.

FIGS. 3A-3E include schematic illustrations of several different examples of processing stations 106 that may be utilized in the converter 100. However, it should be understood that other processing stations 106 having different structures, combinations of structures, or functions, may be utilized to achieve the desired conversion of the glass tube 102 into one or more glass articles.

Referring again to FIG. 2, in operation, the main turret 108 indexes the glass tubes 102, which are secured in the holders 130, into a processing station 106. A specific operation, such as heating, forming, piercing, separating, cooling, dropping, feeding, etc., is performed on the glass tubes 102 at each of the processing stations 106. A dwell time is the time that the glass tube 102 spends in a particular processing station 106 before being indexed by the main turret 108 to the next subsequent processing station 106. The converter 100 may be tuned so that all of the processing stations 106 complete their operations within the dwell time. At the end of the dwell time, the main turret 108 indexes the glass tubes 102 to the next processing stations 106. The index time refers to the time that it takes for the main turret 108 to index the glass tubes 102 from one processing station 106 to the next processing station 106 and is measured in units of time. The total time per part per station, as used in this disclosure, is the sum of the dwell time and the index time. The part rate (production rate) is the number of parts produced per unit of time and is the inverse of the total time per part per station. In embodiments, the index time of the main turret 108 may be up to 25% of the total time per part per station.

Examples of converters 100 for converting glass tube 102 into glass vials include the Vial Forming Machine Model RP16 with Automatic Tube Feeder manufactured by AMBEG Dr. J. Dichter GmbH, which includes sixteen processing stations 106 in the main circuit 116 and eight secondary processing stations 112. Other examples include the Vial Forming Machine Model RP32 manufactured by AMBEG Dr. J. Dichter GmbH, which has thirty-two processing stations 106 in the main circuit 116 and two secondary circuits 118 with eight secondary processing stations 112 in each secondary circuit 118, and the Zeta 098 Vial Forming Machine manufactured by Euromatic S.R.L., which has 36 processing stations 106. Another example may include the Zeta 103 Cartridge Forming Machine manufactured by Euromatic S.R.L., which is a converter for converting glass tube 102 into cartridges. The cartridge converter has similar characteristics to the previously described vial converters 100 but is utilized to produce glass articles having a cartridge form factor rather than a vial.

Although described in the context of a converter 100 for producing glass vials from glass tube 102, it should be understood that the converter 100 may be configured to produce one or more other articles, such as cartridges, syringes, ampoules, or other glass articles, by changing the forming tools 324 and/or the order or configuration of processing stations 106 in the main circuit 116 or secondary processing stations 112 in one or more secondary circuits 118.

Figure 4:
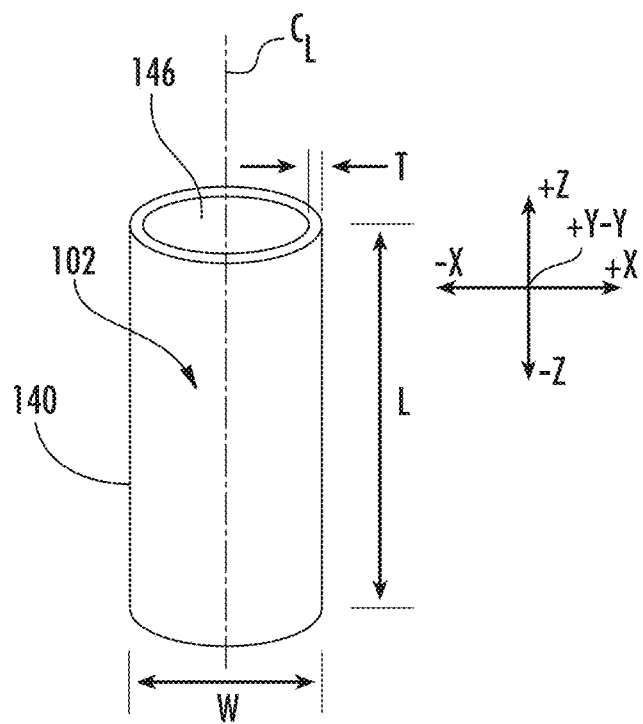
FIG. 4 is a perspective view of a glass tube prior to conversion in the converter of FIG. 1, according to one or more embodiments shown and described herein.

A typical converter 100 for producing articles from glass tube 102 may operate at production rates of from 30 parts per minute to 50 parts per minute. At these production rates, thermal gradients within the glass tube 102 are extremely high and dynamic. It is typical for a short length of glass tube 102 to be heated from 200° C. to 1500° C. within a time period from 2 seconds to 4 seconds. Specifically, the heated length of glass tube 102 may experience temperature gradients along a length of the tube of up to 100° C./minute, or up to 200° C./minute. Referring to FIG. 4, for the glass tube 102, the length L is measured in the +Z/−Z direction of the reference axis provided in FIG. 4. These large temperature gradients along the length L of the glass tube 102 help facilitate precise dimensional control of the thermal separation within a converter 100 and precise control of, for example, the thickness of the bottom of the glass article as well as control over the contours of the glass article.

Rapid heating of the glass tube 102 in one or more processing stations 106 may also induce maximum temperature gradients through the thickness T of the heated glass tube 102. These temperature gradients may be, for example and without limitation, from 200° C./min to 300° C./min. Similar or higher temperature gradients may be induced during forming processes in forming stations 204 for forming the shoulder 142 and flange 144 of a vial. These high thermal gradients induced along the length L and through the thickness T of the glass tube 102 during conversion are important for understanding the dynamics of the conversion process but are only modestly understood within the capabilities of current commercially available converters 100.

Figure 5:
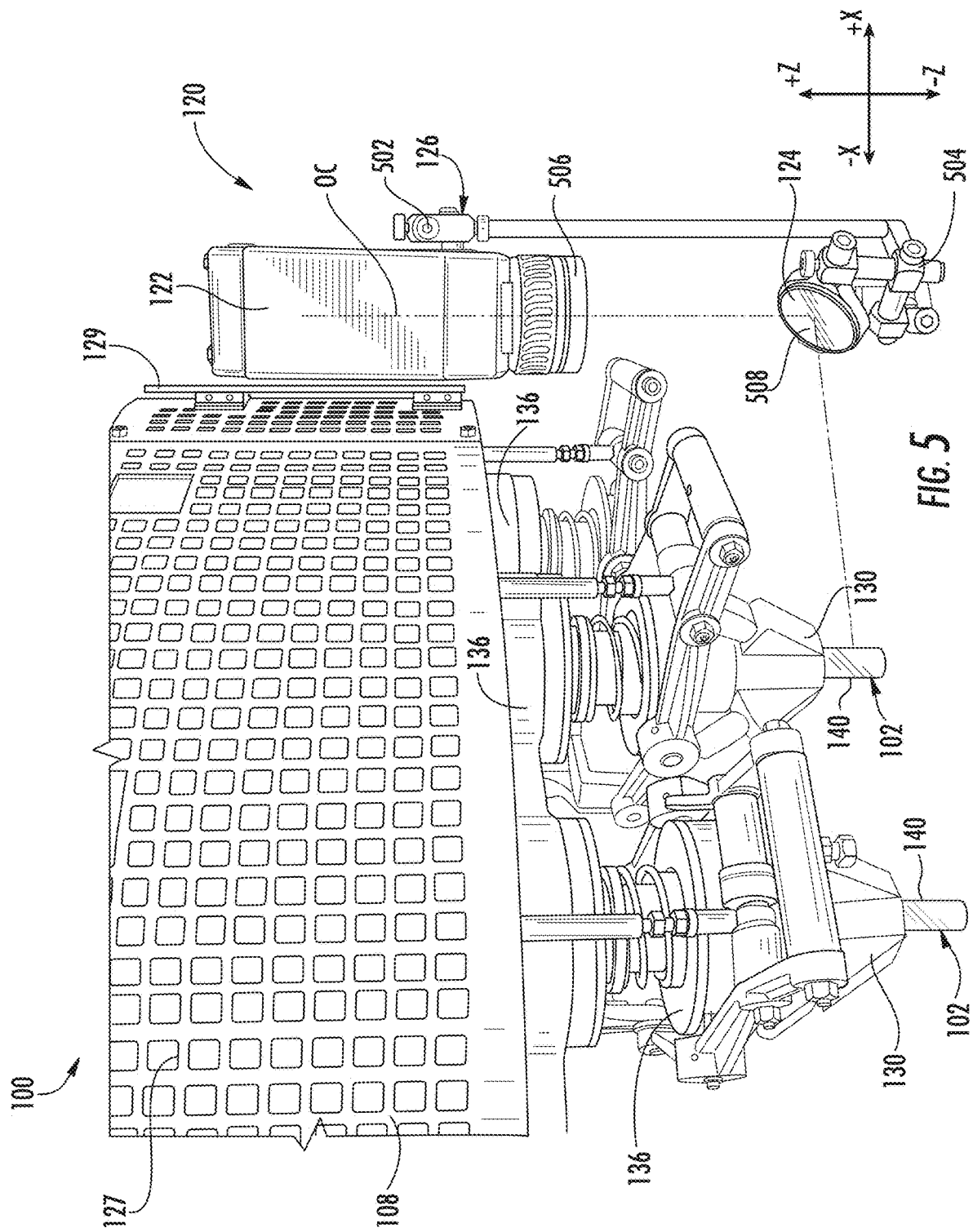
FIG. 5 schematically depicts a thermal imaging system of the converter of FIG. 1, according to one or more embodiments shown and described herein.
Figure 6:
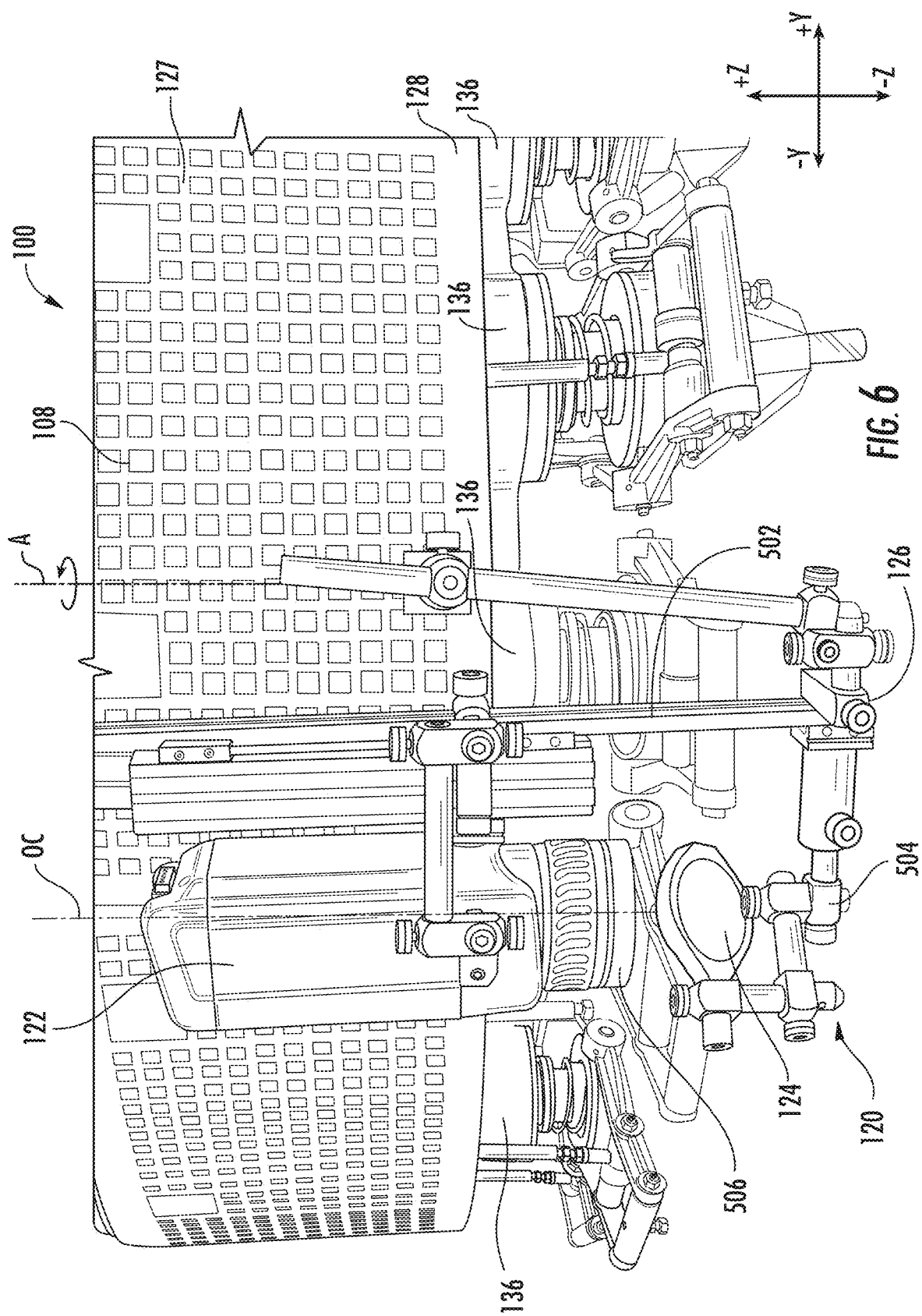
FIG. 6 schematically depicts the thermal imaging system of FIG. 5, according to one or more embodiments shown and described herein.

Referring now to FIGS. 5-6, embodiments of the converter 100 described herein may utilize a thermal imaging system 120 to provide and/or enhance automated control of the converter 100 and the conversion process. The thermal imaging system 120 may be employed to measure one or more surface temperatures of the glass tube 102 during the conversion process. The thermal imaging system 120 includes the thermal imager 122 and the mounting apparatus 126 for mounting the thermal imager 122 to the main turret 108. In embodiments, the thermal imaging system 120 may also include one or more mirrors 124 coupled to the thermal imager 122 by the mounting apparatus 126. The mirror 124 may enable the thermal imager 122 to be oriented generally vertically to reduce the spatial footprint of the converter 100. The thermal imaging system 120 is mounted to the main turret 108 so that the thermal imaging system 120 rotates with the main turret 108 and travels with the glass tube 102 through each of the processing stations 106 (FIG. 1) of the converter 100. By traveling with the glass tube 102 through each of the successive processing stations 106, the thermal imaging system 120 may be used to develop temperature profiles of the glass tube 102 throughout the entire converting process from glass tube to finished glass article. The temperature profiles may be used to identify, study, and control temperature gradients from one processing station 106 to the next.

In embodiments, the thermal imager 122 may be a 2-dimensional infrared thermal imaging camera capable of capturing light having wavelengths in the infrared spectrum. In particular, in some embodiments, the thermal imager 122 may be capable of receiving long wave infrared light having wavelengths from 4 microns to 14 microns, from 4 microns to 10 microns, from 4 microns to 8 micron, from 4 microns to 7 microns, from 5 microns to 14 microns, from 5 microns to 10 microns, from 5 microns to 8 microns, from 5 microns to 7 microns, from 7 microns to 14 microns, from 7 microns to 10 microns, or from 7 microns to 8 microns. Infrared light includes a broad spectrum of wavelengths from 700 nanometers (nm) to 1 millimeter. However, longer wavelengths of infrared light are generally indicative of the infrared light emitted by the outer surface 140 of the glass tube 102, which is the surface that is directly heated. Shorter wavelengths of infrared light of from 700 nm to about 4 microns may be at least partially transmitted through glass composition of the glass tube 102. Thus, shorter wavelength infrared light received by the thermal imager 122 may have been emitted by internal portions of the glass tube 102 or by external structures positioned behind the glass tube 102 relative to the position of the thermal imager 122. The shorter wavelengths of infrared light less than about 4 microns are not therefore indicative of a surface of the glass tube 102. At long wavelengths of infrared light, such as infrared light having wavelengths greater than about 14 microns, at least a portion of the infrared light having long wavelengths emitted from a surface of the glass tube 102 may be reflected away from the thermal imaging system. Glass compositions of the glass tubes 102 converted by the converter 100 exhibit low transmission and low reflectivity of infrared light having wavelengths of from 4 microns to 14 microns and, thus, exhibit greater emissivity of infrared light in this wavelength range. For example, the glass tubes 102 exhibit 0% transmission and only 3% reflectivity of infrared light having wavelength of about 5 microns. Thus, the emissivity of infrared light having wavelengths of about 5 microns from the glass tube 102 is about 97%. In another example, the reflectivity of infrared light having wavelengths of about 7.5 microns from the glass tube 102 is about 10% and the emissivity is 90%. Capturing infrared light having wavelengths in a range of from about 4 microns to about 14 microns, such as from 4 microns to 7.5 microns, or about 5 microns, may reduce errors in the surface temperature measurements by avoiding integration of the temperature gradient through the thickness of the glass tube 102. Transmission of infrared light through the glass tube 102 and reflectivity of the infrared light from the glass tube 102 introduce errors in the thermal image data captured by the thermal imager 122. Thermal imagers 122 capable of capturing infrared light having wavelengths of from 4 micron to 14 micron may exhibit enhanced temperature accuracy of the thermal images obtained with the thermal imager 122. In one or more embodiments, the thermal imager 122 may have an object temperature range of from 100° C. to 2000° C., or from 300° C. to 2000° C.

The thermal imager 122 may have an image capture rate of at least 30 Hertz (Hz). In some embodiments, the thermal imager 122 may have an image capture rate of from 30 Hertz (Hz) to 60 Hz, or from 30 Hz to 50 Hz. Additionally, the thermal imager 122 may be compliant with one or more interface protocols, such as GigE Vision for example, to enable the imager to communicate with and transfer data high-speed imaging data over an Ethernet connection to one or more image analysis systems having image analysis software, such as LabVIEW™ distributed by National Instruments, for example. The thermal imager 122 may have an internal temperature sensor (not shown) integrated with a self-calibration system to allow the thermal imager 122 to measure the temperature of the infrared sensor suite and adjust image data to compensate for changes in temperature of the thermal imager 122.

As previously noted, the thermal imager 122 is mounted to the main turret 108 of the converter 100 using the mounting apparatus 126. Referring to FIG. 6, the mounting apparatus 126 may attach to an outer portion 128 of the main turret 108 so that the mounting apparatus 126 and the thermal imager 122 rotate with the main turret 108. In embodiments, the main turret 108 of the converter 100 may be enclosed in a housing, such as steel mesh housing 127. In these embodiments, the steel mesh housing 127 is the outer portion 128 of the main turret 108. The mounting apparatus 126 may be mounted to the steel mesh housing 127 with a rail support system 129 (FIG. 5). In some embodiments, the mounting apparatus 126 may allow for temporary removal of the thermal imager 122 and/or the mirror 124 from the main turret 108 of the converter 100.

The mounting apparatus 126 positions the thermal imager 122 and the mirror 124 at a fixed angular position 138 on the main turret 108 so that the thermal imager 122 and mirror 124 follow a single holder 130 and glass tube 102 through an entire cycle of the converter 100. The mounting apparatus 126 may include an imager support 502 and a mirror support 504. The thermal imager 122 may be removably coupled to the imager support 502. The imager support 502 may be adjustable in one or more directions to orient the thermal imager 122 with respect to the holder 130 and/or glass tube 102. For example, the imager support 502 may include vertical adjustment (i.e., up or down parallel with the central axis A of the main turret 108), radial adjustment relative to the main turret 108 (i.e., to move the thermal imager 122 closer to or farther from the outer portion 128 of the main turret 108), angular adjustment (i.e., to adjust the angular position of thermal imager 122 relative to one of the holders 130), rotational adjustment (i.e., rotationally adjusting the camera to change an angle formed between the optical centerline OC of the camera and the X-Y plane of the axes in FIG. 6), or other adjustment.

In some embodiments, the imager support 502 may be configured to position the thermal imager 122 to directly capture an image of the glass tube 102 as it is being processed. In this configuration, the optical centerline OC of the thermal imager 122 may be aligned in the X-Y plane of the coordinate axes of FIGS. 5 and 6. However, in a typical converter 100, space around the processing stations 106 of the main circuit 116 and/or the secondary processing stations 112 of the secondary circuit 118 is limited and positioning the thermal imager 122 so that the optical centerline OC of the thermal imager 122 is in the X-Y plane and is radially aligned with a glass tube 102 causes the thermal imager 122 to extend radially outward from the main turret 108. This may cause the thermal imager 122 and/or the mounting apparatus 126 to contact parts of the converter 100 or interfere with the operation of the converter 100 when the thermal imager 122 rotates with rotation of the main turret 108. Additionally, in this configuration, the thermal imager 122 would extend radially outward from the rotating main turret 108, which may create a hazardous condition during operation.

To avoid these spatial issues, in some embodiments, the imager support 502 may be adjustable to orient the thermal imager 122 so that the optical centerline OC of the thermal imager 122 forms a non-zero angle relative to the X-Y plane of the coordinate axes of FIGS. 5 and 6. In one or more embodiments, the thermal imager 122 may be positioned so that the optical centerline OC of the thermal imager 122 is parallel to the central axis A of the main turret 108 (i.e., generally perpendicular to the X-Y plane of the coordinate axes of FIGS. 5 and 6). Alternatively, the thermal imager 122 may be positioned so that the optical centerline OC forms a non-zero angle of less than 90° relative to the axial plane of the main turret 108. Mounting the thermal imager 122 at a non-zero angle relative to the axial plane of the main turret 108 may help to avoid interfering with operation of the converter 100 and/or creating a hazardous condition.

The mirror support 504 may be coupled to the imager support 502 and may position the mirror 124 to reflect infrared light from the glass tube 102 towards the lens 506 of the thermal imager 122. In embodiments, the mirror support 504 may position the mirror 124 in alignment with the optical centerline OC of the thermal imager 122. In one or more embodiments, the mirror support 504 may allow for one or more of vertical (i.e., along the +Z/−Z axis of the coordinate axes of FIGS. 5 and 6), radial, angular, rotational, or other directional adjustment of the mirror 124 relative to the thermal imager 122.

Referring to FIG. 5, the mirror 124 may be coupled to the mounting apparatus 126 and positioned within a field of view of the thermal imager 122 so that the mirror 124 reflects infrared light towards the lens 506 of the thermal imager 122. In one or more embodiments, the mirror 124 may be positioned so that the optical centerline OC of the thermal imager 122 intersects the reflective surface 508 of the mirror. Alternatively, the mirror 124 may be positioned within the field of view of the thermal imager 122 so that the reflective surface 508 reflects infrared light to the lens 506, but the optical centerline OC of the thermal imager 122 does not intersect the reflective surface 508 of the mirror 124. The mirror 124 may be angled relative to the optical centerline OC of the thermal imager 122 to reflect infrared light emitted from the outer surface 140 of the glass tube 102 at a specific holder position 136 to the thermal imager 122. Referring to FIG. 7, generally, the mirror 124 is angled so that the reflective surface 508 of the mirror 124 forms a non-zero angle α with the optical centerline OC of the thermal imager 122 that is less than 90°. In other words, the reflective surface 508 of the mirror 124 may be angled so that the reflective surface 508 is not perpendicular to the optical centerline OC of the thermal imager 122. In one or more embodiments, the mirror 124 may be positioned to reflect infrared light from the holder position 136 that is located directly radially inward from the thermal imager 122 relative to the central axis A of the main turret 108 to the thermal imager 122. Alternatively, in other embodiments, the mirror 124 may be positioned to reflect infrared light from a holder position 136 that is one or more positions clockwise or counterclockwise from the position of the thermal imager 122 (i.e., one or more positions forward/ upstream of or backward/downstream of position where the thermal imager 122 is attached to the main turret 108). While specific orientations of the mirror 124 and the thermal imager 122 have been described herein, it should be understood that the mirror 124 and the thermal imager 122 could be positioned and oriented in any of a number of configurations depending on the configuration of the particular converter 100.

Figure 17:
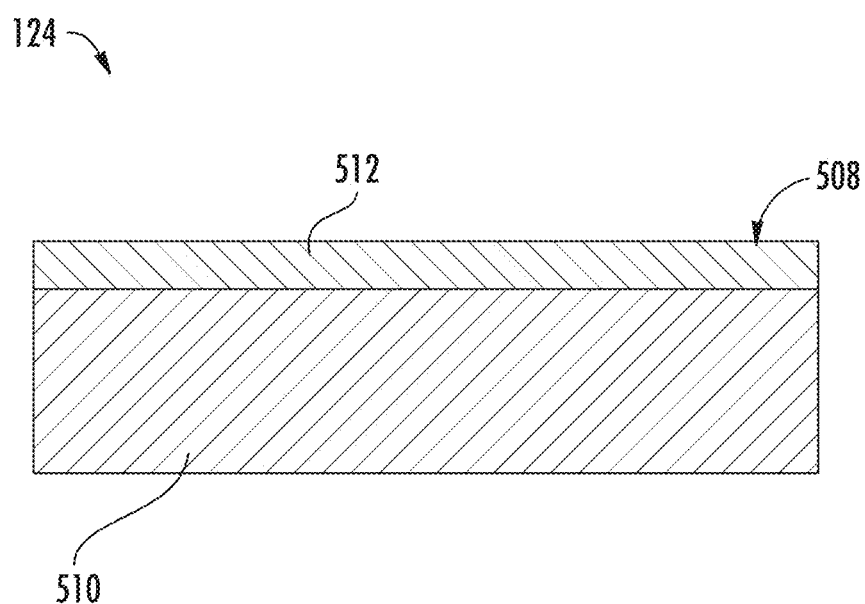
FIG. 17 schematically depicts a cross-sectional view of a mirror of a thermal imaging system of the converter of FIG. 1, according to one or more embodiments shown and described herein.

In embodiments, the reflective surface 508 of the mirror 124 may be highly reflective of infrared light. In one or more embodiments, the reflective surface 508 of the mirror 124 may have an average reflectance of greater than or equal to 96%, greater than or equal to 97% or greater, greater than or equal to 98%, or greater than or equal to 99% of infrared light having wavelengths from 4 microns (µm) to 14 µm. In one or more embodiments, the reflective surface 508 of the mirror 124 may have an average reflectance of greater than or equal to 96% for light having wavelengths from 4 µm to 14 µm. Referring to FIG. 17, the mirror 124 may include a mirror base 510 and a reflective coating 512 applied to the mirror base 510 to create the reflective surface 508. The mirror base 510 may be thermally stable to avoid distorting the image. In embodiments, the mirror base 510 may be quartz, such as fused quartz for example. In some embodiments, the reflective coating 512 may be a gold coating, for example.

Figure 7A:
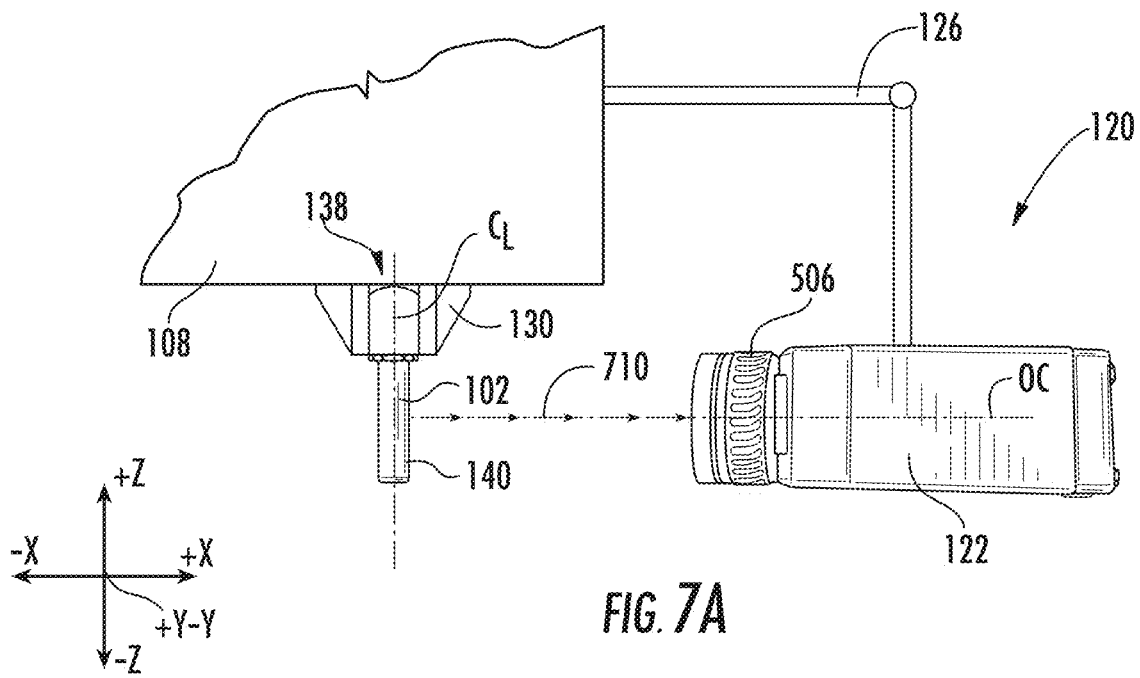
FIG. 7A schematically depicts operation of a thermal imager of the thermal imaging system of FIG. 5, according to one or more embodiments shown and described herein.

Referring to FIG. 7A, as previously described, in some embodiments, the thermal imager 122 may be positioned to directly receive infrared light emitted from the outer surface 140 of the glass tube 102 at a specific holder position 135 of the main turret 108. In particular, the thermal imager 122 may be positioned such that infrared light emitted from the outer surface 140 of the glass tube 102 travels along pathway 710 directly to the lens 506 of the thermal imager 122 without being reflected by a mirror, such as mirror 124. The thermal imager 122 receives the infrared light emitted by the outer surface 140 of the glass tube 102 and captures a thermal image representative of the wavelengths and intensities of the infrared light received by the thermal imager 122. The thermal imager 122 travels with the main turret 108 so that the thermal imaging system 120 captures thermal image data of the outer surface 140 of the glass tube 102 at the specific holder position 136 as the glass tube 102 is indexed through each of the successive processing stations 106 (FIG. 1). Capturing thermal image data from infrared light emitted by the outer surface 140 of the glass tube 102 may enable profiling of the temperature of the outer surface 140 of the glass tube 102 as a function of time throughout the converting process.

Figure 7B:
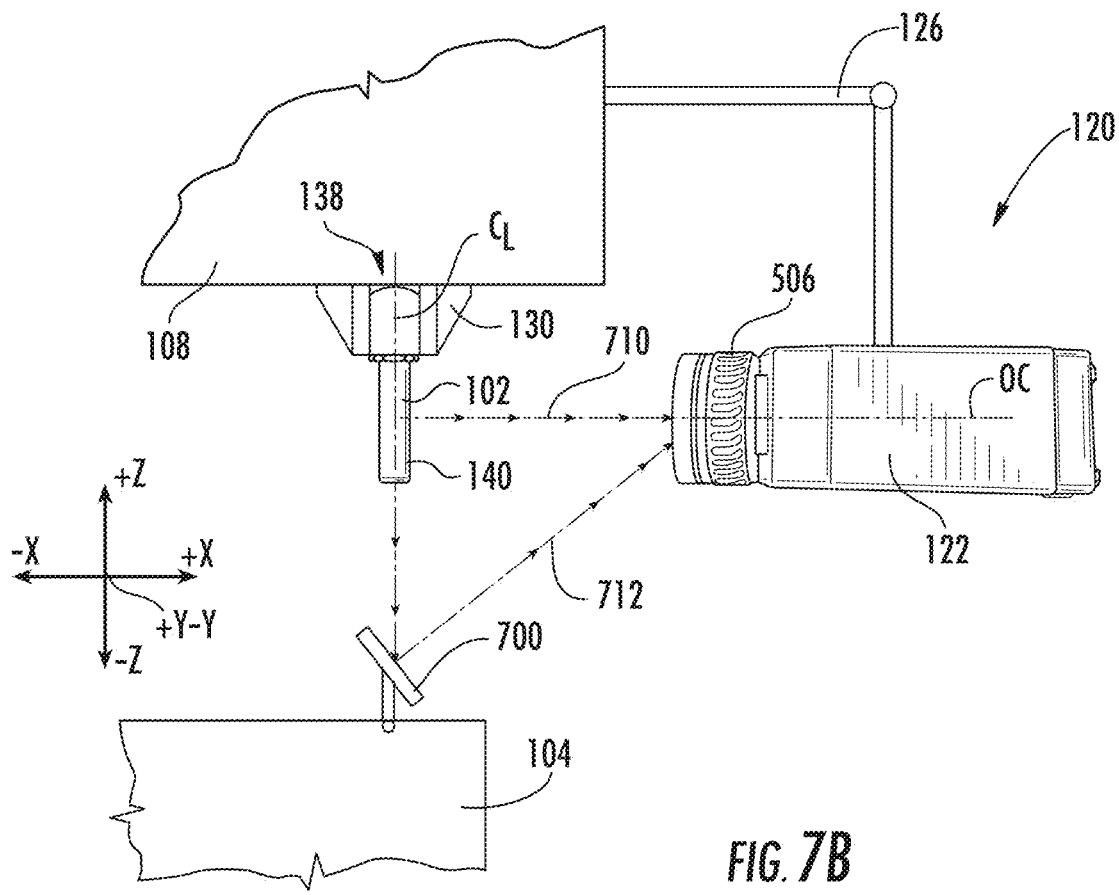
FIG. 7B schematically depicts operation of the thermal imager and a stationary mirror of the thermal imaging system of FIG. 5, according to one or more embodiments shown and described herein.

Referring to FIG. 7B, in embodiments, the thermal imager 122 may be positioned to directly receive infrared light emitted by the outer surface 140 of the glass tube 102. Additionally, one or more stationary mirrors 700 may be coupled to the base 104 of the converter 100 at a processing station 106 to reflect infrared light emitted by an inner surface 146 of the glass tube 102 to the thermal imager 122. In some embodiments, each of the stationary mirrors 700 may be positioned vertically lower than the processing station 106 (i.e., in the −Z direction of the coordinate axes of FIG. 7B relative to the processing station 106). Positioning the stationary mirror 700 vertically lower than the processing station 106 enables the stationary mirror 700 to reflect infrared light emitted by the inner surface 146 (FIG. 4) of the glass tube 102 towards the lens 506 of the thermal imager 122 when the thermal imager 122 is indexed into position at the processing station 106. Reflecting infrared light emitted from the inner surface 146 of the glass tube 102 toward the thermal imager 122 may enable the thermal imaging system 120 to profile or determine temperatures of the inner surface 146 of the glass tube 102. The infrared light emitted from the inner surface 146 of the glass tube 102 may travel along pathway 712, which extends in a generally downward direction (i.e., in the −Z direction of the coordinate axes of FIG. 7B) from the inner surface 146 of the glass tube 102 and reflects off of the stationary mirror 700 towards the lens 506 of the thermal imager 122. Since the thermal imager 122 is coupled to the main turret 108 and rotates with the main turret 108, the thermal imager 122 only passes into position to receive the infrared light emitted by the inner surface 146 of the glass tube 102 and reflected from a specific stationary mirror 700 once per cycle of the main turret 108 through the main circuit 116 of processing stations 106. In embodiments, stationary mirrors 700 may be positioned at a plurality of the processing stations 106 so that the thermal imager 122 may capture thermal image data from the inner surface 146 of the glass tube 102 at a plurality of the processing stations 106 during each cycle of the main turret 108.

Figure 7C:
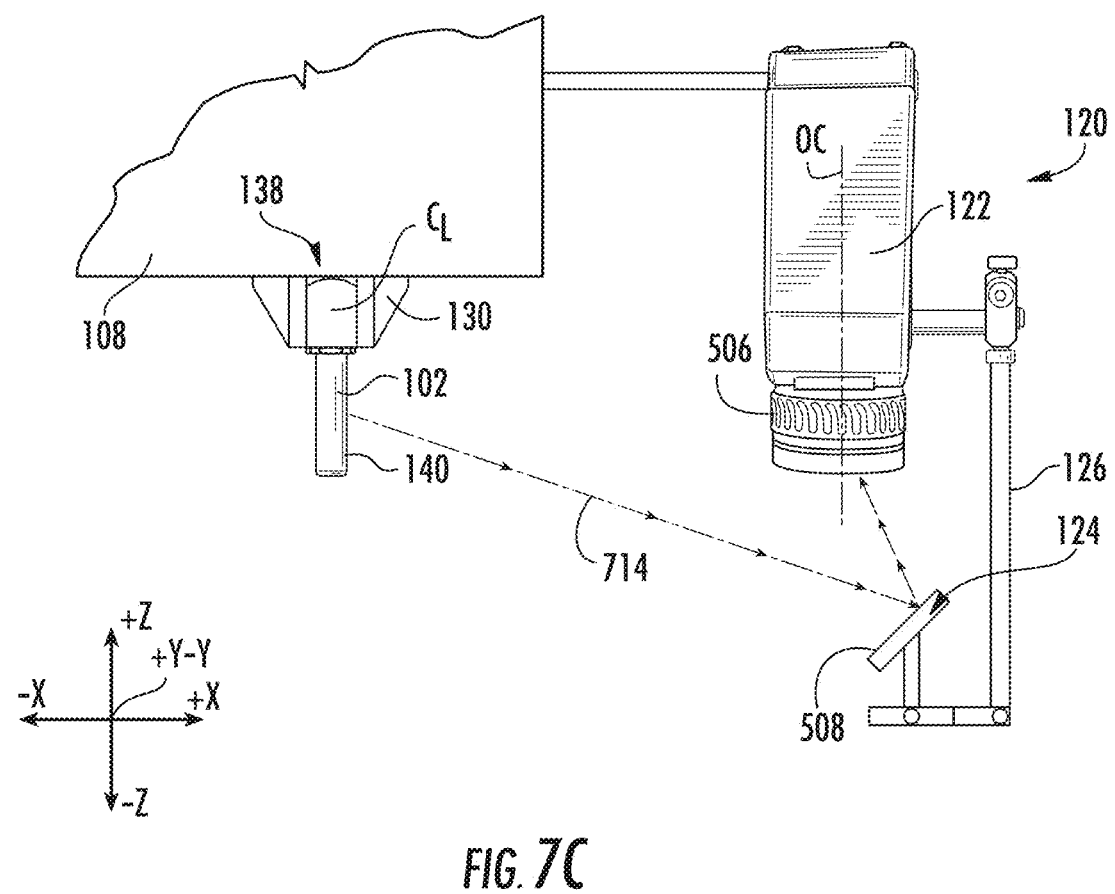
FIG. 7C schematically depicts operation of the thermal imager and a mirror of the thermal imaging system of FIG. 5, according to one or more embodiments shown and described herein.
Figure 7D:
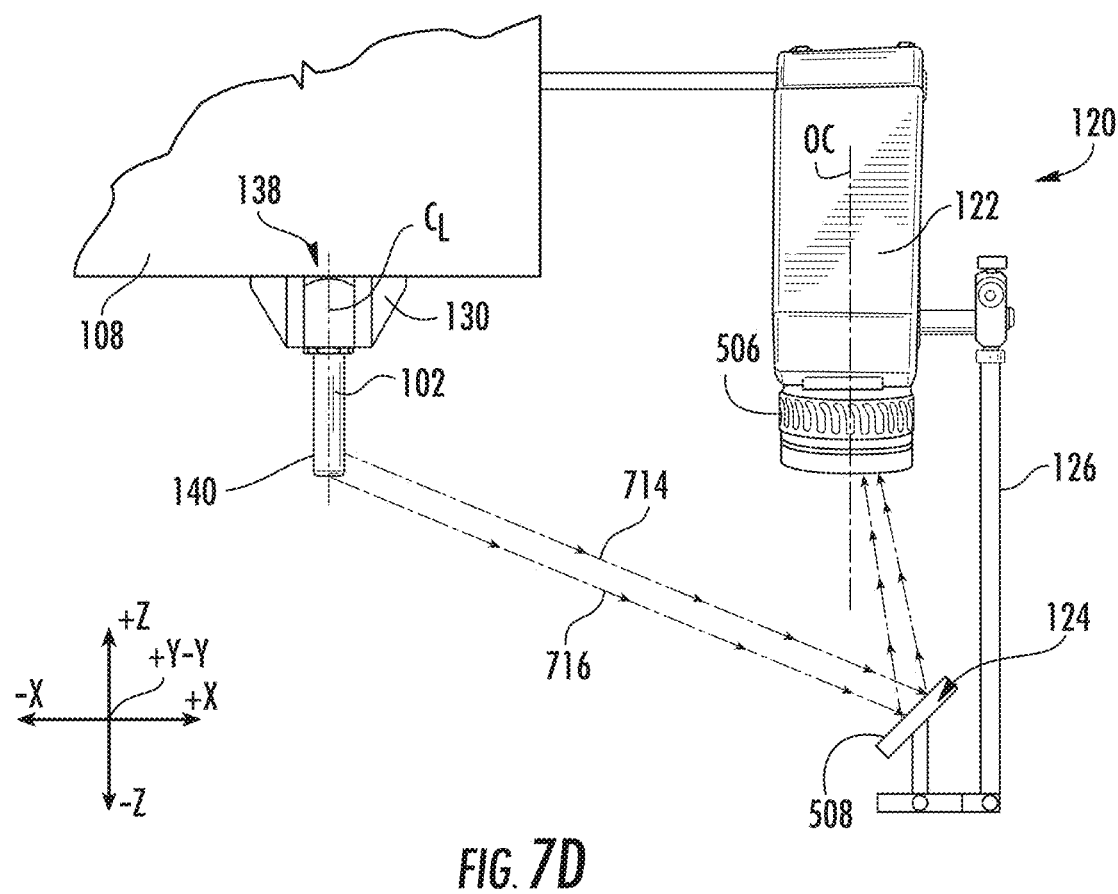
FIG. 7D schematically depicts alternative operation of the thermal imager and the mirror of the thermal imaging system of FIG. 7C, according to one or more embodiments shown and described herein.

Referring to FIG. 7C, as previously described, the thermal imager 122 may be positioned so that the lens 506 of the thermal imager 122 is not oriented to receive infrared light directly from the outer surface 140 of the glass tube 102. The thermal imager 122 is shown in FIG. 7C as being generally vertically oriented (i.e., in the +/−Z direction of the coordinate axes of FIG. 7C). In embodiments, the thermal imager 122 may be oriented such that the optical centerline OC of the thermal imager 122 is generally parallel to the centerline CL of the glass tube 102. As previously described, the mounting apparatus 126 may enable the thermal imager 122 to be rotated, tilted or angled relative to the centerline CL of the glass tube 102. The mirror 124 is coupled to the mounting apparatus 126 so that the mirror 124 travels with the thermal imager 122 as the main turret 108 indexes through the processing stations 106. The mirror 124 may be positioned to reflect infrared light from the outer surface 140 of a glass tube 102 towards the lens 506 of the thermal imager 122. In this configuration, the mirror 124 and the thermal imager 122 both travel with the main turret 108 so that the thermal imaging system 120 captures thermal image data of the outer surface 140 of the glass tube 102 at the specific holder position 136 as the glass tube 102 is rotated to and between each of the successive processing stations 106 (FIG. 1). In particular, the mirror 124 may be positioned to reflect infrared light emitted radially outward by the outer surface 140 of the glass tube 102 to the thermal imager 122, which receives the infrared light reflected from the mirror 124 and captures a thermal image representative of the wavelengths and intensities of the infrared light received by the thermal imager 122. The infrared light travels along pathway 714 outward from the outer surface 140 of the glass tube 102 and reflects off of the mirror 124 towards the lens 506 of the thermal imager 122.

Referring now to 7D, the mirror 124 may be positioned to reflect infrared light emitted by the outer surface 140 of the glass tube 102 and infrared light emitted by the inner surface 146 of the glass tube 102 towards the lens 506 of the thermal imager 122. The infrared light emitted from the outer surface 140 of the glass tube 102 travels along pathway 714 outward from the outer surface 140 of the glass tube 102 and reflects off of the mirror 124 towards the lens 506 of the thermal imager 122. The infrared light emitted from the inner surface 146 travels along pathway 716 from the inner surface 146 of the glass tube 102 to the mirror 124 and is reflected by the mirror 124 towards the lens 506 of the thermal imager 122. Since the mirror 124 travels with thermal imager 122 as it is indexed through the plurality of processing stations 106, the mirror 124 may enable the thermal imager 122 to capture thermal image data from the outer surface 140 and the inner surface 146 of the glass tube 102 at each of the processing stations 106. In embodiments, the thermal imager 122 may capture thermal image data from the outer surface 140 and the inner surface 146 of the glass tube 102 simultaneously, such as in a single thermal image for example.

Figure 7E:
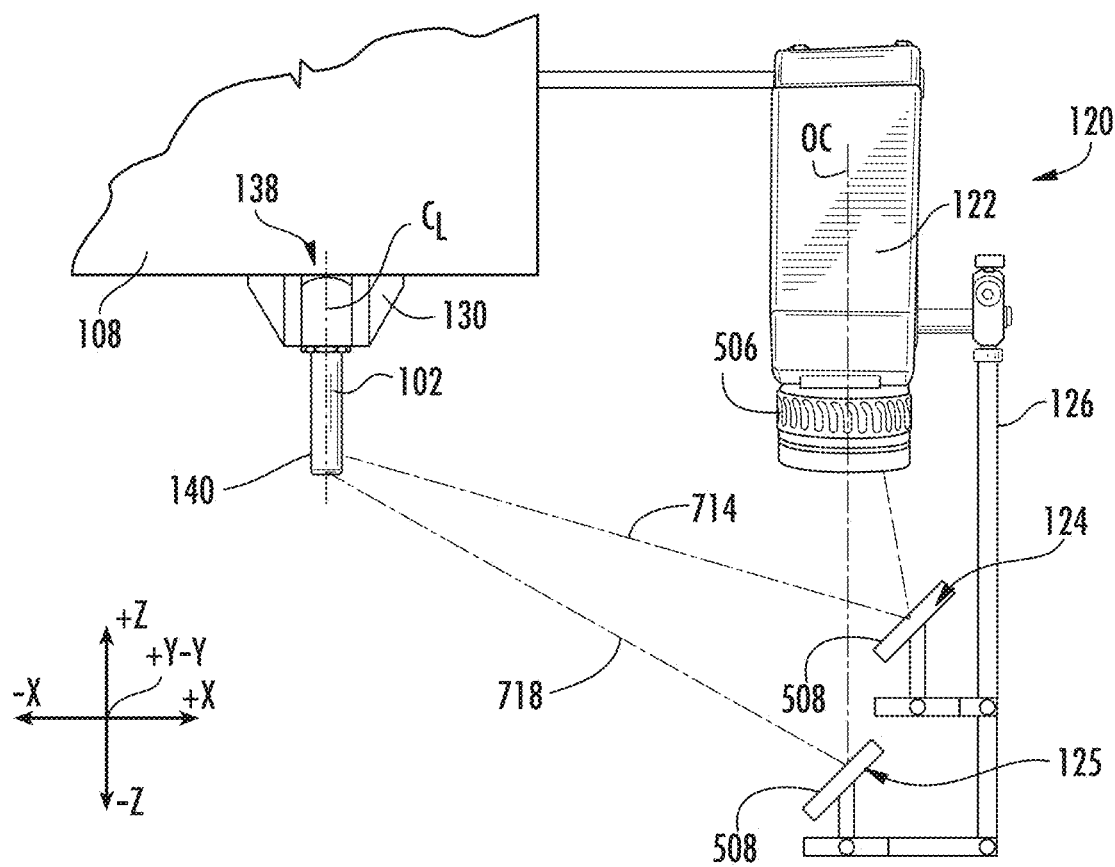
FIG. 7E schematically depicts operation of the thermal imager, the mirror, and a supplemental mirror of the thermal imaging system of FIG. 5, according to one or more embodiments shown and described herein.

Referring to FIG. 7E, in embodiments, the thermal imaging system 120 may include a supplemental mirror 125 that may be coupled to the mounting apparatus 126 so that the supplemental mirror 125 travels with the thermal imager 122 and the mirror 124. In these embodiments, infrared light emitted from the outer surface 140 of the glass tube 102 travels along pathway 714 from the outer surface 140 of the glass tube 102 to the mirror 124 and is reflected by mirror 124 towards the lens 506 of the thermal imager 122. The infrared light emitted from the inner surface 146 of the glass tube 102 travels along pathway 718 from the inner surface 146 of the glass tube 102 to the supplemental mirror 125 and is reflected by the supplemental mirror 125 towards the lens 506 of the thermal imager 122. In some embodiments, the supplemental mirror 125 may be positioned vertically lower (i.e., in the −Z direction of the coordinate axes of FIG. 7E) than the mirror 124. Since the mirror 124 and the supplemental mirror 125 both travel with thermal imager 122 as it is indexed through the plurality of processing stations 106, the mirror 124 and supplemental mirror 125 may enable the thermal imager 122 to capture thermal image data from the outer surface 140 and the inner surface 146 of the glass tube 102 at each of the processing stations 106. In embodiments, the thermal imager 122 may capture thermal image data from the outer surface 140 and the inner surface 146 of the glass tube 102 simultaneously.

Figure 7F:
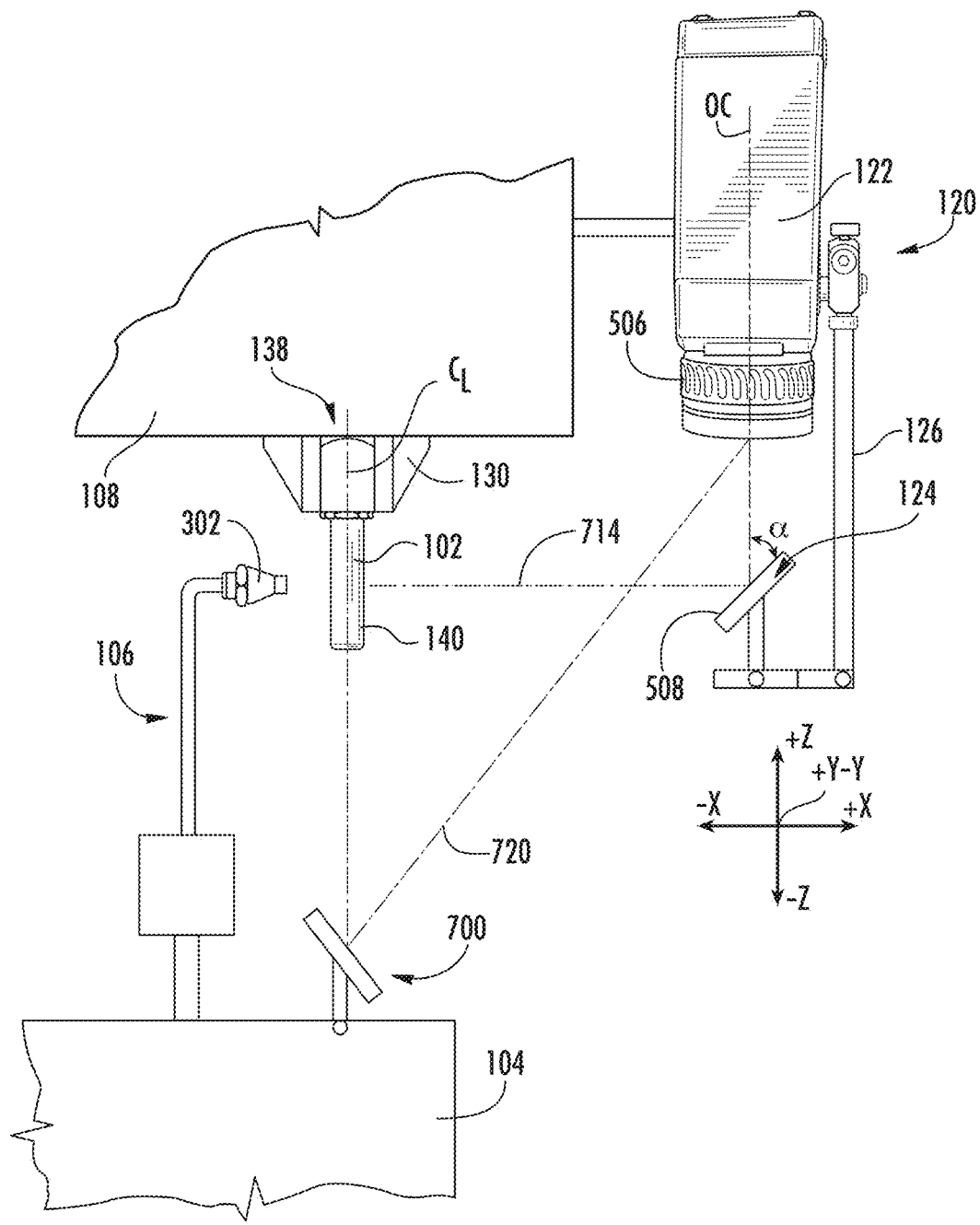
FIG. 7F schematically depicts operation of the thermal imager, the mirror, and a stationary mirror of the thermal imaging system of FIG. 5, according to one or more embodiments shown and described herein.

Referring to FIG. 7F, in embodiments, one or more stationary mirrors 700 may be coupled to the base 104 of the converter 100 at a processing station 106. In embodiments, each of the stationary mirrors 700 may be positioned vertically below a processing station 106. The stationary mirrors 700 may be angled to reflect infrared light emitted by the inner surface 146 of the glass tube 102 to the thermal imager 122, when the thermal imager 122 indexes into position in the processing station 106. The infrared light emitted from the inner surface 146 of the glass tube 102 may travel generally downward (i.e., generally in the −Z direction of the coordinate axes of FIG. 7F) along pathway 720 to the stationary mirror 700 and is reflected by the stationary mirror 700 towards the lens 506 of the thermal imager. Since the thermal imager 122 is coupled to the main turret 108 and rotates with the main turret 108 as it indexes each holder 130 through the plurality of processing stations 106, the thermal imager 122 passes into position to receive the reflected infrared light from the stationary mirror 700 once per cycle of the main turret 108 through the main circuit 116 of processing stations 106. The infrared light reflected to the thermal imager 122 by the stationary mirror 700 may only be captured by the thermal imager 122 once per cycle of the main turret 108. Positioning the stationary mirror 700 below the processing station 106 allows the stationary mirror 700 to reflect infrared light emitted by one or more inner surfaces 146 (FIG. 4) of the glass tube 102, which may enable the thermal imaging system 120 to profile or determine the temperatures of one or more inner surfaces 146 of the glass tube 102.

Figure 7G:
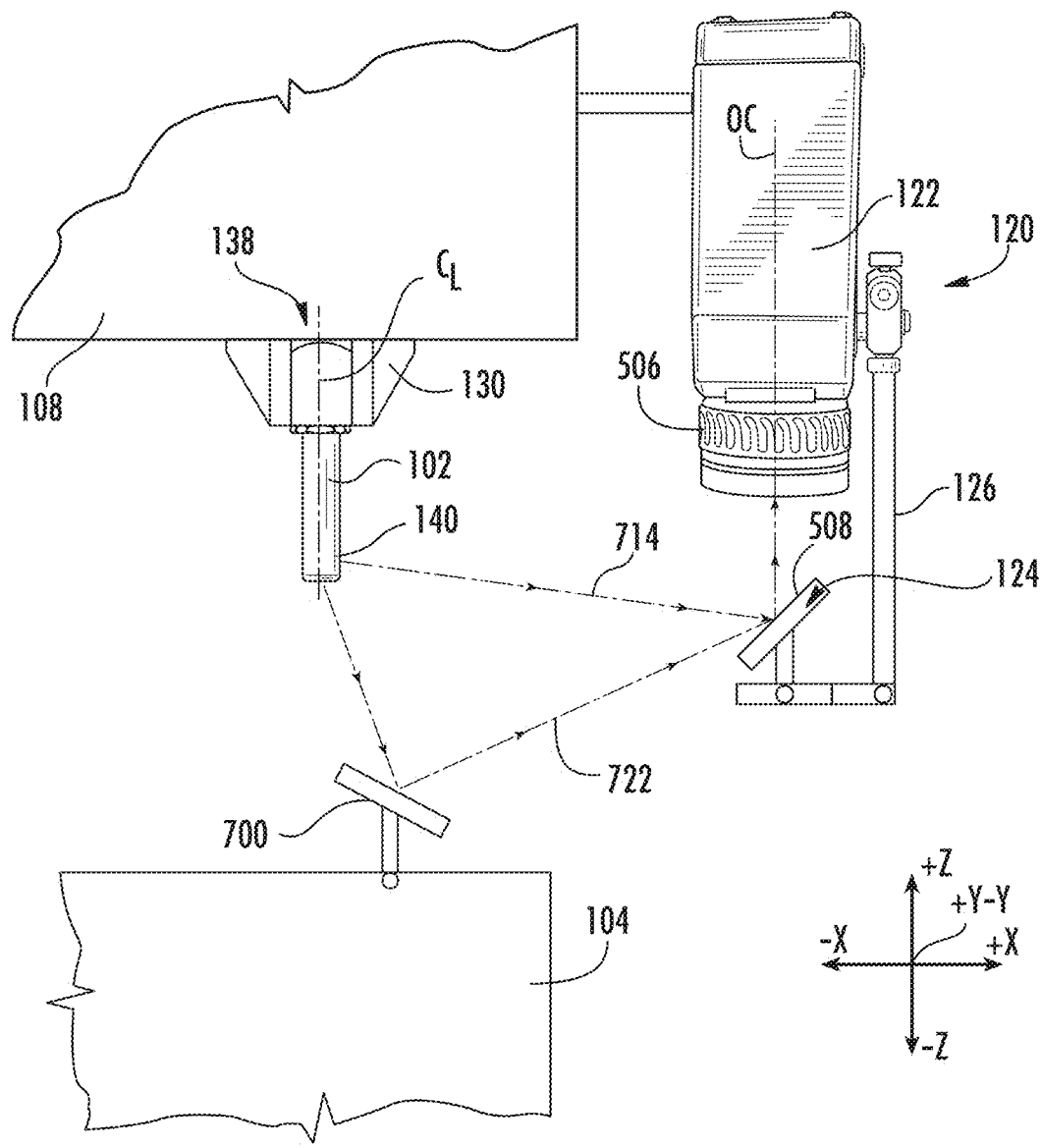
FIG. 7G schematically depicts an alternative operation of the thermal imager, mirror, and supplemental mirror of the thermal imaging system of FIG. 7F, according to one or more embodiments shown and described herein.

Referring to FIG. 7G, in embodiments, the stationary mirror 700 may be oriented to reflect the infrared light from the inner surface 146 of the glass tube 102 towards the mirror 124 coupled to the mounting apparatus 126. In these embodiments, the infrared light from the inner surface 146 of the glass tube 102 travels along pathway 722 from the inner surface 146 of the glass tube 102 to the stationary mirror 700, reflects off of the stationary mirror 700 towards the mirror 124, and then reflects off of the mirror 124 towards the lens 506 of the thermal imager 122. Simultaneously, infrared light emitted from the outer surface 140 of the glass tube 102 travels along pathway 714 from the outer surface 140 of the glass tube 102 towards the mirror 124 and is reflected from the mirror 124 towards the lens 506 of the thermal imager 122. Other stationary mirrors 700 may be coupled to the base 104 below other processing stations 106, and other supplemental mirrors 124 may be coupled to the main turret 108 or mounting apparatus 126 to achieve different configurations or different view angles of the glass tube 102 during one or more stages of the converting process.

In some embodiments, the thermal imaging system 120 may include a plurality of thermal imagers 122. The plurality of thermal imagers 122 may be coupled to the main turret 108, the secondary turret 114, or both for rotation with the main turret 108 or the secondary turret 114. In some embodiments, each of the plurality of thermal imagers 122 may be positioned to capture thermal image data from a separate holder position 136. In embodiments, the thermal imaging system 120 may include one or more than one thermal imager 122 coupled to the base 104 of the converter 100 or other stationary structure (e.g., the floor, wall, or other structure adjacent to the converter 100) in a stationary position to capture thermal image data from a specific processing station 106 and/or secondary processing station 112 as glass tubes 102 are indexed through the specific processing station 106 and/or secondary processing station 112.

Figure 8A:
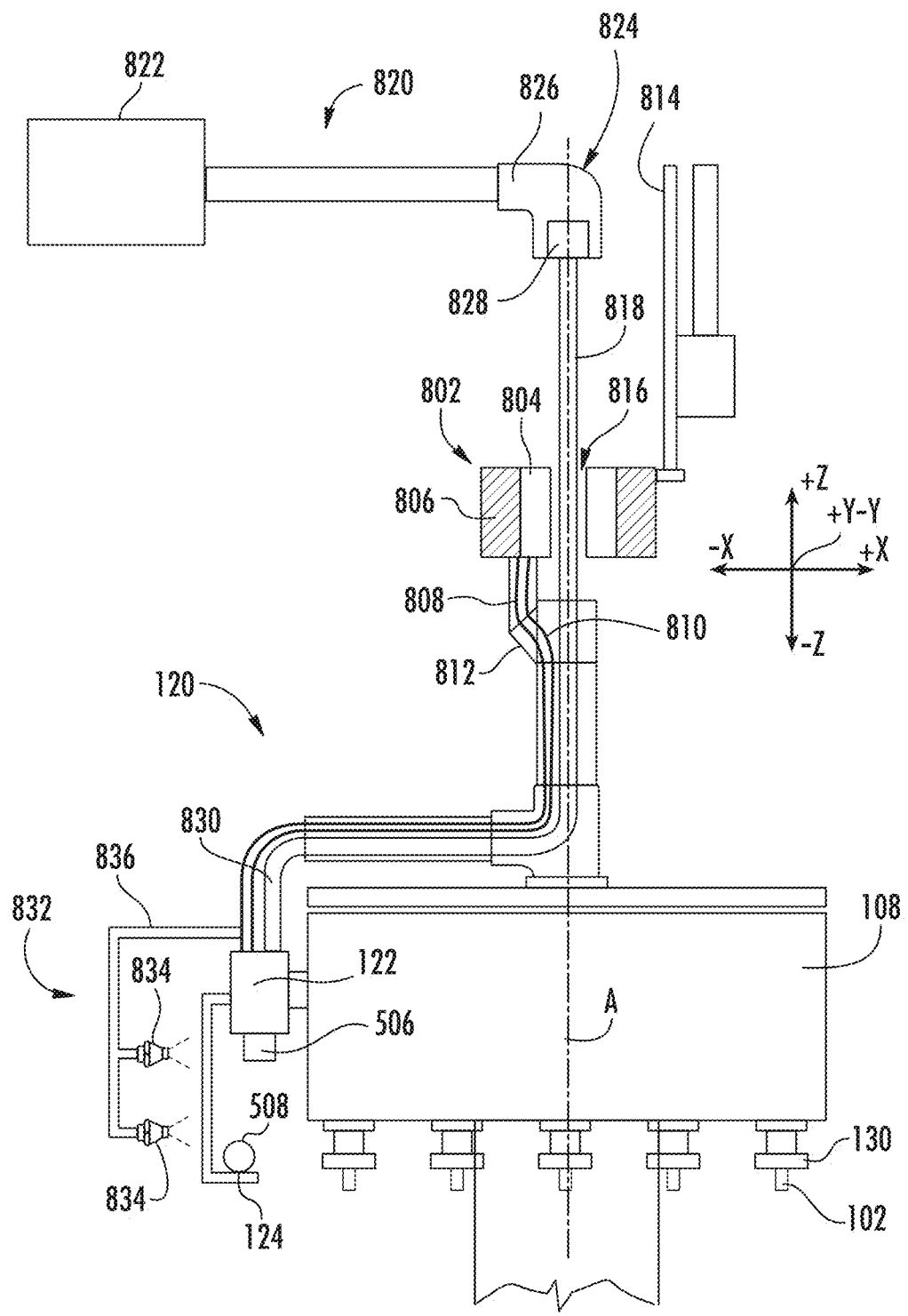
FIG. 8A schematically depicts another embodiment of a thermal imaging system of the converter of FIG. 1, according to one or more embodiments shown and described herein.
Figure 9:
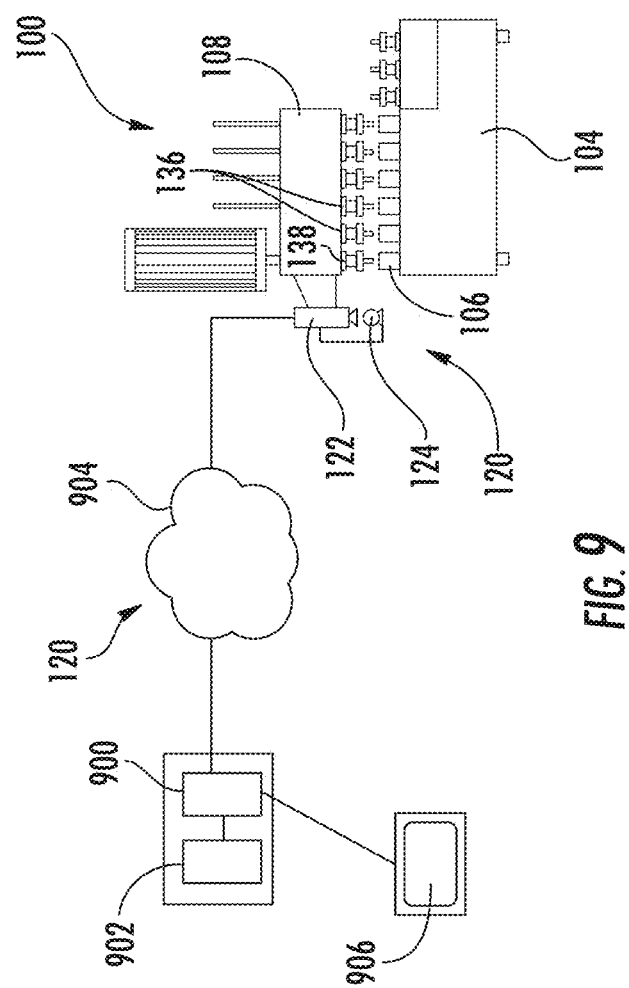
FIG. 9 schematically depicts another embodiment of a thermal imaging system of the converter of FIG. 1, according to one or more embodiments shown and described herein.

Referring now to FIG. 8A, coupling the thermal imaging system 120 to the main turret 108 so that the thermal imaging system 120 travels in a continuous circuit centered about the central axis A of the main turret 108 presents unique challenges for delivering power and cooling fluid to the thermal imaging system 120 and receiving data from the thermal imaging system 120. Therefore, in embodiments, the thermal imaging system 120 may include one or more rotating electrical and/or gas unions, which may allow for the powering, data exchange, and cooling of the thermal imaging system. In one or more embodiments, the thermal imaging system may include a slip ring 802 (i.e., sometimes referred to as a rotary electrical joint), which may provide a rotating connection to allow for power transmission and data transfer to and from the thermal imaging system 120. The slip ring 802 may operatively couple the thermal imager 122 to the processor 900 (FIG. 9). The slip ring 802 may be a double annular structure having an inner ring 804 and an outer ring 806. The inner ring 804 or the outer ring 806 is stationary and the other one of the inner ring 804 or outer ring 806 rotates relative to the stationary ring. The slip ring 802 may have an axis of rotation parallel to and aligned with the central axis A of the main turret 108. Aligning the axis of the slip ring 802 with the central axis A of the main turret 108 may prevent electrical cables 808 and data cables 810 extending from the slip ring 802 to the thermal imaging system 120 from wrapping upon rotation of the main turret 108.

The slip ring 802 may include multiple circuits (not shown) formed between the inner ring 804 and the outer ring 806. Power (e.g., 24 volt power, for example) and data may be electronically transferred radially between an inner radial surface of the outer ring 806 and the outer radial surface of the inner ring 804, while the inner ring 804 and outer ring 806 are rotated relative to one another. The outer ring 806 may be electrically coupled to a power source and/or may also be communicatively coupled to a processor 900 (FIG. 9). The inner ring 804 may be electrically coupled to the thermal imager 122 to deliver power to the thermal imager 122 and may be communicatively coupled to the thermal imager 122 to send and receive data from the thermal imager 122. Electrical power may be transferred from the slip ring 802 to the thermal imager 122 by one or more electrical cables 808. Additionally, data may be transferred between the slip ring 802 and the thermal imager 122 through one or more data cables 810, such as an Ethernet cable, for example. The slip ring 802 may communicatively couple the thermal imager 122 to the processor 900 (FIG. 9), which may be located remotely (i.e., spaced apart) from the thermal imager 122 in a stationary location, to facilitate transfer of data to and from the thermal imager 122. The processor 900 (FIG. 9) may be temperature sensitive, and the ability to remotely locate the processor 900 and effectively transfer the data to the processor 900 may avoid incorporating special heat resistant structures or cooling systems to further protect the processor 900.

In one or more embodiments, the rotating portion of the slip ring 802 (e.g., shown as the inner ring 804 in FIG. 8A) may be supported by a support 812, such as electrical conduit or a bracket for example, which is coupled to the main turret 108 for rotation with the main turret 108. The stationary part of the slip ring 802 (e.g., shown as the outer ring 806 in FIG. 8A) may be coupled to a stationary support 814 attached to a fixed non-rotating surface (not shown) separate from the main turret 108. The stationary support 814 may be an electrical conduit, bracket or other support structure, for example. Additionally, in one or more embodiments, the inner ring 804 of the slip ring 802 may have a central bore 816, which provides access therethrough for one or more fluid conduits 818. The central bore 816 may be centered on the axis of rotation of the slip ring 802, which is aligned with the central axis A of the main turret 108. The fluid conduit 818 may pass through the central bore 816 of the inner ring 804 to deliver cooling fluids or other fluids to the thermal imaging system 120 or other parts of the main turret 108. In embodiments, the slip ring 802 is freely rotatable relative to the fluid conduit 818 (i.e., the slip ring 802 is not coupled to the fluid conduit 818).

Figure 8B:
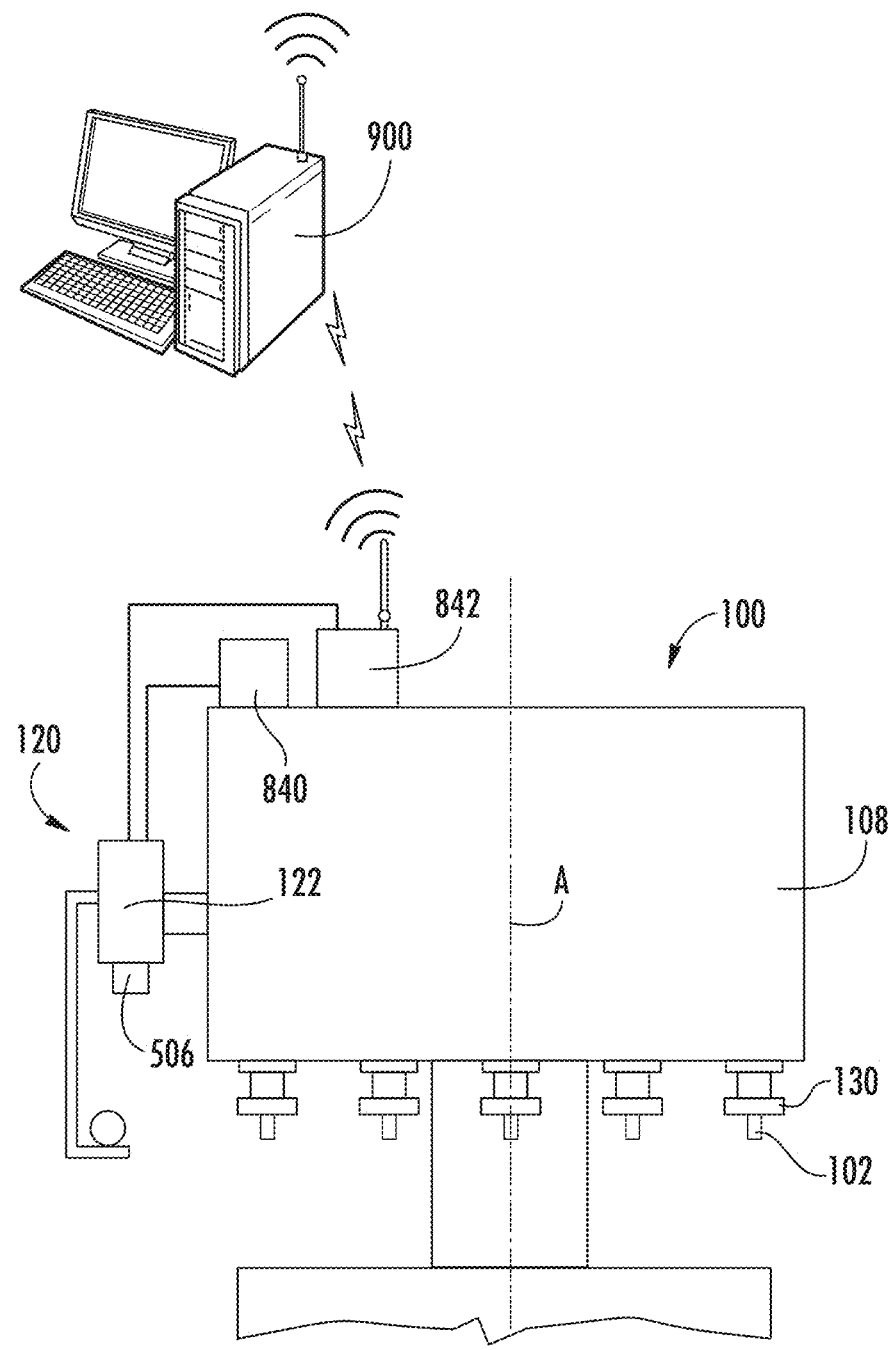
FIG. 8B schematically depicts another embodiment of a thermal imaging system of the converter of FIG. 1, according to one or more embodiments shown and described herein.

Referring to FIG. 8B, in alternative embodiments, the thermal imaging system 120 may include a power source 840, such as a battery for example, removeably coupled to the main turret 108 for rotation therewith. The power source 840 may be electrically coupleable to the thermal imager 122 to provide power to the thermal imager 122. The power source 840 may be removable from the main turret 108 so that the power source 840 may be replaced and/or recharged. In one or more embodiments, the thermal imager 122 may be communicatively coupled to the processor 900 through one or more wireless communication devices 842 using one or more wireless communication protocols. The wireless communication device 842 may be coupled to the main turret 108 for rotation therewith. The wireless communication device 842 may be communicatively coupled to the thermal imager 122. In embodiments, the thermal image data may be transferred between the thermal imager 122 and the processor 900 using the one or more wireless communication devices and/or protocols.

Referring back to FIG. 8A, in embodiments, the thermal imaging system 120 may also include a cooling system 820 for cooling the thermal imager 122. The cooling system 820 may include a cooling fluid source 822, a fluid rotating union 824 in fluid communication with the cooling fluid source 822, and the fluid conduit 818, which is in fluid communication with the fluid rotating union 824. The cooling fluid may be a compressed gas, such as filtered air, nitrogen, or other gas or combinations of gases, for example. In embodiments, the cooling fluid may be clean dry air (i.e., air having moisture, particulates, dirt, oils, or other contaminants removed therefrom) to avoid introducing contaminants to the thermal imaging system 120, which could adversely affect performance of the thermal imaging system 120. Alternatively, the cooling fluid may be nitrogen. In embodiments, the cooling system 820 may include at least one of a regulator, moisture remover, particulate filter, coalescing filter, or combinations of these. The cooling fluid source 822 may include a compressed gas storage tank, gas compressor, or other compressed gas system or combinations of cooling fluid sources.

The fluid rotating union 824 includes a stationary portion 826 fluidly coupled to the cooling fluid source 822 and a rotating portion 828 that is rotatably coupled to the stationary portion 826 and rotatable relative to the stationary portion 826. The fluid rotating union 824 includes a union axis that is parallel to and aligned with the central axis A of the main turret 108 so that the rotating portion 828 of the fluid rotating union 824 may rotate in concert with rotation of the main turret 108. The rotating portion 828 of the fluid rotating union 824 may be fluidly coupled to the fluid conduit 818, which extends from the fluid rotating union 824 to the thermal imager 122 to deliver the cooling fluid to the thermal imager 122.

The cooling system 820 may further include one or more cooling fluid conduits 830 in fluid communication with the fluid conduit 818 and positioned to deliver the cooling fluid to parts of the thermal imaging system 120. In one or more embodiments, one or more of the cooling fluid conduits 830 may be positioned to deliver cooling fluid to the thermal imager 122. In embodiments, the thermal imager 122 may be maintained at a temperature of less than about 50° C. to maintain accurate operation of the infrared sensor suite within the thermal imager 122. A combustion gas hood (not shown) integrated with the converter 100 may operate to pull combustions gases and excess heat generated by the heating elements 301 (FIG. 3A) towards the central axis A of the main turret 108 and out of the converter 100. Thus, the thermal imager 122 is not generally exposed to the majority of the heat from the heating elements 301 (FIG. 3A). However, the thermal imager 122 may be exposed to some heat from the converting process and may generate additional heat internally through operation of the sensor suite and electronics of the thermal imager 122. The cooling fluid directed towards the thermal imager 122 may operate to maintain the temperature of the thermal imager 122 at or below 50° C. In some embodiments, the cooling system 820 is independent of the cooling stations 210 (FIG. 3E) of the converter 100. However, in one or more embodiments the cooling stations 210 (FIG. 3E) and the cooling system 820 may share a common cooling fluid source 822.

In some embodiments, the thermal imaging system 120 may include a cleaning system 832 for purging the lens 506 of the thermal imager 122, the reflective surface 508 of the mirror 124, or both. During operation of the converter 100 and the thermal imaging system 120, oils and combustion products may deposit on the lens 506 of the thermal imager 122 and the reflective surface 508 of the mirror 124, such as through condensation of oil on the mirror 124 or lens 506, which may reduce the reflectance of the mirror 124 and interfere with passage of the infrared light through the lens 506 of the thermal imager 122, thus, introducing errors and inaccuracies into the image data collected by the thermal imager 122. In embodiments, the cleaning system 832 may include one or more nozzles 834 positioned to deliver a fluid to the lens 506 of the thermal imager 122 to purge the lens 506 of oils, dirt, and other contaminants. The nozzles 834 may be fluidly coupled to a fluid delivery conduit 836 that delivers the fluid from a fluid source (not shown) to the nozzles 834. In embodiments, one or more of the nozzles 834 may be positioned to deliver the fluid to the reflective surface 508 of the mirror 124 to purge the reflective surface 508 of oils, dirt, and other contaminants. A fluid free of particulates, dirt, oils, or other contaminants may be used to purge the lens 506 of the thermal imager 122, the reflective surface 508 of the mirror 124, or both to avoid further contamination of the lens 506 and the mirror 124. For example, the fluid may be nitrogen, clean air, other gas or combinations thereof. In some embodiments, the cleaning system 832 may be fluidly coupled to the cooling system 820 such that the cooling fluid is delivered to the nozzles 834 and used as the fluid for cleaning the lens 506 of the thermal imager 122, mirror 124, or both.

Figure 18A:
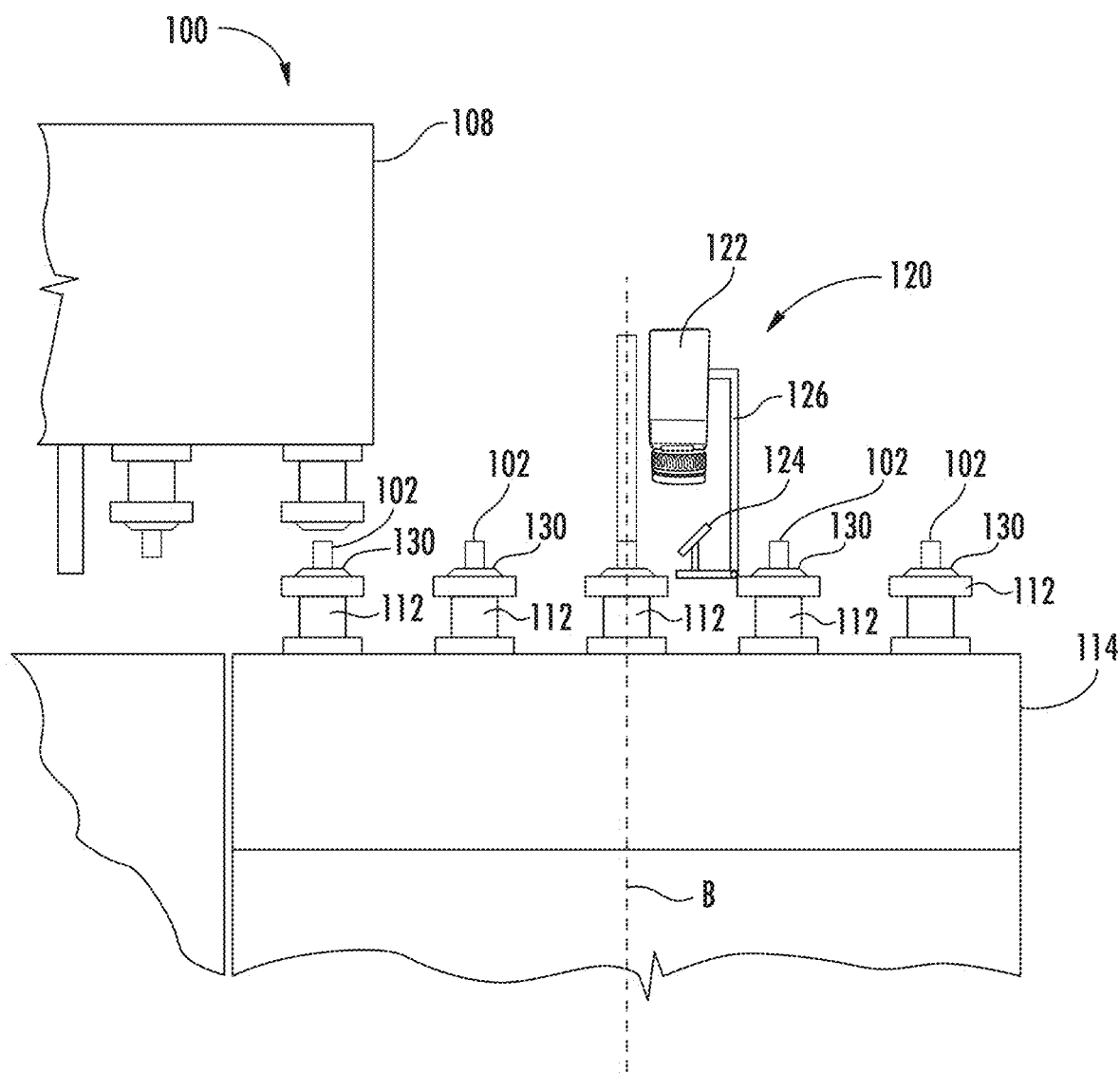
FIG. 18A schematically depicts a secondary turret of the converter of FIG. 1, the secondary turret having a thermal imaging system, according to one or more embodiments shown and described herein.
Figure 18B:
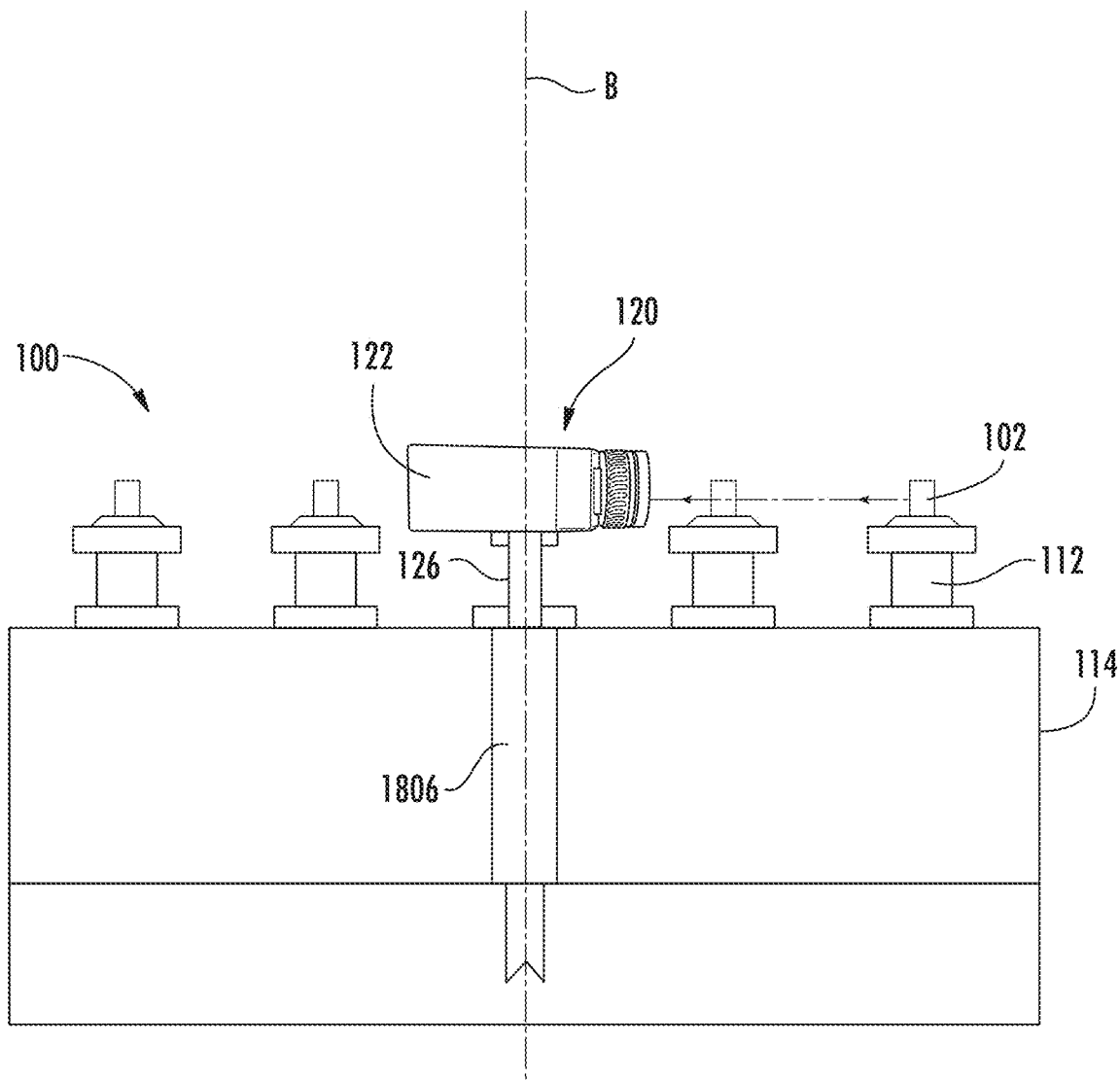
FIG. 18B schematically depicts another embodiment of a secondary turret of the converter of FIG. 1, the secondary turret having a thermal imaging system, according to one or more embodiments shown and described herein.

The thermal imaging systems 120 described herein may be adapted for use with the secondary turret 114 of the converter 100. Referring to FIGS. 18A and 18B, the secondary turret 114 may include a thermal imaging system 120 coupled to the secondary turret 114 for rotation therewith. In some embodiments, the thermal imaging system 120 may be coupled to the shaft 1806 of the secondary turret 114 such that the thermal imaging system 120 is positioned in the center of the secondary turret 114. As previously discussed, the thermal imaging system 120 includes the thermal imager 122 and the mounting apparatus 126. The thermal imaging system 120 coupled to the secondary turret 114 may capture thermal image data from the inner surface 146 and/or outer surface 140 of the glass tube 102 as the glass tube 102 is indexed through the secondary processing stations 112 of the secondary circuit 118 by the secondary turret 114. Referring to FIG. 18A, in some embodiments, the thermal imager 122 may be positioned in the center of the secondary turret 114 and oriented vertically (i.e., in the +/−Z direction of the coordinate axes of FIG. 18A) so that the optical centerline OC of the thermal imager 122 is generally parallel to the center axis B of the secondary turret 114. In this configuration, the mirror 124 may be positioned and oriented to reflect the infrared light from the outer surface 140 and/or the inner surface 146 of the glass tube 102. Referring to FIG. 18B, in other embodiments, the thermal imager 122 may be oriented generally horizontally (i.e., in the X-Y plane of the coordinate axis of FIG. 18B) such that the thermal imager 122 directly receives the infrared light from the outer surface 140 of the glass tube 102. In these embodiments, the thermal imager 122 may face generally radially outward from the center line B of the secondary turret 114. In this orientation, the infrared light emitted by the outer surface 140 of the glass tube 102 may travel radially inward from the glass tube 102 directly to the thermal imager 122. Other configurations of the thermal imaging system 120, including embodiments utilizing supplemental mirrors 125 (FIG. 7E), stationary mirrors 700 (FIG. 7B), or combinations of mirrors 124, 125, 700 as described herein for reflecting infrared light from the inner surfaces 146 or outer surfaces 140 of the glass tube 102 to the thermal imager 122, may be adapted to the secondary turret 114.

Referring back to FIG. 9, the thermal imaging system 120 may include the processor 900, one or more memory modules 902 communicatively coupled to the processor 900, and machine readable instructions stored in the one or more memory modules 902. The processor 900 may be communicatively coupled to the thermal imager 122 through a communication pathway 904, which may include data cables 810 (FIG. 8) and/or one or more wireless communication devices 842 (FIG. 8B) utilizing standard wireless communication protocols. Suitable wireless communication protocols may include the 802.11 families of protocols, the Bluetooth® protocol, the ZigBee IEEE 802 Standard protocol, or the like. Communicatively coupling the processor 900 to the thermal imager 122 using data cables 810 passed through the slip ring 802 or other rotating electrical coupler is illustrated in FIG. 8A. The data cables 810 may be electric wires, fiber optic data cables, or other data cables. Communicatively coupling the processor 900 to the thermal imager 122 using the wireless communication device 842 is illustrated in FIG. 8B.

The processor 900 may enable automated analysis of the image data collected by the thermal imager 122. By executing the machine readable instructions stored in the memory modules 902, the processor 900 may cause the thermal imaging system 120 to receive the image data captured by the thermal imager 122, process the image data, and determine at least one characteristic of the glass tube 102. Characteristics of the glass tube 102 determined from the thermal image data may include one or more surface temperatures, temperature gradients, dimensions of the glass tube 102 (i.e., dimensions of the physical boundaries of the glass tube), viscosity of the glass tube 102 at various positions, temperature profile of the glass tube as a function of time, centerline of the glass tube, other characteristic, or combinations thereof. The machine readable instructions, when executed by the processor 900, may also cause the thermal imaging system 120 to store the thermal image data and/or the characteristics of the glass tube 102 determined therefrom, or display the data and/or characteristics of the glass tube 102 on one or more displays 906. In one or more embodiments, the machine readable instructions stored in the memory modules 902 may comprise one or more image analysis software packages. An example of an image analysis software package may include LabVIEW' distributed by National Instruments, for example. Other commercial image analysis software, off-the shelf or otherwise modified, may also be used with the thermal imaging system 120.

The machine readable instructions, when executed by the processor 900, may cause the thermal imaging system 120 to perform at least the following: capture thermal image information of the glass tube 102 using the thermal imager 122, transmit the thermal image information from the thermal imager 122 to the processor 900, receive the thermal image information from the thermal imager 122 at the processor 900, process the thermal image information, and determine one or more characteristics of the glass tube 102 from the thermal image information. In some embodiments, the machine readable instructions, when executed by the processor 900, may cause the thermal imaging system 120 to further determine one or more physical boundaries of the glass tube 102 from the thermal image data. In some embodiments, the machine readable instructions, when executed by the processor 900, may cause the thermal imaging system 120 to perform one or more of identifying the centerline of the glass tube 102 from the thermal image information, drawing a centerline on the thermal images captured by the thermal imager 122, converting the infrared wavelength data to temperature data, compiling the temperature data to determine one or more temperature profiles and/or temperature gradients of the glass tube 102, and/or determining a temperature profile (e.g., graphical plot or data table) of the glass tube 102 as a function of time. In some embodiments, the machine readable instructions, when executed by the processor 900, may cause the thermal imaging system 120 to calculate a viscosity of the glass at a specific position of the glass tube 102 from the temperature of the glass tube 102 and a viscosity as a function of temperature model for the glass tube 102. In some embodiments, the thermal imaging system 120 may calculate a viscosity gradient through the thickness of the glass tube 102.

In some embodiments, the machine readable instructions, when executed by the processor 900, may cause the thermal imaging system 120 to calculate at least one metric from the processed thermal image information. The at least one metric may be retrieved by a control algorithm that may calculate at least one process control variable, such as a controlled variable for example, or process control parameter, such as a gain constant or other process control parameter for example, from the at least one metric.

Indirect capture of thermal images by reflecting the infrared light to the thermal imager 122 using a mirror 124 introduces errors from the mirror when compared to a direct image taken without using a mirror 124. In processing the thermal image information, the machine readable instructions, when executed by the processor 900, may cause the thermal imaging system 120 to apply one or more correction factors to the thermal image information to correct for errors introduced by the mirror 124. When one or more stationary mirrors 700 (FIG. 7) are used with the thermal imaging system 120, the machine readable instructions, when executed by the processor 900, may cause the thermal imaging system 120 to apply a plurality of correction factors to the thermal image information.

In one or more embodiments, the machine readable instructions stored in the one or more memory modules 902 may cause the thermal imaging system 120 to perform at least the following when executed by the processor 900: determine a first characteristic or temperature of the glass tube 102 at a first processing station 106, determine a second characteristic or temperature of the glass tube 102 at a second processing station 106 positioned downstream of the first processing station 106, calculate a difference between the first characteristic or temperature and the second characteristic or temperature, and transmit an output representative of the difference between the first characteristic or temperature and the second characteristic or temperature. In some embodiments, the first characteristic and the second characteristic are temperatures evaluated at a specific physical point or region of the outer surface 140 (FIG. 4) or inner surface 146 (FIG. 4) of the glass tube 102 or glass article 103 (e.g., temperature of the outer surface 140 at the shoulder 142 depicted in FIG. 4). Alternatively, in other embodiments, the first characteristic and the second characteristic may be an average temperature of the glass tube 102. For example, in some embodiments, the first characteristic and the second characteristic may refer to the average centerline temperature of the glass tube 102. Additionally, the first and second characteristic may be an average temperature taken over a region of the glass tube 102 or glass article 103. The first characteristic and the second characteristic may be an internal surface temperature or an external surface temperature of the glass tube 102 or glass article 103.

In one or more embodiments, the machine readable instructions, when executed by the processor 900, may cause the thermal imaging system 120 to store the thermal image data in one or more of the memory modules 902. In one or more embodiments, the machine readable instructions may cause the thermal imaging system 120 to store and maintain a database of thermal image data and/or characteristics of the glass tube determined from the thermal image data, which may be used to develop baseline targets and/or metrics for converter 100 operating parameters to facilitate machine startup and/or to use as set points for one or more process control methods for controlling the converter 100. In some embodiments, the machine readable instructions, when executed by the processor 900, may cause the thermal imaging system 120 to store data from specific glass articles in the one or more memory modules 902 and index the data from specific glass articles according to a part identification such that the thermal history of the specific part may be accessible for further analysis and study.

Regular errors caused by the mirror 124 may be introduced into the image data captured by the thermal imager 122. In one or more embodiments, the machine readable instructions, when executed by the processor 900, may cause the thermal imaging system 120 to apply one or more data filters to the thermal image data. In one or more embodiments, the machine readable instructions, when executed by the processor 900, may cause the thermal imaging system 120 to receive thermal image data from the thermal imager 122 at a target sampling rate. The target sampling rate may be modified to influence the overall capture rate of the thermal imaging system 120.

Figure 10:
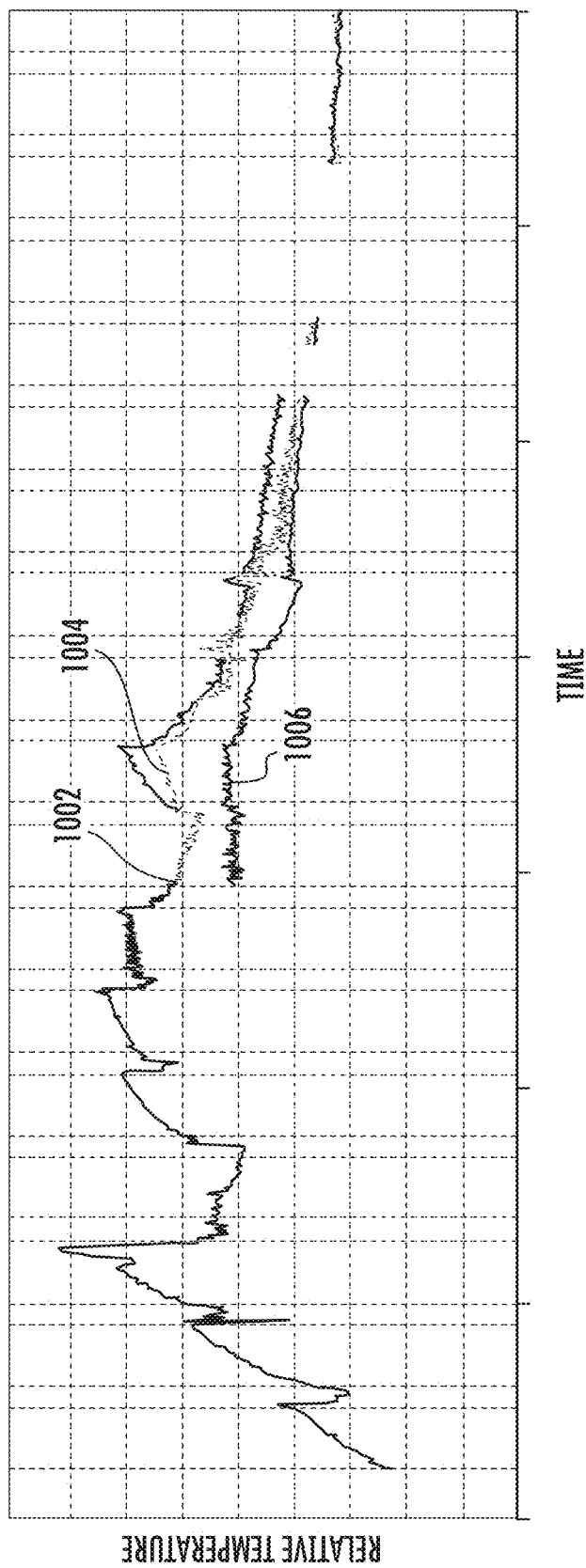
FIG. 10 is a plot of relative temperature of a surface of a glass tube (y-axis) as a function of time (x-axis) for the converter 100 measured using the thermal imaging system of FIG. 9, according to one or more embodiments shown and described herein.

Still referring to FIG. 9, the thermal imaging system 120 may further include a display 906 communicatively coupled to the processor 900. The memory modules 902 may include machine readable instructions that, when executed by the processor 900, cause the thermal imaging system 120 to display one or more outputs (e.g., thermal images, graphical plots, and/or data tables comprising glass tube temperature data from the thermal images) on the display 906. The outputs may be one or more graphical outputs, such as a graph of a surface temperature of the glass tube 102 at a particular position as a function of time as illustrated in FIG. 10 or thermal images of the glass tube 102 as depicted in FIGS. 11A-11D. The output to the display 906 may also include one or more data tables providing numeric representations of the temperature data generated by the thermal imaging system 120 rather than graphical representations.

Referring to FIGS. 7 and 9, in operation, the thermal imager 122 is positioned to capture thermal image data from a glass tube 102 removably secured in a holder 130 of the main turret 108. As the glass tube 102 is indexed through the plurality of processing stations 106, the glass tube 102 is heated and cooled. When heated to an elevated temperature, one or more outer surfaces 140 or inner surfaces 146 (FIG. 4) of the glass tube 102 emits infrared radiation outward from the glass tube 102 in the radial direction, axial direction or other direction. This infrared light may be reflected by the reflective surface 508 (FIG. 6) of the mirror 124 towards the lens 506 (FIG. 6) of the thermal imager 122. Alternatively, the thermal imager 122 may be positioned to directly capture the infrared light emitted from the glass tube 102 without the mirror 124. The thermal imager 122 captures the infrared light using a plurality of sensors and outputs thermal image data comprising wavelength and intensity of the infrared light received by the thermal imager 122. As shown in FIG. 9, the thermal image data output by the thermal imager 122 is transferred from the thermal imager 122 to the processor 900 by way of the communication pathway 904, which may be wired or wireless. The processor 900 receives the thermal image data, processes the thermal image data, and outputs one or more attributes (e.g., temperatures) of the glass tube 102 determined from processing the thermal image data.

In one or more embodiments, the thermal imaging system 120 may be configured to capture thermal image data of the glass tube 102 at specific stages or processing stations 106 of the converting processes, such as the start or end of the dwell time at a heating station 202 (FIG. 2), a start or an end of the dwell time of a forming operation at a forming station 204 (FIG. 2), or other stage in the converting process. Thermal image data may be captured at the beginning of the dwell time, middle of the dwell time, end of the dwell time, or while the glass tube 102 is being indexed between one processing station 106 and a subsequent processing station 106 by the main turret 108.

Alternatively, in other embodiments, the thermal imaging system 120 may be configured to capture thermal image data of the glass tube 102 at set time intervals throughout the converting process. As described previously, the thermal imager 122 may have an image capture rate in a range of from 30 Hz to 60 Hz. An overall capture rate of the thermal imaging system 120 may be defined as the rate at which the thermal imaging system 120 produces an output data set and may include the capture rate of the thermal imager 122 as well as the time periods necessary to transfer the thermal image data to the processor 900, process the thermal image data, and output the thermal image data to a memory module 902, display 906, process controller, or other device. The minimum overall capture rate of the thermal imaging system 120 is the fastest rate at which the thermal imaging system 120 is capable of capturing, transferring, processing, and outputting thermal image data. The minimum overall capture rate of the thermal imaging system 120 may be generally greater than or equal to about 10 Hz. In other embodiments, the minimum overall capture rate of the thermal imaging system 120 may be at least 20 Hz. For example, the minimum overall capture rate of the thermal imaging system 120 may be from 10 Hz to 50 Hz, from 10 Hz to 40 Hz, from 10 Hz to 30 Hz, from 10 Hz to 20 Hz, from 20 Hz to 50 Hz, from 20 Hz to 40 Hz, from 20 Hz to 30 Hz, from 30 Hz to 50 Hz, or from 30 Hz to 40 Hz. A minimum overall capture rate of the thermal imaging system 120 of at least 10 Hz may facilitate capturing the very high temperature gradients that are created during certain stages of the converting process. In one or more embodiments, one or more data filters may be employed to increase the overall capture rate of the thermal imaging system 120. In one or more embodiments, the sampling rate may be adjusted to change the overall capture rate of the thermal imaging system 120.

Figure 11:
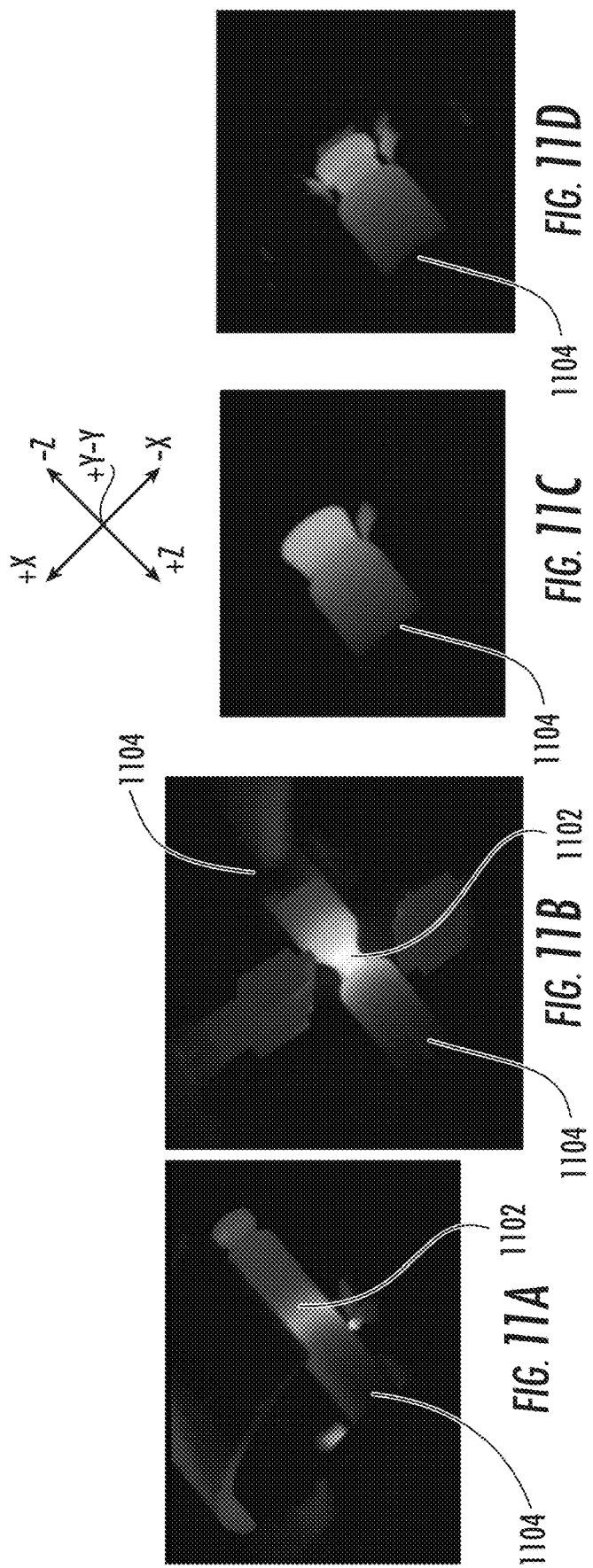
FIG. 11A is an image depicting a glass tube in a heating station of the converter of FIG. 1 captured by the thermal imaging system of FIG. 9, according to one or more embodiments shown and described herein.
FIG. 11B is an image depicting a glass tube in a separating station of the converter of FIG. 1 captured by the thermal imaging system of FIG. 9, according to one or more embodiments shown and described herein.
FIG. 11C is an image depicting a glass tube in a forming station of the converter of FIG. 1 captured by the thermal imaging system of FIG. 9, according to one or more embodiments shown and described herein.
FIG. 11D is an image depicting a glass tube in another forming station of the converter of FIG. 1 captured by the thermal imaging system of FIG. 9, according to one or more embodiments shown and described herein.

Referring to FIGS. 11A-11D, thermal images captured by the imager are provided. Regions of greater temperature on the glass tube 102 are indicated as being lighter in color, and regions of lesser temperature are indicated as being darker in color. FIG. 11A shows a preheating step in which the glass tube 102 is heated prior to separating the glass tube 102. In FIG. 11B, the glass tube 102 is being cut and separated from the glass tube stock. As indicated by the very light colored region between the two sections of glass tube 102, the glass tube in the region of the cut 1102 is at very high temperature at the separating station 206. In embodiments, the temperature of the glass tube 102 in the region of the cut 1102 may reach temperatures of 1500° C. or greater. The contrast in color indicates a high temperature gradient from the region of the cut 1102 toward the opposite end 1104 of the glass tube 102. FIGS. 11C and 11D show thermal images captured during forming operations, in the shoulder 142 and flange 144 of a glass tube 102 being shaped into a vial. Again, the changing contrast in color between the lighter color of the forming regions (e.g., the shoulder 142 and flange 144) and the darker color moving towards the opposite end 1104 of the glass tube 102 indicates a high temperature gradient along the length L of the glass tube 102.

Temperature data may be extracted from a series of images similar to those of FIGS. 11A-11D to generate a temperature history of the glass tube 102 throughout the converting process in the converter 100. The wavelength of infrared light captured in the thermal image is correlated to the temperature of the glass tube 102 that emits the specific wavelength of infrared light captured. In FIG. 10, an example of a temperature history of a surface of a glass tube 102 processed through a converter 100, as captured by the thermal imaging system 120, is illustrated. FIG. 10 shows a first temperature 1002 of the glass tube 102 determined at a first portion of the surface of the glass tube 102. Additionally, the thermal imaging system 120 may also be used to extract temperature information for different regions of the article, for example the flange 144 (FIG. 3A) and the neck 145 (FIG. 3A) regions of the partially formed glass tube 102, during formation of the flange 144 and neck 145. In FIG. 10, a second temperature 1004 was determined at a second portion of the surface of the glass tube 102, and a third temperature 1006 was determined at a third portion of the surface of the glass tube 102. In some embodiments, the second temperature 1004 and the third temperature 1006 may be determined at portions of the glass tube 102 corresponding to the flange 144 and the neck 145, respectively.

Operational experience on tube part converters 100 shows that the converting process is very interactive, meaning that small changes in temperature at one processing station 106 of the converter 100 may equally impact the glass temperature and forming processes across the entire converter 100. The thermal imaging system 120 allows for monitoring of the temperature of a single glass tube 102 through all of the processing stations 106 and operations performed in each processing station 106 so that the impact of temperature changes in one processing station 106 on downstream forming operations can be observed and studied. Because the thermal imaging system 120 travels with the main turret 108 as it indexes between processing stations 106, the thermal imaging system 120 is also capable of capturing thermal images of the glass tube 102 between processing stations 106 to study the impact of cooling of the glass tube 102 between processing stations 106.

Referring again to FIGS. 7A-7G, as previously described, the thermal imaging system 120 may be configured to obtain thermal image data of an outer surface 140 of the glass tube 102. Additionally, the thermal imaging system 120 may be configured to obtain thermal image data, and thus surface temperature data, of one or more inner surfaces 146 (FIG. 4) of the glass tube 102. The ability to measure the surface temperature of an inner surface 146 may be helpful in characterizing a part converting process where temperature gradients through the thickness T (FIG. 4) of the glass tube 102 of several hundred degrees Celsius (i.e., 200° C. to 300° C. or greater) have been measured. Additionally, in one or more embodiments, measurements of the temperature of an inner surface 146 of the glass tube 102 may facilitate identification of a temperature range that results in quality defects. For example, during a flange forming operation conducted at a forming station 204 of a converter 100 for making vials, small cracks in the inner surface 146 at the flange 144 (FIG. 3D) may develop at certain internal surface temperatures. Measuring the internal surface temperature of the glass tube 102 may be used to identify these internal surface temperatures that result in cracks so that changes can be made to the converting process to prevent the cracks.

Multiple mirror pathways may be configured to obtain thermal image data for an inner surface 146 (FIG. 4) of the glass tube 102. As previously described, a plurality of stationary mirrors 700 may be utilized to configure the thermal imaging system 120 to obtain thermal images of an end view of the glass tube 102. An end view of the open end of the glass tube 102 may enable the thermal imaging system 120 to determine one or more interior temperatures of the glass tube 102, such as the temperature of an inner surface 146 of the glass tube 140. To capture the end view of the open end of the glass tube 102, one or more stationary stand-alone thermal image devices (not shown) may be mounted directly underneath one or more of the processing stations 106 of the converter 100. The optical centerline of the stationary thermal imaging devices may be aligned with the centerline CL of the glass tube 102 to capture the end view of the glass tube 102. Mounting a plurality of individual thermal image devices under a plurality of processing stations 106 may be expensive and cost prohibitive. In another configuration, a stationary imaging device (not shown) may be mounted at a position radially outward from a processing station 106 and a stationary mirror 700 may be mounted underneath the processing station 106 to reflect the end view image of the glass tube 102 to the lens (not shown) of the thermal imaging device. In this configuration, a plurality of thermal imaging devices would be necessary to capture thermal data for an inner surface 146 of the glass tube 102 at different processing stations 106.

Figure 12:
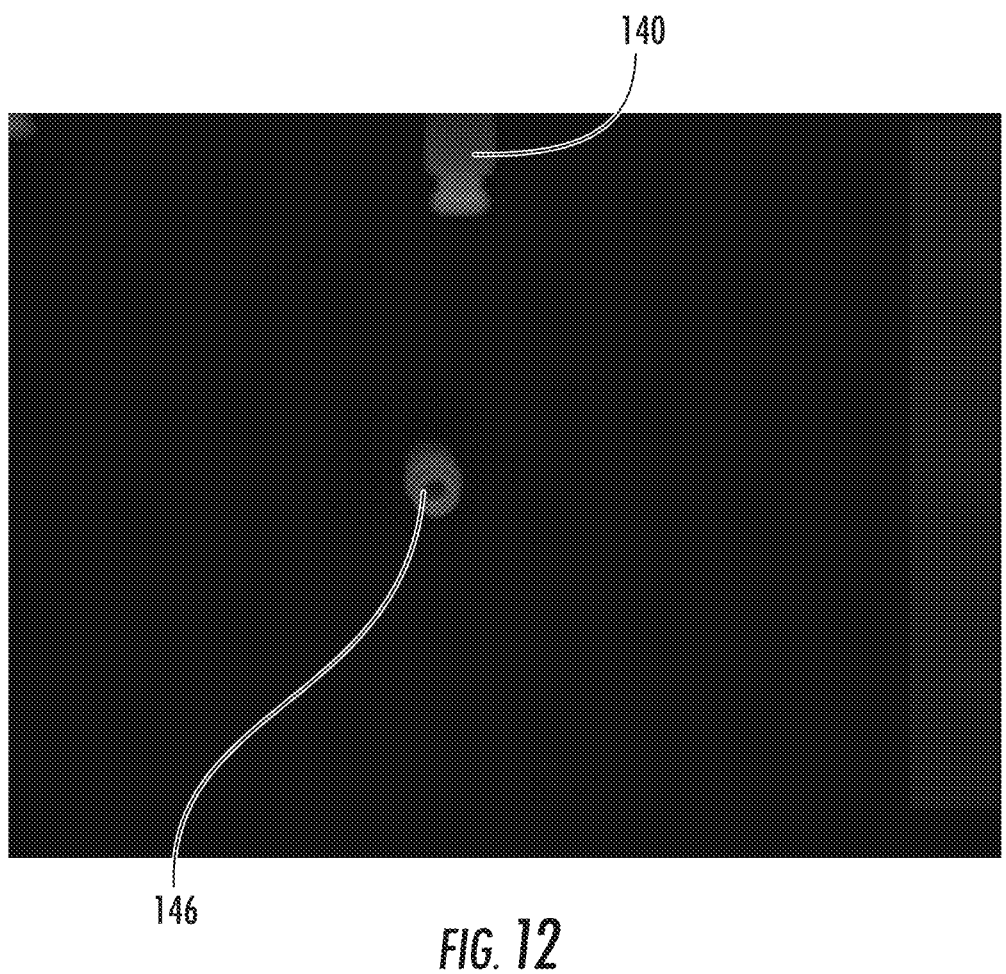
FIG. 12 is an image depicting a side view and a top view of a glass tube in a single thermal image captured using the thermal imaging system of FIG. 9, according to one or more embodiments shown and described herein.

Alternatively, in one or more embodiments, the thermal imaging system 120 coupled to the main turret 108, which was previously described herein, may be used in conjunction with one or more stationary mirrors 700, each of which may be positioned underneath one of the plurality of processing stations 106. As shown in FIG. 7, the mirror 124 may be positioned to reflect infrared light emitted radially outward from the outer surface 140 of the glass tube 102 towards the lens 506 of the thermal imager 122 and the stationary mirrors 700 may be positioned to reflect infrared light, which is emitted axially downward (i.e., in a direction parallel to the centerline CL of the glass tube 102 and oriented towards the base 104), from the inner surfaces 146 of the glass tube 102 towards the lens 506 of the thermal imager 122. When the thermal imager 122 is indexed with the main turret 108 into alignment (e.g., angular alignment) with the stationary mirror 700, both the mirror 124 and the stationary mirror 700 may reflect infrared light to the lens 506 of the thermal imager 122, enabling the thermal imager 122 to simultaneously capture thermal images of the outer surfaces 140 and inner surfaces 146 of the glass tube 102. FIG. 12 depicts a thermal image taken with the thermal imaging system 120 having mirror 124 and stationary mirror 700. The thermal image of FIG. 9 shows a single thermal image that simultaneously captures thermal data of the outer surface 140 and thermal data of the inner surface 146. The single thermal image may enable the thermal imaging system 120 to determine one or more external surface temperatures and one or more internal temperatures from a single thermal image dataset. Although described using a combination of the mirror 124 and a stationary mirror 700, capturing infrared light emitted from the inner surfaces 146 of the glass tube 102 may be accomplished by positioning the mirror 124 to reflect infrared light from both the outside surface 140 and inside surface 146 of the glass tube 102 towards the thermal imager 122 or by coupling a supplemental mirror 125 to the mounting apparatus 126 to reflect the infrared light from the inner surface 146 of the glass tube towards the thermal imager 122, as previously described in this disclosure.

Although the thermal imaging system 120 has been described relative to a vertically oriented converter 100, in which the central axis A of the main turret 108 is generally perpendicular to the ground, it should be understood that the thermal imaging system 120 may also be adapted for use with a horizontally oriented converter or angled converter. The thermal imaging system 120 is also described herein relative to a converter 100 having a main turret 108 that is generally circular to index the glass tube 102 around a generally circular main circuit 116 of processing stations 106, however, it should be understood that the thermal imaging system 120 may be used with a converter 100 having any non-circular continuous loop or track that indexes the glass tube 102 through a plurality of processing stations 106. The processing stations 106 may be laid out in any convenient pattern. As previously noted, it is also understood that the thermal imaging system 120 may be used with a vial converter 100 as well as converters for producing other articles, such as cartridges, ampoules, syringes, or other glass articles, from glass tubes 102.

The thermal imaging systems 120 described in this disclosure may aid in developing process measurements, mathematical models, and experiments to build foundational understanding and glass-centered characterization of the converter 100 and the converting process practiced therewith. Developing a better understanding of the converting process through use of the thermal imaging system 120 reduces dependency on art and experience to guide setup of the converter 100, tooling, process configuration, and the ability to successfully translate between conversion platforms. The thermal imaging system 120 also allows for quantitative mapping of process windows and process limitations. The thermal imaging system 120 enables automatic analysis of the thermal image and locating the centerline CL of the glass tube 102 and/or the article made therefrom. Additionally, the thermal imaging system 120 allows for easier adaptation of the converter 100 and converting processes to incorporate alternative glass formulations.

The thermal imaging system 120 also provides process temperature measurements that may be incorporated into a control system for controlling the converter 100. At a specific processing station 106, measurements of surface temperatures of glass tubes 102 indexed through the processing station 106 indicate significant short term and long term variability of the surface temperature of the glass tube 102. Short term variability in surface temperatures of the glass tube 102, which is variability from one individual piece to the next individual piece, may be attributed to manufacturing tolerances in the tube drawing process, which result in variation in tube dimensions, such as tube diameter W (FIG. 4) and wall thickness T (FIG. 4), along the length L of glass tube 102 stock. Mass variability from tube to tube may be from +/−2.5 percent (%) to +/−5%. The heating elements 301 (FIG. 3A) of a glass tube converter 100 are positioned to heat a specific area of the glass tube 102. Therefore, changes in the mass of glass in that specific area, which may arise from these manufacturing variations from glass tube 102 to glass tube 102, directly results in corresponding variations in surface temperatures of the glass tube 102. Other factors, such as uncertainty and variations in machine timing, may also contribute to short term variations in surface temperature, but manufacturing variances in the glass tube 102 stock make the most significant contribution to these short term variances. Conventional converting machines have no systems to compensate for these short term variations in surface temperature of the glass tubes 102.

Long term variances (i.e., from cycle-to-cycle measured in minutes and/or hours) in surface temperature of the glass tube 102 may be caused by a number of factors, which induce variations into the thermal state of the converting process. Conditions that may give rise to long term variances in glass surface temperature may include machine heat-up as the converter 100 increases in temperature from ambient conditions to steady state operational conditions. The heat up process may take from 2 hours to 12 hours. Long term variability in surface temperature may also arise from fuel heating value changes (variations in the composition of the fuel gas received from the natural gas supplier), burner 302 deterioration, changes in manifold pressures (i.e., fuel gas, air, oxygen), ambient conditions, exhaust hood flow rate variability, other factors, and/or combinations of factors. Conventional converting machine systems must be manually adjusted to account for these long term variations in surface temperature.

Figure 13:
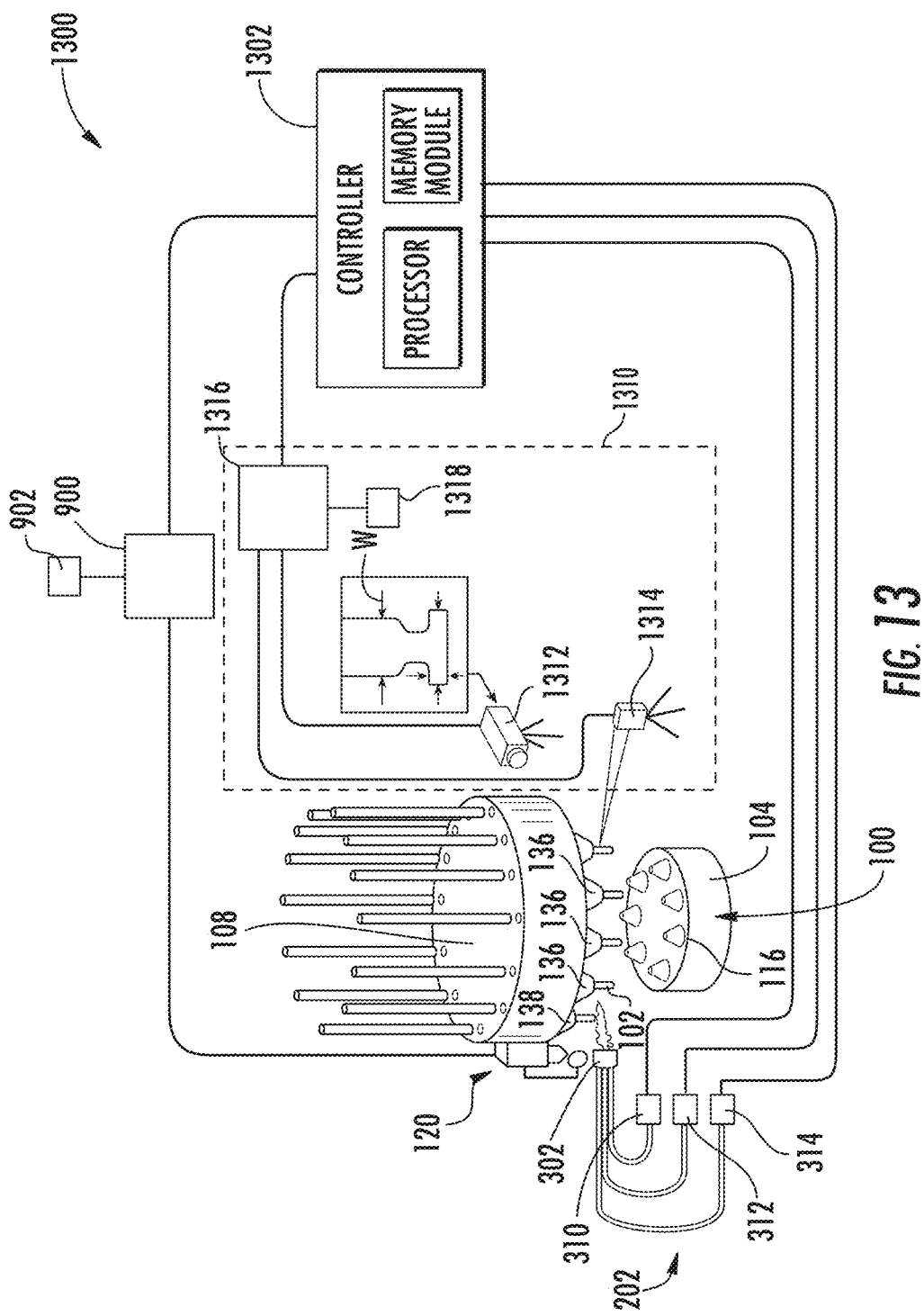
FIG. 13 schematically depicts a control system for the converter of FIG. 1, according to one or more embodiments shown and described herein.

Referring to FIG. 13, a control system 1300 for a glass tube converter 100 is disclosed that may provide a system and method for compensating for both short term and long term variations in surface temperature to provide more consistent and efficient operation of the converter 100. The control system 1300 comprises the converter 100, the thermal imaging system 120, and a controller 1302.

The converter 100 may have any of the features of the converter 100 previously described herein. As previously described, the one or more heating stations 202 may include heating elements 301 that may be manipulated to change the amount of heating of the glass tube 102 and thus change the temperature of the glass tube 102. For example, in embodiments, the heating element 301 may be a burner 302 having a fuel control valve 310, oxygen control valve 312, and optionally a combustion air control valve 314, all of which may be manipulated to change the heat of the flame produced by the burner 302 and thus change the temperature of the glass tube 102 as it is indexed through the heating station 202. Alternatively, in other embodiments, the heating element 301 may be a laser, such as a carbon dioxide laser, for example. A power input to the laser, an exposure time of the glass tube 102 to the laser, or both may be manipulated to change the degree of heating of the glass tube 102 and thus change the temperature of the glass tube 102. Referring to FIG. 3E, as previously described, the converter 100 may also have one or more cooling stations 210, which may include one or more cooling fluid control valves 344 for controlling a mass flow rate of cooling fluid 342, which may also influence the temperature of the glass tube 102 indexed through the cooling station 210.

The thermal imaging system 120 may be used to measure and determine one or more process variables for use by the control system 1300. The thermal imaging system 120 may have any of the features described herein relative to the thermal imaging system 120 coupled to the main turret 108 for rotation with the main turret 108. As previously described, the thermal imaging system 120 comprises at least one thermal imager 122, a processor 900 communicatively coupled to the thermal imager 122, and one or more memory modules 902 having machine readable instructions thereon for receiving and processing the thermal image data captured by the thermal imager 122. The thermal imaging system 120 may also include at least one mirror 124 positioned to reflect infrared light from the glass tube 102 to the thermal imager 122. In some embodiments, a single processor may serve as both the controller 1300 of the control system 1300 and processor 900 of the thermal imaging system 120. The thermal imaging system 120 may also have one or more stationary mirrors 700 (FIG. 7) positioned vertically below one or more processing stations 106 to reflect infrared light emitted by an inner surface 146 (FIG. 4) of the glass tube 102 to the thermal imager 122 when the thermal imager 122 indexes into position to receive the light reflected from the stationary mirror 700. In one or more embodiments, a plurality of thermal imagers 122 may be coupled to the main turret 108 to measure process variables for a plurality of processing stations 108 or secondary processing stations 112 simultaneously.

The thermal imaging system 120 may output one or more process variables, which may be used by the control system 1300 to control the converter 100 and converting process. Alternatively, the thermal imaging system 120 may save the one or more process variables to the memory modules 902 for retrieval by the controller 1302. In one or more embodiments, the process variables determined by the thermal imaging system 120 may include one or more temperatures of an outer surface 140 of the glass tube 102 at one or more points on the outer surface 140 of the glass tube 102 and at one or more stages of the converting process. In embodiments, the process variables determined by the thermal imaging system 120 may include one or more temperatures of an inner surface 146 (FIG. 4) of the glass tube 102 at one or more points on the inner surface 146 of the glass tube 102 and at one or more stages of the converting process. In embodiments, the process variable may be a peak centerline glass temperature (i.e., maximum temperature of the glass tube 102 along the centerline CL of the glass tube 102). In other embodiments, the process variable may also be one or more dimensions of the glass tube 102 at one or more regions of the glass tube 102, a viscosity of the glass tube 102 at one or more regions of the glass tube 102, a temperature profile of the glass tube 102 as a function of time, other characteristic of the glass tube 102, or combinations of these.

The control system 130 may receive other process variables of the converter 100. For example, the control system 130 may receive information on dimensions or other physical attributes of the glass tube 102, such as outer diameter, inner diameter, and/or thickness. Dimensions of the glass tube 102 or other process variables may be received by the control system 130 from external sources or from other measurement systems integrated with the converter 100 and/or the control system 1300. Referring to FIG. 13, in some embodiments, the control system 1300 may include a dimensioning system 1310 for measuring the diameter W and thickness T of the glass tube 102 and determining a glass mass per unit length of the glass tube 102 from the diameter W, thickness T, and density of the glass. Any one of the diameter W, thickness T, or glass mass per unit length of the glass tube 102 may be used as process variables by the control system 1300.

The dimensioning system 1310 may include at least one of a visual imaging system, a laser reflectometer, laser gauge, other measuring device, or combinations of these. Alternatively, the dimensioning system 1310 may include an optical micrometer, such as micrometer comprising a collimated beam of light emitted from a light source on one side of the glass tube 102 and an optical receiver, such as a camera or optical sensor for example, positioned on an opposite side of the glass tube. As illustrated in FIG. 13, in some embodiments, the dimensioning system 1310 may include a visual imaging system 1312 having a visual imaging device configured to capture a visual image of the glass tube 102. In some embodiments, the visual imaging device of the visual imaging system 1312 may be stationary and focused on a single processing station 106. In embodiments, the visual imaging system 1312 may be coupled to the base 104 of the converter 100. In embodiments, the visual imaging system 1312 may be positioned to capture a visual image of the glass tube 102 at a processing station 106 directly following the last forming station 204 (FIG. 2) in the main circuit 116 (FIG. 2). Alternatively, in other embodiments, the visual imaging system 1312 may be positioned at a processing station 106 located before the first forming station 204 of the converter 100. In still other embodiments, the visual imaging system 1312 may be positioned to capture a visual image of the glass tube 102 before it is loaded into the holder 130. The visual image obtained from the visual imaging system 1312 may be used to obtain the outer diameter W of the glass tube 102.

In some embodiments, the dimensioning system 1310 may further include a laser reflectometer 1314 fixed at a stationary position relative to the base 104 of the converter 100. The laser reflectometer 1314 may be oriented to measure the thickness T of the glass tube 102 (i.e., the wall thickness) at a single processing station 106. In one or more embodiments, the laser reflectometer 1314 may be positioned at the same processing station 106 as the visual imaging system 1312. Alternatively, the laser reflectometer 1314 may be positioned at a processing station 106 different than the processing station 106 to which the visual imaging system 1312 is directed. In some embodiments, the visual imaging system 1312 may be positioned and oriented to capture a visual image of the glass tube 102, such as an end view of the glass tube 102, from which the outside diameter W and the inside diameter of the glass tube can be determined. The visual imaging system 1312 may then use the outside diameter and inside diameter of the glass tube 102 to determine the thickness T and mass per unit length of the glass tube 102. Although the dimensioning system 1310 is described herein as having a visual imaging system 1312, laser reflectometer 1314, or both, it is contemplated that other dimension measuring devices may be incorporated into the dimensioning system 1310 to determine the dimensions and mass per unit length of the glass tube 102.

In alternative embodiments, one or more parts of the dimensioning system 1310, such as the visual imaging system 1312, laser reflectometer, or other dimensioning device, may be positioned upstream of the processing stations 106 of the converter 100 to measure the dimensions of the glass tube stock prior to feeding the glass tube stock to the converter 100. For example, dimensioning system 1310 may be positioned at the tube loading apparatus, such as the glass tube loading turret 110 (FIG. 1) or glass tube loading arm (not shown) for example, to measure the dimensions of the glass tube 102 before loading the glass tube 102 into the converter 100.

The dimensioning system 1310 may further comprise a dimensioning processor 1316 having one or more dimensioning memory modules 1318 having machine readable instructions thereon that, when executed by the dimensioning processor 1316, cause the dimensioning system 1310 to receive measurement data from at least one dimensioning device, process the measurement data, and determine a diameter W and a thickness T of the glass tube from the measurement data. For example, in some embodiments, the machine readable instructions, when executed by the dimensioning processor 1316, may cause the dimensioning system 1310 to receive visual image data from the visual imaging system 1312, receive thickness information from the laser reflectometer 1314, process the visual image data, determine a diameter W of the glass tube 102, process the thickness information from the laser reflectometer 1314, and determine a thickness T of the glass tube 102. Alternatively, in other embodiments, the machine readable instructions, when executed by the dimensioning processor 1316, may cause the dimensioning system 1310 to receive visual image data from the visual imaging system 1312, determine an outer diameter W of the glass tube 102, determine a thickness, and determine a mass per unit length of the glass tube 102 from the thickness T and the outer diameter W. The machine readable instructions may comprise commercially available visual image processing software such as those image processing programs previously described. The machine readable instructions, when executed by the dimensioning processor 1316, may cause the dimensioning system 1310 to store and/or output the thickness T and diameter W of the glass tube 102. In embodiments, the machine readable instructions, when executed by the dimensioning processor 1316, may cause the dimensioning system 1310 to determine a mass of glass per unit length of glass tube 102 (i.e., mass per unit length of the glass tube 102) from the measured diameter W and thickness T of the glass tube 102. The dimensioning system 1310 may store the mass per unit length of the glass tube in the one or more dimensioning memory modules 1318 or may output the mass per unit length of the glass tube 102.

In embodiments, the control system 1300 may determine the temperature gradient through the thickness T of the glass tube 102 from the thickness T determined by the dimensioning system 1310 and surface temperatures, such as the temperatures of the outer surface 140 and inner surface 146 of the glass tube 102 for example, determined by the thermal imaging system 120. The temperature gradient may be used as the process variable in one or more control methods. In some embodiments, the control system 130 may determine a viscosity gradient of the glass through the thickness T of the glass tube 102 from the temperature information from the thermal imager 122 and the thickness T of the glass tube 102 determined by the dimensioning system 1310. The viscosity gradient may be used as the process variable in some embodiments. The process variables may also include the index time of the turret.

Still referring to FIG. 13, the controller 1302 for the control system 1300 may include a control processor 1304 and one or more control memory modules 1306 having machine readable instructions stored thereon, which, when executed by control processor 1304, cause the control system 1300 to implement one or more control methods for controlling the converter 100, which control methods will be further described herein. The controller 1302 may have a plurality of inputs communicatively coupled to one or more of the thermal imaging system 120, the dimensioning system 1310, or other sensors. The controller 1302 may have a plurality of outputs communicatively coupled to one or more control devices, which may include one or more of the fuel control valves 310, oxygen control valves 312, air control valves 314, cooling fluid control valves 344 (FIG. 3E), forming tool actuators 326 (FIG. 3D), or other control devices associated with one or more heating stations 202, forming stations 204, cooling stations 210, or other processing station 106. In embodiments, the controller 1302 may be a proportional-integrated-derivative (PID) controller.

The machine readable instructions stored in the one or more control memory modules 1306, when executed by the control processor 1304, may cause the control system 1300 to receive a process variable, such as a temperature, viscosity, dimension, temperature gradient, viscosity gradient, other characteristic, or combinations of characteristics of the glass tube 102 for example, from the thermal imaging system 120, compare the process variable against a set point stored in memory, determine a controlled variable based on the comparison of the process variable to the set point, and transmit a control signal representative of the controlled variable to the one or more control devices. In embodiments, the controller 1302 may receive one or more process variables, such as the diameter W, thickness T, and/or glass mass per unit length for the glass tube 102, from the dimensioning system 1310. In one or more embodiments, the machine readable instructions, when executed by the control processor 1304, may cause the controller 1302 to retrieve the process variable from the thermal imaging system 120, dimensioning system 1310, or other sensor or sensor system.

The set points for the process variables may be determined from a database of historic process variable measurements collected during operation of the converter 100. In embodiments, the database may include process variable measurements and operating conditions representing acceptable production conditions. In embodiments, the database may include a data set of process variable measurements and operating conditions corresponding to representative cycles collected to characterize typical variability of the converter 100. The process variable measurements in the database may be used to develop set points for the one or more process variables. The variability of the process variable measurements may be determined from the database to define control parameters, such as one or more gain constants for example, to maximize thermal consistency, and avoid overcontrol of the converter 100. In embodiments, the set point may be calculated as a rolling average of the process variable taken over a specific period of time, such as time periods of at least 3 minutes, at least 30 minutes, at least 60 minutes, at least 3 hours, at least 10 hours, or even at least 3 days, for example.

Figure 14:
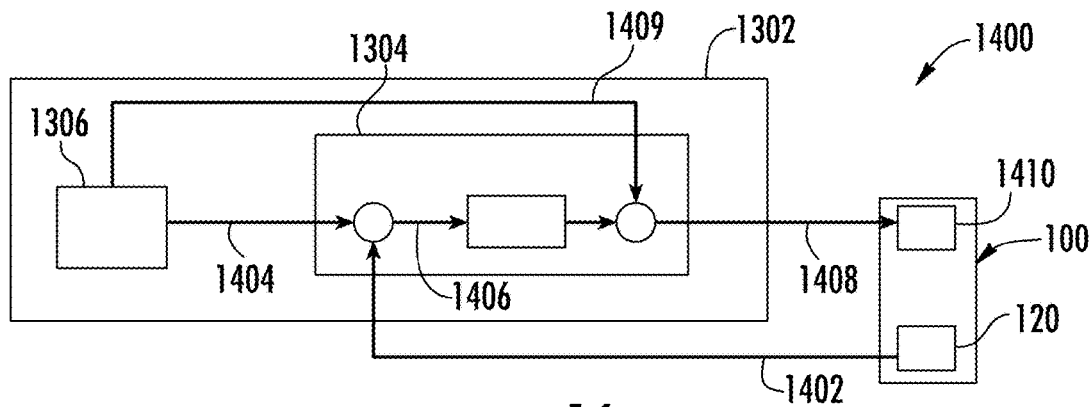
FIG. 14 schematically depicts single feedback control method for the control system of FIG. 13, according to one or more embodiments shown and described herein.

Referring now to FIG. 14, one embodiment of a temperature feedback control method 1400 is schematically depicted. A process variable 1402 of the converter 100 is measured and transmitted to the controller 1302. The control processor 1304 of the controller 1302 compares the process variable 1402 to a set point 1404 and calculates an error 1406, which may be the difference between the set point 1404 and the process variable 1402. The control processor 1304 may then calculate one or more controlled variables 1408 and transmit one or more control signals representative of the controlled variables 1408 back to the converter 100, in particular to a control device 1410 of the converter 100. In embodiments, the process variable 1402 may be one or more temperatures of the glass tube 102 measured by the thermal imaging system 120. In some embodiments, the temperature of the glass tube 102 may be used by the controller 1302 to control one or more control devices 1410 associated with a heating station 202 (FIG. 3A) to control heating of the glass tube 102 at the heating station 202. The control processor 1304 may calculate the controlled variable 1408 using one or more proportional, integral, or derivative calculation methodologies. Calculation of the controlled variable 1408 may include applying a gain constant 1409 to the controlled variable 1408 to adjust for the sensitivity of the converting process to changes in the controlled variable 1408. Specifically, in some embodiments, the controlled variable 1408 may be determined by multiplying the error 1406 by the gain constant 1409. Alternatively, the control processor 1304 may incorporate modeling, such heat transfer modeling for example, system level control methods, or other control strategies to determine the controlled variable 1408.

The temperature measured by the thermal imaging system 120 may be a single temperature of the glass tube 102 taken at a specific location on the glass tube 102 at a specific stage of the converting process, such as an end-of-cycle temperature, an end of dwell temperature (i.e., the temperature of the glass tube 102 at the end of an operation in a processing station 106 just before the main turret 108 indexes the glass tube 102 to the next processing station 106), a beginning of dwell temperature (i.e., the temperature of the glass tube 102 at a processing station 106 at the start of the dwell time), or any other temperature of the glass tube 102 at any location on the glass tube 102 and at any stage of the converting process. In some embodiments, the temperature measured by the thermal imaging system 120 may be an end-of-cycle maximum centerline temperature and/or a maximum centerline temperature at any processing station 106. The process variable 1402 may include a temperature of the outer surface 140 (FIG. 4) of the glass tube 102 or a temperature of the inner surface 146 (FIG. 4) of the glass tube 102. In some embodiments, the process variable 1402 may include one or more average temperatures, such as an average centerline temperature of the glass tube 102, for example.

In some embodiments, the process variable 1402 may be a difference between any two temperatures of the glass tube 102 measured with the thermal imaging system 120. For example, in some embodiments, the process variable 1402 may be a difference between a centerline temperature of the glass tube 102 at the beginning of the dwell time at a processing station 106 (FIG. 1), such as a heating station 202 or forming station 204, and a centerline temperature of the glass tube 102 at the end of the dwell time of the same processing station 106. In some embodiments, the process variable 1402 may be a difference between the end-of-cycle temperature of the glass tube 102 (i.e., the temperature of the glass tube 102 measured at the end of the last processing station of the converting process) and the start-of-cycle temperature of the glass tube 102 (i.e., the temperature of the glass tube 102 measured at the first processing station of the converting process). The process variable 1402 may be a difference between temperatures of the glass tube 102 at the same holder position 136 (FIG. 2) at different stages of the converting process. Alternatively, the process variable 1402 may include a difference between a temperature at one position on the glass tube 102 and a temperature at a second position on the glass tube 102 at the same stage of the converting process. For example, the process variable 1402 may include a difference between a temperature of the outer surface 140 (FIG. 4) of the glass tube 102 and a temperature of the inner surface 146 (FIG. 4) of the glass tube 102 at the same processing station 106. The process variable 1402 may be representative of a temperature gradient between two positions on the glass tube 102, such as the temperature gradient through the thickness T of the glass tube 102. The process variable 1402 may also be a physical dimension of the glass tube 102 determined from the thermal image data. The process variable may also be a viscosity of the glass tube 102 or a viscosity gradient through the thickness T of the glass tube 102. The process variable 1402 may be any other process variable or characteristic of the glass tube 102 described herein.

The process variable 1402 (e.g., a temperature of the glass tube) may be compared to the set point 1404, which may be stored in the one or more control memory modules 1306 of the controller 1302. The set point 1404 may be periodically updated in the control memory modules 1306 based on changes observed from continued accumulation of process variable 1402 measurements and operating conditions in the database of operating conditions previously described.

In some embodiments, the controlled variables 1408 may include one or more variables that influence the heating of the glass tube 102 by the heating element 301 (FIG. 3A) in one or more heating stations 202 (FIG. 3A). For example, in embodiments, the controlled variables 1408 may include the position of one or more of the fuel control valve 310 (FIG. 3A), oxygen control valve 312 (FIG. 3A), and air control valve 314 (FIG. 3A) for one or more burners 302 (FIG. 3A) of one or more heating stations 202 of the converter 100. Communicatively coupling the fuel control valves 310, oxygen control valves 312, and/or the optional air control valves 314 of one or more heating stations 202 to the outputs of the controller 1302 enables the controller 1302 to control the heating station 202 by manipulating the mass flow of fuel gas to one or more of the burners 302 (FIG. 3) with proportional changes to the flow of oxygen and/or air.

In some embodiments, the ratio of the mass flow rate of oxygen and/or air to the mass flow rate of the fuel gas may be fixed and constant so that adjusting the mass flow rate of the fuel gas changes the corresponding mass flow rates of the oxygen and/or air. In these embodiments, the controller 1302 may be configured to manipulate the fuel control valve 310, oxygen control valve 312, and/or the air control valve 314 to maintain a constant stoichiometric ratio of the fuel gas delivered to the burner. For example, in embodiments in which both air and pure oxygen are provided to a burner, a ratio of the flow of air to the flow of pure oxygen must also be maintained in order to maintain stoichiometry. In the case where burner combustion is supplied by multiple streams—such as is the case for air and oxygen—both air and pure oxygen mass flowrates are held in a constant ratio to maintain a constant oxidant concentration at the burner 302, which refers to the total oxygen concentration of the combined air and oxygen streams. Thus, in embodiments in which a burner 302 is supplied with fuel gas, pure oxygen gas, and air, the stoichiometry for oxidation of the fuel gas is maintained by maintaining the ratio of the fuel gas flowrate to the pure oxygen flowrate and by maintaining the ratio of the air flowrate to the pure oxygen flowrate. In operation, a controller 1302 may send a control signal to the fuel control valve 310 to change the mass flow rate of fuel gas to the burner 302. To maintain stoichiometry, the controller 1302 will also make corresponding changes to the pure oxygen flowrate and air flowrate to maintain a constant ratio of the air flowrate to the pure oxygen flowrate and a constant ratio of the fuel gas flowrate to the pure oxygen flowrate. Maintaining a constant stoichiometric ratio of the fuel gas delivered to the burner 302 will hold the heating levels of the burner 302 in proportion to the fuel flow increase, which may increase the predictability of the temperature control response to changes in controlled variables 1408.

Alternatively, in other embodiments, the mass flow rate of fuel gas and the mass flow rate of oxygen and/or air may be adjusted independent of each other such that the ratio of oxygen and/or air to fuel gas may be adjusted in response to a control signal from the controller 1302. For example, adjusting the ratio of fuel gas to oxidant introduced to the burner 302 at a heating station 202 may be used to adjust the amount of heating conducted at a heating station 202 and, thus, influence the temperature of the glass tube 102. In some embodiments, the fuel control valve 310 may be controlled to control heating in the heating station 202, and the oxygen control valve 312 and/or the air control valve 314 may be controlled to maintain a constant stoichiometric ratio of fuel gas to oxygen at the burner 302 of the heating station 202. Additionally, in heating stations 202 having multiple burners 302, the proportion of fuel gas mass flow between each of the burners 302 may be fixed such that a change in fuel gas mass flow rate of one burner 302 results in a proportional change to the fuel gas mass flow of the other burners 302. In embodiments, each of the burners 302 may be independently controlled by the controller 1302. In alternative embodiments, the heating station 202 may include one or more laser heating elements and the controlled variable 1408 may be a power output to the laser or an exposure time of the glass tube 102 to the laser light.

The gain constant 1409 may be determined by performing a series of bump tests on individual processing stations 106 (FIG. 1). Generally, a bump test refers to the process of making a small step change in one or more controlled variables 1408 and measuring the process variable 1402 to determine the response of the process variable 1402 to the small step change in the controlled variable 1408. For example, mass flow rates of fuel gas and/or oxygen may be changed in very small increments and the thermal response of the converter 100 to the changes in the mass flow rates of fuel and/or oxygen may be measured using the thermal imaging system 120. For glass converters 100, the heating stations 202 (FIG. 2) are very highly coupled, so bump tests may be conducted individually for each of the heating stations 202 with the changes to the mass flow rates of fuel and oxygen kept very small.

The feedback control method 1400 depicted in FIG. 14 may operate to maintain a consistent surface temperature of the glass tube 102 as averaged over a period of 2 to 3 complete rotations of the main turret 108 (FIG. 1). Configuring the control system 1300 to maintain a consistent surface temperature through the feedback control method 1400 of FIG. 14 may reduce or eliminate the effects of the long term sources of surface temperature variability previously described.

However, the feedback control method 1400 may not effectively reduce or eliminate short term variations, such as those caused by variations in the glass mass per unit length of the glass tube 102, as previously described. For example, for a converter 100 having N number of processing stations 106 and a thermal imaging system 120 with a single thermal imager 122, the thermal imager 122 may measure the process variable 1402 (i.e., a temperature) of a single glass tube 102 as it is indexed through the N processing stations 106. Adjustments to the controlled variables 1408 based on the temperature of the single glass tube 102 are then maintained through the next (N−1) glass tubes 102 until the thermal imager 122 cycles back through to measure the process variables 1402 again. Thus, operating conditions are held constant for the (N−1) glass tubes 102 between cycles of the thermal imager 122. For larger converters 100 having more than 18 processing stations 106, such as 36 or more stations, controlling the converter 100 in response to one measurement of the process variables 1402 for one glass tube 102 out of every N glass tubes 102 may not account for short term variability in the process. Additionally, the dimensions and/or mass of the (N−1) glass tubes 102 may vary, which may introduce more variability into the process between cycles of the thermal imager 122. In some embodiments, the thermal imaging system 120 may include a plurality of thermal imagers 122 distributed around the holder positions. The incorporation of multiple thermal imagers 122 may increase the frequency of measurement of the process variables 1402 and may improve control of the converter 100.

Figure 15:
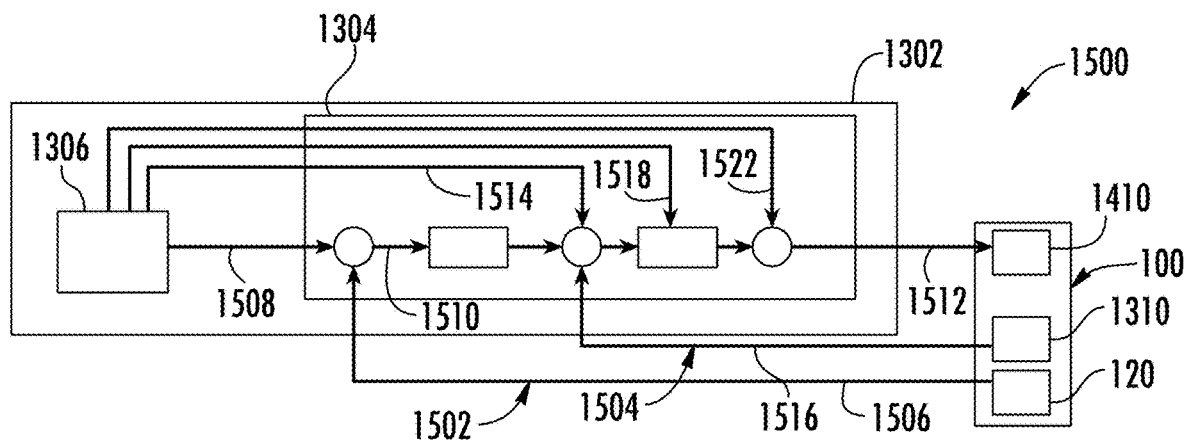
FIG. 15 schematically depicts a cascade control method for the control system of FIG. 13, according to one or more embodiments shown and described herein.

Alternatively, to account for the short term variations, such as the variations in the glass mass per unit length of the glass tube 102, a cascade control method 1500, such as the method schematically depicted in FIG. 15, may be implemented with the control system 1300 (FIG. 13). In the cascade control method 1500, a second process variable 1516 may be measured or provided from an external source for at least the (N−1) glass tubes 102 between cycles of the thermal imager 122. The cascade control method 1500 provides the ability to compensate for short term variations, such as variations in glass tube mass and/or dimensions, on a tube-by-tube basis. Thus, the cascade control method 1500 may enable the control system 1300 to compensate for temperature changes at holder positions at which the temperature is not being measured by the visual imaging system 120. The cascade control method 1500 may provide improved and/or enhanced process control of the converter 100 compared to the feedback control method 1400, which may rely on measurement of the process variables by the thermal imaging system 120 once per cycle of the thermal imager 122 through the processing stations 106.

Referring to FIG. 15, in a first feedback loop 1502, a first process variable 1506 of the converting process is measured and transmitted to the controller 1302. The controller 1302 compares the first process variable 1506 to a first set point 1508 associated with the first process variable 1506 and calculates a first error 1510, which may be the difference between the first set point 1508 and the first process variable 1506. The controller 1302 may then calculate an intermediate controlled variable (not shown) and adjust the intermediate controlled variable by applying a first gain constant 1514. In a second feedback loop 1504, a second process variable 1516 of the converter 100 is measured and transmitted to the controller 1302. The controller 1302 compares the second process variable 1516 to a second set point 1518 associated with the second process variable 1516 and calculates a bias (i.e., a second error, not shown). The controller 1302 may then adjust the controlled variable 1512, which was determined by the controller 1302 in the first feedback loop 1502, using the bias and a second gain constant 1522 to generate the controlled variable 1512. The controller 1302 may then transmit one or more control signals representative of the controlled variable 1512 to one or more control devices 1410 of the converter 100.

In embodiments, the first process variable 1506 may be one or more temperatures of the glass tube 102 measured by the thermal imaging system 120, and the second process variable 1516 may be a physical dimension of the glass tube 102, such as the diameter, thickness, or glass mass per unit length of the glass tube 102 for example, measured by the dimensioning system 1310. The temperature of the glass tube 102 and physical dimension of the glass tube 102 may be used by the controller 1302 in the cascade control method 1500 to control the heating at one or more of the heating stations 202 (FIG. 3A). The first feedback loop 1502 having the first process variable 1506 that is a temperature of the glass tube 102 may allow the control system 1300 to control the converter 100 on a cycle-to-cycle basis to reduce or eliminate the effects of the long term sources of surface temperature variability as previously described. The second feedback loop 1504 having the second process variable 1516 that is a physical dimension of the glass tube 102 may allow the control system 1300 to control the converter 100 on a glass-tube-to-glass-tube basis to reduce or eliminate the effects of short term sources of surface temperature variability, such as variability in the dimensions of the glass tube 102, as previously described herein.

In one or more embodiments, the first feedback loop 1502 of the cascade control method 1500 may be the same as the feedback loop depicted in FIG. 14 and previously described in relation thereto. Similarly, the first process variable 1506, first set point 1508, first gain constant 1514, and controlled variable 1512 may be similar to the process variable 1402, set point 1404, gain constant 1409, and controlled variable 1408 described previously in relation to FIG. 14.

Referring back to FIG. 15, the second process variable 1516, which may be a physical attribute of the glass tube 102, may be measured and/or calculated by the dimensioning system 1310 (FIG. 13). The second process variable 1516 (e.g., diameter, thickness, or glass mass per length of the glass tube) may be compared to the second set point 1518, which may be stored in the one or more control memory modules 1306 of the controller 1302. In embodiments, the second set point 1518 may be a nominal tube mass per unit length. The second set point 1518 may be periodically updated in the control memory modules 1306 based on changes observed from continued accumulation of process variable measurements and operating conditions in the database. A bias (not shown) may be calculated for each glass tube 102 processed, and the controlled variable 1512 may be adjusted on a tube-by-tube basis. The bias may be calculated using a mathematical model relating the mass per unit length of the glass tube 102 and the temperature profile of the glass tube 102. The mathematical model may include heat transfer models or may be empirically determined from historic thermal data stored by the thermal imaging system 120.

As previously described, the controlled variable 1512 may include the position of one or more of the fuel control valve 310 (FIG. 3A), oxygen control valve 312 (FIG. 3A), and/or air control valve 314 (FIG. 3A) for one or more heating stations 202 of the converter 100.

Referring again to FIG. 13, as described herein, the thermal imaging system 120 follows a single glass tube 102 through the converter 100, so that at the fixed position 138 on the main turret 108 corresponding to the thermal imaging system 120, the control system 1300 operates in full cascade mode (i.e., according to the cascade control method 1500 depicted in FIG. 15). However, for glass tubes 102 at holder positions 136 not corresponding to the fixed position 138 of the thermal imaging system 120, the control system 1300 may operate as a single loop feedback control method in which the heating stations 202 are controlled based on the second process variable 1516 (FIG. 15), which may be a physical attribute of the glass tube 102 (e.g., diameter, thickness, or glass mass per unit length of the glass tube 102). Heating flows are continually modified based on the physical attribute of the glass tube for the holder positions 136 between the fixed positions 138 of the thermal imaging system 120. As previously described, in one or more embodiments, more than one thermal imaging system 120 may be coupled to the main turret 108 of the converter 100 to provide measurements of the first process variable 1506 at two fixed positions 138 on the main turret 108, which enables measurement of the first process variable 1506 at a frequency greater than one time per cycle.

Figure 16:
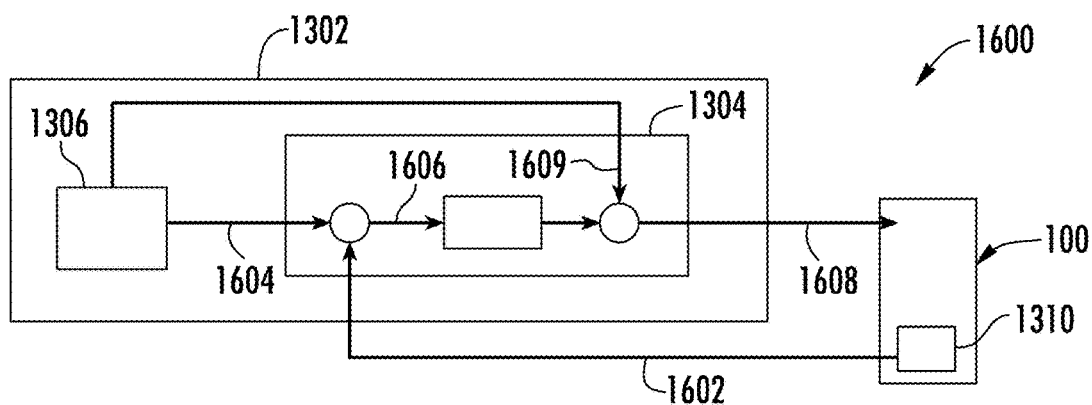
FIG. 16 schematically depicts another single feedback control method for the control system of FIG. 13, according to one or more embodiments shown and described herein.

Referring to FIG. 16, an embodiment of a single loop feedback control method 1600 is depicted that is based on glass-tube-to-glass-tube control of one or more heating elements 301 (FIG. 3A) of the heating stations 202 (FIG. 3A) in response to changes in the glass mass per unit length of the glass tube 102 as measured by the dimensioning system 1310. In the embodiment of FIG. 16, the process variable 1602 may be a physical attribute of the glass tube 102, such as the diameter, thickness, or glass mass per unit length of the glass tube 102. The process variable 1602 may be compared against a set point 1604, which may be a nominal diameter, nominal thickness, or nominal glass mass per unit length of the glass tube 102. The error 1606, which may be the difference between the process variable 1602 and the set point 1604, and a gain constant 1609 may be used to determine the controlled variable 1608, which may be a position of one or more of the fuel control valve 310, oxygen control valve 312, and/or air control valve 314, which combine to control the mass flow rate of fuel, oxygen, and/or air to the burner 302 (FIG. 3) of one or more heating stations 202. The single loop feedback control method 1600 of FIG. 16 may represent operation of the control system 1300 (FIG. 13) with respect to the glass tubes 102 in holder positions 136 that are not the fixed position 138, which is the holder 130 at which the thermal imaging system 120 is positioned. At the fixed position 138, the control system 1300 operates in full cascade mode as previously described and illustrated in FIG. 15.

In some embodiments, for any of the control methods depicted in FIGS. 14-16, the controlled variable 1408, 1512, 1608 may be a position of the cooling fluid control valve 344, which controls the mass flow of cooling fluid 342 (FIG. 3E) to one or more cooling stations 210 (FIG. 3E). In these embodiments, the cooling fluid control valve 344 (FIG. 3E) for a cooling station 210 may be communicatively coupled to the control system 1300. Additionally, in embodiments, the controlled variables 1408, 1512, 1608 may also include an index time of the main turret 108 of the converter 100.

In embodiments, a feedback control method 1400 (FIG. 14) or cascade control method 1500 (FIG. 15) may be used to control the contact time of the forming tools 324 (FIGS. 3C-3D) with the glass tube 102 in a forming station 204 (FIGS. 3C-3D). The contact time may be controlled as the controlled variable 1408, 1512 in response to a process variable 1402, 1506, such as a temperature of the glass tube 102 measured using the thermal imaging system 120 or a physical attribute of the glass tube 102, such as the diameter, thickness, or glass mass per unit length of the glass tube 102, which may be measured by the dimensioning system 1310 (FIG. 13). The contact time of the forming tools 324 with the glass tube 102 may be increased or decreased in response to the process variable 1402, 1506.

In one or more embodiments, the controlled variable 1408 may be the contact time. When the measured surface temperature reaches the target surface temperature, the controller 1302 may set the contact time to the time period starting from when the forming tools 324 first engaged the glass tube 102 and ending at the time at which the measured surface temperature reached the target surface temperature. As the main turret 108 indexes glass tubes 102 through the forming station 204, the controller 1302 maintains the controlled variable 1408 equal to the contact time determined by the controller 1302 until the thermal imaging system 120 cycles back around into position at the forming station 204 to measure the process variable 1402 again. In these embodiments, the contact time may change from cycle to cycle and may be effective to reduce or eliminate the effects of long term sources of surface temperature variability on the contact time.

In one or more embodiments, the cascade control method 1500 depicted in FIG. 15 and described previously in this disclosure may be adapted to control the contact time of the forming tools 324 with the glass tube 102 based on the surface temperature of the glass tube 102 as well as a physical attribute of the glass tube 102. In these embodiments, the first process variable 1506 may be the surface temperature of the glass tube 102 as measured by the thermal imaging system 120. The second process variable 1516 may be the glass mass per unit length of the glass tube 102 as determined by the dimensioning system 1310. The controlled variable 1512 may be the contact time. The contact time (controlled variable 1512) is initially established for a cycle based on comparing the measured surface temperature (first process variable 1506) provided by the thermal imaging system 120 to the target surface temperature (first set point 1508) stored in the control memory modules 1306. The contact time may then be further adjusted on a glass-tube-to-glass-tube basis based on comparison of the glass mass per unit area (second process variable 1516) as measured by the dimensioning system 1310 and compared to the target glass mass per unit area (second set point 1518). Implementing the cascade control method 1500 may further enable the control system 1300 to reduce and/or eliminate the effects of short term sources of variability in glass tube temperature, such as variability in glass tube 102 dimensions.

Based on the foregoing, it should now be understood that the embodiments described herein relate to thermal imaging systems 120 and control systems 1300 for use with converters 100 for producing a plurality of glass articles from glass tube 102. The thermal imaging system 120 and control systems 1300 described herein may be implemented to replace or minimize the dependency of existing converters on operator experience and art in fine-tuning thermal conditions on a glass tube converter 100. The thermal imaging system 120 and converter control systems 1300 may minimize the requirement of experience and shorten the learning curve for new part makers in reaching high quality and stable production. The thermal imaging system 120 and control systems 1300 may also enable faster process tuning for production of new products or incorporation of different glass compositions. The control system 1300 may also enable manufacturers to maximize yield and throughput of the converter 100.

The present disclosure may be embodied in hardware and/or in software (including firmware, resident software, micro-code, etc.). The thermal imaging system 120 and/or control system 1300 may include at least one processor and the computer-readable medium (i.e., memory module) as previously described in this specification. A computer-usable or the computer-readable medium or memory module may be any medium that can contain, store, communicate, propagate, or transport the program for use by or in connection with the instruction execution system, apparatus, or device.

The computer-usable or computer-readable medium or memory module may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present disclosure may be written in a high-level programming language, such as C or C++, for development convenience. In addition, computer program code for carrying out operations of the present disclosure may also be written in other programming languages, such as, but not limited to, interpreted languages. Some modules or routines may be written in assembly language or even micro-code to enhance performance and/or memory usage. However, software embodiments of the present disclosure do not depend on implementation with a particular programming language. It will be further appreciated that the functionality of any or all of the program modules may also be implemented using discrete hardware components, one or more application specific integrated circuits (ASICs), or a programmed digital signal processor or microcontroller.

While various embodiments of thermal imaging systems 120 and techniques for using the thermal imaging systems 120 for studying, starting-up, optimizing, and controlling glass tube converters 100 have been described herein, it should be understood it is contemplated that each of these embodiments and techniques may be used separately or in conjunction with one or more embodiments and techniques.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for producing glass articles with an opening at an end portion from a glass tube having an inner surface and an outer surface, the method comprising:
    determining dimensional data for the glass tube, one or more features of the glass articles, or combinations thereof, wherein the determining the dimensional data comprises measuring the dimensional data with a dimensioning system;
    shaping an end portion of the glass tube using at least one forming station, the at least one forming station comprising an outer surface forming tool and an inner surface forming tool;
    controlling a position of the outer surface forming tool operatively associated with the end portion of the glass tube based on the dimensional data; and
    controlling a position of the inner surface forming tool operatively associated with the end portion of the glass tube based on the dimensional data,
    wherein the dimensioning system is positioned upstream or downstream of the at least one forming station.

2. The method of claim 1, further comprising controlling the position of the inner surface forming tool based on the dimensional data independent of controlling the position of the outer surface forming tool.

3. The method of claim 1, wherein the outer surface forming tool comprises a plurality of outer surface forming tools and wherein the controlling the position of the outer surface forming tool comprises independently controlling a position of each of the plurality of outer surface forming tools based on the dimensional data.

4. The method of claim 1, wherein the controlling the position of the inner surface forming tool based on the dimensional data comprises controlling an axial position of the inner surface forming tool.

5. The method of claim 1, further comprising adjusting a position of a heating element operatively associated with the end portion of the glass tube based on the dimensional data.

6. The method of claim 1, wherein the dimensional data for the glass tube is selected from a group consisting of a tube diameter, tube wall thickness, a glass mass per unit length of the glass tube, and any combinations thereof.

7. The method of claim 1, wherein the glass articles are glass vials and the method further comprises forming a glass vial opening for each of the glass vials from the glass tube, the glass vial opening having one or more of a flange, a neck, a shoulder, or any combination thereof, wherein controlling the position of the outer surface forming tool based on the dimensional data comprises forming a flange thickness, a flange length, a neck length, a neck thickness, or combinations thereof.

8. The method of claim 1, wherein the dimensioning system comprises a non-contact measurement system.

9. The method of claim 8, wherein the non-contact measurement system comprises at least one of a thermal imaging system, a visual imaging system, a laser reflectometer, a laser gauge, an optical micrometer, or any combinations thereof.

10. The method of claim 1, further comprising processing the dimensional data by a control module to output a control variable, wherein the controlling the position of the outer surface forming tool or the controlling the position of the inner surface forming tool comprises inputting the control variable into an actuator that adjusts the position of the outer surface forming tool or the position of the inner surface forming tool based on the control variable.

11. The method of claim 10, wherein the processing the dimensional data for the glass tube, the one or more features of the glass articles, or combinations thereof comprises comparing the dimensional data with a set point stored in a memory module of the control module.

12. The method of claim 1, wherein the controlling the position of the inner surface forming tool comprises introducing the inner surface forming tool into an opening of the end portion of the glass tube in an axial direction relative to a center axis of the glass tube.

13. The method of claim 12, wherein the controlling the position of the outer surface forming tool comprises moving the outer surface forming tool into contact with the outer surface at the end portion of the glass tube to form a radial surface of a flange for the glass article, wherein the outer surface forming tool comprises a plurality of rotatably-movable forming tools.

14. The method of claim 12, wherein the controlling the position of the inner surface forming tool further comprises contacting an axial end of the glass tube to form an axial surface of a flange for the glass article.

15. The method of claim 1, further comprising:
holding a plurality of glass tubes in a plurality of holders that are distributed circumferentially around a rotary table, wherein the plurality of glass tubes are held by a portion of the glass tubes other than the end portion;
defining a plurality of processing stations around the rotary table, the plurality of processing stations including the at least one forming station; and
rotating the rotary table so that each of the plurality of holders presents the end portion of the glass tube held therein to a respective one of the plurality of processing stations, wherein the controlling the position of the outer surface forming tool, the controlling the position of the inner surface forming tool, or both have a contact time that is shorter than a dwell time for the rotating the rotary table.

16. The method of claim 1, wherein the shaping the end portion of the glass tube comprises:
heating the end portion of the glass tube;
introducing the inner surface forming tool along a first direction into an opening in the end portion of the glass tube while the glass tube is rotating; and
pressing the outer surface forming tool along a second direction on an outer surface of the end portion of the glass tube while the glass tube is rotating with the inner surface forming tool disposed in the opening.

17. The method of claim 16, further comprising:
withdrawing the inner surface forming tool along a direction opposite the first direction from the opening; and
withdrawing the outer surface forming tool along a direction opposite the second direction from the outer surface of the end portion.

18. The method of claim 17, wherein the withdrawing the inner surface forming tool from the opening occurs before or after the withdrawing the outer surface forming tool from the outer surface of the end portion.

19. The method of claim 16, wherein the first direction and the second direction are perpendicular to one another.

20. The method of claim 19, further comprising moving the inner surface forming tool along the second direction.

21. The method of claim 16, wherein the dimensioning system comprises at least one of a visual imaging device, a laser reflectometer, a laser gauge, an optical micrometer, or any combinations thereof.

22. The method of claim 21, further comprising:
processing the dimensional data; and
determining a physical attribute of the glass tube from the dimensional data.

23. The method of claim 22, wherein the physical attribute is one or more of a diameter, thickness, glass mass per unit length, or any combination thereof of the end portion of the glass tube.

24. The method of claim 23, wherein the glass container is a pharmaceutical glass vial and the shaping the end portion of the glass tube comprises forming a flange having one or more of a flange thickness, a flange length, a neck length, a neck thickness, or any combinations thereof.

* * * * *